(12) United States Patent
Zimmerman et al.

(10) Patent No.: US 7,644,117 B2
(45) Date of Patent: Jan. 5, 2010

(54) TURNKEY RESELLER PROGRAM FOR REGISTERING DOMAIN NAMES

(75) Inventors: Michael Zimmerman, Scottsdale, AZ (US); Josh Coffman, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 1277 days.

(21) Appl. No.: 10/616,195

(22) Filed: Jul. 8, 2003

(65) Prior Publication Data

US 2005/0021588 A1 Jan. 27, 2005

(51) Int. Cl.
G06F 15/16 (2006.01)

(52) U.S. Cl. .................. 709/200; 709/245; 705/14; 705/27

(58) Field of Classification Search .......... 709/200, 709/245; 705/26, 27, 14; 707/104.1
See application file for complete search history.

(56) References Cited

U.S. PATENT DOCUMENTS

| | | | |
|---|---|---|---|
| 5,905,862 A | 5/1999 | Hoekstra | |
| 6,298,341 B1 | 10/2001 | Mann et al. | |
| 6,519,589 B2 | 2/2003 | Mann et al. | |
| 6,560,634 B1 | 5/2003 | Broadhurst | |
| 6,745,248 B1 | 6/2004 | Gardos et al. | |
| 6,789,103 B1 | 9/2004 | Kim et al. | |
| 6,880,007 B1 | 4/2005 | Gardos et al. | |
| 6,895,430 B1 | 5/2005 | Schneider | |
| 7,007,080 B2 * | 2/2006 | Wilson | 709/221 |
| 7,039,697 B2 * | 5/2006 | Bayles | 709/223 |
| 2002/0035611 A1 | 3/2002 | Dooley | |
| 2002/0061021 A1 * | 5/2002 | Dillon | 370/390 |
| 2002/0065903 A1 | 5/2002 | Fellman | |
| 2002/0091827 A1 * | 7/2002 | King et al. | 709/226 |
| 2002/0129013 A1 | 9/2002 | Thomas | |
| 2002/0138291 A1 * | 9/2002 | Vaidyanathan et al. | 705/1 |
| 2003/0182365 A1 * | 9/2003 | Toda et al. | 709/203 |
| 2004/0044791 A1 | 3/2004 | Pouzzner | |
| 2004/0068460 A1 | 4/2004 | Feeley et al. | |
| 2004/0167982 A1 * | 8/2004 | Cohen et al. | 709/226 |
| 2005/0102354 A1 | 5/2005 | Hollenbeck et al. | |
| 2006/0161681 A1 * | 7/2006 | King et al. | 709/245 |

* cited by examiner

*Primary Examiner*—Salad Abdullahi
*Assistant Examiner*—El Hadji M Sall
(74) *Attorney, Agent, or Firm*—Stewart J. Womack; Chris A. Watt

(57) ABSTRACT

A reseller program may be used to increase the number of Customer desired domain names that are registered by a Registrar. There are two main embodiments of this reseller program. In the first embodiment, Resellers guide Customers to a Registrar web site through the use of advertisements, links in various web sites and/or links from search engines. The Registrar web site communicates directly with the Customer and registers the Customer desired domain names and compensates the Reseller for guiding the Customer to the Registrar web site. In the second embodiment, Resellers have their own reseller web sites that communicate directly with the Customers and communicate the desired domain names to the Registrar web site so the Registrar web site can register the Customer desired domain names. In this embodiment, the Customer may compensate the Reseller and the Reseller may compensate the Registrar for the services rendered.

16 Claims, 70 Drawing Sheets

Domain Services

| Product Name | Your Buy Rate | Shared % above Min Retail | Min. Retail Price | Max. Retail Price | Retail Price | Renewal Price | Your Total Profit* |
|---|---|---|---|---|---|---|---|
| Private Registrations | | | | | | | |
| Billed Annually | | | | | | | |
| Private Registration Services | $7.00 | 25% | $8.95 | $19.99 | 8.95 | 11.00 | $1.95 |
| Parking | | | | | | | |
| Billed Annually | | | | | | | |
| Domain For Sale Parked Page | $1.95 | N/A | $2.50 | $5.90 | 2.50 | 2.50 | $0.55 |
| One Page WebSite | $8.95 | N/A | $9.90 | $29.90 | 14.95 | 14.95 | $6.00 |
| Forwarding and Masking | | | | | | | |
| Billed Annually | | | | | | | |
| Domain Name Forwarding | FREE! | 50% | FREE! | $19.95 | 11.00 | 0.00 | $5.50 |
| Domain Masking | $3.96 | N/A | $4.95 | $19.95 | 6.00 | 5.95 | $2.04 |
| Traffic Blazer | | | | | | | |
| Billed Annually | | | | | | | |
| Traffic Blazer | $14.95 | 10% | $19.95 | $49.99 | 29.95 | 19.95 | $15.00 |
| Domain Alert | | | | | | | |
| Billed Annually | | | | | | | |
| DomainAlert - 10 Pack | $6.00 | 25% | $9.95 | $19.99 | 19.95 | 19.95 | $11.45 |
| DomainAlert - 1 Pack | $1.00 | 25% | $1.95 | $3.99 | 1.95 | 1.95 | $0.95 |
| DomainAlert - Backorder | $12.00 | 25% | $18.95 | $39.99 | 14.95 | 14.95 | $2.95 |
| Billed Monthly | | | | | | | |
| DomainAlert - Power List Subscription | $20.00 | 25% | $29.95 | $49.99 | 29.95 | 29.95 | $9.95 |

Fig. 22c

| Product Name | Your Buy Rate | Shared % above Min Retail | Min. Retail Price | Max. Retail Price | Retail Price | Renewal Price | Your Total Profit* |
|---|---|---|---|---|---|---|---|
| Billed Monthly | | | | | | | |
| DomainAlert - Power List Subscription | $20.00 | 25% | $29.95 | $49.99 | 29.95 | 29.95 | $9.95 |
| WebSite Tonight | | | | | | | |
| Billed Monthly | | | | | | | |
| WebSite Tonight - 5 Page Web Site | $3.70 | 25% | $4.95 | $9.99 | 4.95 | 4.95 | $1.25 |
| WebSite Tonight - 10 Page Web Site | $6.70 | 25% | $8.95 | $19.99 | 6.95 | 6.95 | $0.25 |
| WebSite Tonight - 20 Page Web Site | $9.70 | 25% | $12.95 | $29.99 | 9.95 | 9.95 | $0.25 |

Other Products

| Product Name | Your Buy Rate | Shared % above Min Retail | Min. Retail Price | Max. Retail Price | Retail Price | Renewal Price | Your Total Profit* |
|---|---|---|---|---|---|---|---|
| Idea Register | | | | | | | |
| One Time Fee | | | | | | | |
| IdeaRegister | $52.95 | 25% | $59.95 | $109.99 | 80.00 | | $22.04 |

EMail / Webmail

| Product Name | Your Buy Rate | Shared % above Min Retail | Min. Retail Price | Max. Retail Price | Retail Price | Renewal Price | Your Total Profit* |
|---|---|---|---|---|---|---|---|
| Packages | | | | | | | |
| Billed Annually | | | | | | | |
| 1 (20MB) web/email Account | $15.96 | N/A | $19.95 | $39.90 | 20.00 | | $4.04 |
| 3 (20MB) web/email Accounts | $31.96 | N/A | $39.95 | $79.90 | 39.95 | | $7.99 |
| 5 (20MB) web/email Accounts | $39.96 | N/A | $49.95 | $99.90 | 49.95 | | $9.99 |
| Junior Web/email Account | $7.96 | N/A | $9.95 | $11.00 | 9.95 | | $1.99 |
| 5 Email Forwarding Accounts | $0.79 | N/A | $1.07 | $2.99 | 1.19 | | $0.40 |

Fig. 22d

| Product Name | Your Buy Rate | Shared % above Min Retail | Min. Retail Price | Max. Retail Price | Retail Price | Renewal Price | Your Total Profit* |
|---|---|---|---|---|---|---|---|
| IdeaRegister | $52.95 | 25% | $59.95 | $109.99 | 80.00 | | $22.04 |
| EMail / Webmail | | | | | | | |
| Packages | | | | | | | |
| Billed Annually | | | | | | | |
| 1 (20MB) Web/email Account | $15.96 | N/A | $19.95 | $39.90 | 20.00 | | $4.04 |
| 3 (20MB) Web/email Accounts | $31.96 | N/A | $39.95 | $79.90 | 39.95 | | $7.99 |
| 5 (20MB) Web/email Accounts | $39.96 | N/A | $49.95 | $99.90 | 49.95 | | $9.99 |
| Junior Web/email Account | $7.96 | N/A | $9.95 | $11.00 | 9.95 | | $1.99 |
| 5 Email Forwarding Accounts | $0.79 | N/A | $1.07 | $2.99 | 1.19 | | $0.40 |
| Packages with AntiVirus | | | | | | | |
| Billed Annually | | | | | | | |
| 1 Web/email Account -- Plus Virus Detection for WebMail | $18.32 | N/A | $22.90 | $45.80 | 22.90 | | $4.58 |
| 3 Web/email Accounts -- Plus Virus Detection for WebMail | $39.04 | N/A | $48.80 | $97.60 | 48.80 | | $9.76 |
| 5 Web/email Accounts -- Plus Virus Detection for WebMail | $51.76 | N/A | $64.70 | $129.40 | 64.70 | | $12.94 |
| McAfee Virus Protection for WebMail | $3.96 | N/A | $4.95 | $9.90 | 4.95 | | $0.99 |
| Upgrade from Junior to Deluxe Web/email Account | $8.00 | N/A | $10.00 | $20.00 | 10.00 | | $2.00 |
| Add-Ons | | | | | | | |
| Billed Annually | | | | | | | |
| 25 Megabytes Email Storage | $9.60 | N/A | $12.00 | $24.00 | 12.00 | 12.00 | $2.40 |

* Excludes Sales Fees

APPLY ✓  CANCEL ✗

Fig. 22e

Domain Registrations

Start: 04/02/2003  End: 6/02/2003  GO

| Domain | Date | Expires | Years | Receipt |
|---|---|---|---|---|
| CALLIGRAPHYBYALL.COM | 4/25/2003 | NA | 0 | 1025547 |
| THEZIMMERMANAGENCY.COM | 4/25/2003 | NA | 0 | 1022892 |
| THEZIMMERMANAGENCY.COM | 4/25/2003 | NA | 0 | 1011376 |
| AKOLKERTEST4.BIZ | 4/25/2003 | NA | 0 | 1011365 |
| BUYRAITEST1.COM | 4/25/2003 | 4/25/2006 | 3 | 1027490 |
| USBIZNEWTEST.COM | 4/25/2003 | 4/25/2006 | 3 | 1027487 |
| USBIZNEWTEST.US | 4/25/2003 | 4/24/2011 | 8 | 1027487 |
| USBIZNEWTEST.BIZ | 4/24/2003 | 4/24/2004 | 1 | 1027370 |
| PROMOTESTWWD.COM | 4/24/2003 | 4/24/2004 | 1 | 1027370 |
| ZIMBIZNEWPROMO.COM | 4/24/2003 | 4/23/2008 | 5 | 1027374 |
| USNEWPROMO.US | 4/24/2003 | 4/23/2004 | 1 | 1027370 |
| PROMOTESTWWD.US | 4/24/2003 | 4/23/2008 | 5 | 1027370 |
| PROMOTESTWWD.BIZ | 4/24/2003 | 4/23/2007 | 4 | 1027340 |
| ZIMBIZNEWPROMO.US | 4/24/2003 | 4/23/2004 | 1 | 1027340 |
| ZIMBIZNEWPROMO.BIZ | | | | |

Discounted Rate Sheet

| Product | Retail Rate | Discount Rate |
|---|---|---|
| .COM Domain Name Registration - 1 Year | $10.00 | $6.98 |
| .COM Domain Name Registration - 2 Years | $17.50 | $13.96 |
| .COM Domain Name Registration - 3 Years | $43.50 | $20.83 |
| .COM Domain Name Registration - 4 Years | $57.00 | $27.62 |
| .COM Domain Name Registration - 5 Years | $42.75 | $34.14 |
| .COM Domain Name Registration - 6 Years | $82.20 | $40.51 |
| .COM Domain Name Registration - 7 Years | $94.50 | $46.72 |
| .COM Domain Name Registration - 8 Years | $106.00 | $52.78 |
| .COM Domain Name Registration - 9 Years | $116.55 | $58.69 |
| .COM Domain Name Registration - 10 Years | $79.50 | $63.67 |
| .COM Domain Name Transfer - 1 Year | $10.00 | $6.21 |
| .COM Domain Name Renewal - 1 Year | $8.75 | $6.98 |
| .COM Domain Name Renewal - 2 Years | $29.40 | $13.96 |
| .COM Domain Name Renewal - 3 Years | $43.50 | $20.83 |
| .COM Domain Name Renewal - 4 Years | $57.00 | $27.62 |
| .COM Domain Name Renewal - 5 Years | $69.75 | $34.14 |
| .COM Domain Name Renewal - 6 Years | $82.20 | $40.51 |
| .COM Domain Name Renewal - 7 Years | $94.50 | $46.72 |
| .COM Domain Name Renewal - 8 Years | $106.00 | $52.78 |
| .COM Domain Name Renewal - 9 Years | $116.55 | $58.69 |
| .COM Domain Name Renewal - 10 Years | $125.00 | $63.67 |
| Domain Name Forwarding | $11.00 | $0.00 |
| Domain Name Forwarding - Renewal | $0.00 | $0.00 |
| Domain Masking | $6.00 | $4.05 |
| Domain Masking - Renewal | $5.95 | $4.05 |
| .INFO Domain Name Registration - 1 Year | $11.00 | $7.43 |
| .INFO Domain Name Registration - 2 Years | $25.90 | $14.86 |
| .INFO Domain Name Registration - 3 Years | $38.85 | $22.25 |
| .INFO Domain Name Registration - 4 Years | $72.00 | $29.62 |
| .INFO Domain Name Registration - 5 Years | $64.75 | $36.90 |
| .INFO Domain Name Registration - 6 Years | $77.70 | $44.12 |
| .INFO Domain Name Registration - 7 Years | $90.65 | $51.30 |
| .INFO Domain Name Registration - 8 Years | $103.60 | $58.42 |
| .INFO Domain Name Registration - 9 Years | $116.55 | $65.49 |
| .INFO Domain Name Registration - 10 Years | $129.50 | $72.26 |

Fig. 29

Pending Transfer Report

| Domain Name | Initiation Date | Last Name | First Name | Receipt | Status |
|---|---|---|---|---|---|
| CALLIGRAPHYBYALI.COM | 4/25/2003 | Zim | Mike | 1025547 | mismatch at registrar |
| THEZIMMERMANAGENCY.COM | 4/25/2003 | Zimmerman | Mike | 1022892 | awaiting an accept or decline |
| AKOLKERTEST4.BIZ | 4/25/2003 | Kolker | Jody | 1011365 | awaiting an accept or decline |
| THEZIMMERMANAGENCY.COM | 4/25/2003 | Kolker | Jody | 1011376 | awaiting an accept or decline |

TURNKEY RESELLER PROGRAM FOR REGISTERING DOMAIN NAMES

CROSS REFERENCE TO RELATED PATENT APPLICATIONS

This patent application is related to the following patent application concurrently filed herewith, also assigned to The Go Daddy Group, Inc.: U.S. patent application Ser. No. 10/616,005, "Reseller Program for Registering Domain Names Through Resellers' Web Sites"

FIELD OF THE INVENTION

The present invention relates to systems and processes for Customers to register domain names with a Registrar, and more specifically, to systems and processes for Resellers to guide Customers to a Registrar, either through a Reseller web site or through advertisement efforts by the Reseller.

BACKGROUND OF THE INVENTION

The Internet is a worldwide network of computers and computer networks arranged to allow the easy and robust exchange of information between the users of the computers. Hundreds of millions of people around the world have access to computers connected to the Internet via one of the hundreds of Internet Service Providers (ISPs). Content providers place multimedia information, i.e. graphics and sounds, and other forms of data at specific locations on the Internet referred to as web sites that are typically hosted by an ISP. Each web site may have one or more web pages. The combination of all the web sites and their corresponding web pages on the Internet is generally known as the world wide web (web or www).

Web sites may be created using HyperText Markup Language (HTML) to generate a standard set of tags that define how the web pages for the web site will be displayed. Users of the Internet may access content providers' web sites using a software package known as a browser, such as Microsoft Internet Explorer or Netscape Navigator. After the browser has located a desired webpage, it requests and receives information from the webpage, typically in the form of an HTML document, and then displays the webpage's content for the user. The user may thereafter view other web pages at the same web site or move to an entirely different web site using the browser.

Browsers are able to locate specific web sites because each web site, resource and computer on the Internet has a unique Internet Protocol (IP) address. Each IP address is a 32 bit binary number, but is typically shown in dotted decimal notion, e.g. 192.145.68.112, to improve human readability. However, IP addresses, even in dotted decimal notation, are difficult to remember and use by people. Uniform Resource Locators (hereafter "URL") are much easier to remember and may be used to point to any computer, directory or file on the Internet. A browser is able to access a web site on the Internet through the use of a URL. The URL may include a Hypertext Transfer Protocol (HTTP) request combined with the web site's internet address, also known as the web site's domain name. An example of a URL with a HTTP request and domain name is:

http://www.companyname.com

In this example, the "http" identifies the URL as a HTTP request and the "www.companyname.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, .org, .us, .biz, etc.). Domain names created in this fashion are much easier to remember and use than their corresponding IP addresses. The Internet Corporation for Assigned Names & Numbers (ICANN) approves all TLDs and delegates the responsibility to a particular organization (hereinafter Registry) for maintaining an authoritative source for the registered domain names within a TLD and their corresponding IP addresses. There is one organization, or Registry, for each of the ICANN approved TLDs. For certain TLDs, e.g. .biz, .info, us, the Registry is also the authoritative source for contact information related to the domain name. For other TLDs, e.g. .com, .ws, org, .net, a Registrar is the authoritative source for the contact information related to the domain name. All domain names are organized through a central domain name Shared Registration System (SRS) based on their TLD.

A process for registering a desired domain name is illustrated in FIG. 1. The communications shown here and in other figures of the drawings are typically communications via the internet, but could be direct LAN or WAN connections, telephone lines, cell phone links, RF or fiber optics connections among others. Customer 100, Registry 102a, and Registrar 101a are typically entities having access to computer installations equipped for internet communications.

The process for registering a domain name with a particular Registry 102a allows a Customer 100 to use an ICANN-accredited Registrar 101a. For example if John Doe wishes to register the domain name "JohnDoe.com", John Doe may initially verify whether the desired domain name is or is not available by contacting a Registrar 101a. The Customer 100 may make this contact using the Registrar web site 101b and typing the desired domain name into a field in the Registrar web site 101b created for this purpose. Upon receiving the request from the Customer 100, the Registrar 101a may ascertain whether "JohnDoe.com" has already been registered by checking the SRS database of the Registry 102a associated with the TLD of the domain name. The results of the search may then be displayed on the web site to thereby notify the Customer 100 of the availability of the domain name. If the domain name is available, the Customer 100 may proceed with the registration process. Otherwise, the Customer 100 may have to keep selecting alternative domain names until an available domain name is found.

After the Customer 100 submits the registration request, the Registrar web site 101b transmits certain information to the Registry web site 102b regarding both the Registrar 101a and the Customer 100 who will, upon completion of the registration process, be identified as the "registrant" of the domain that is to be officially registered with the Registry 102a. The Registry 102a adds the domain name, the registrant's name and identification of the Registrar 101a to the SRS database kept by the Registry web site 102b which then becomes publicly available in the Registry's WHOIS database.

A Registrar 101a is paid by their Customers 100 for registering the Customers' 100 desired domain names. The revenue of Registrars 101a is thus based in large measure on their traffic of Customers 100 and the number of domain names they are able to register for the Customers 100. However, competition in the domain name registration market has created obstacles to increasing the number of yearly registered domain names by a Registrar 101a. Registrars 101a are thus searching for new ways to increase the number of domain names they are able to register each year. One method for increasing the number of Customers 100 is for the Registrar 101*a* to advertise on third party web sites. However, applicants have noticed that the owners of other web sites are often reluctant to advertise for a Registrar 101*a* because they do not want their Customers 100 to leave their web sites and to go to the Registrar web site 101*b* to register domain names.

There is thus a need to increase revenue for Registrars 101*a* using new systems and processes that overcome the limitations of current revenue generating techniques. Specifically, there is a need for increasing the number of Customers 100 that register domain names or purchase other products and services through a Registrar 101*a*. There is also a need for a method for Customers 100 to purchase products and services with a Registrar 101*a* starting from a third party web site that encourages Customers 100 to continue shopping at the third party web site after completing the purchases from the registrar web site 101*b*.

SUMMARY OF THE INVENTION

The present invention addresses these needs by providing improved systems and processes for registering domain names with an accredited Registry via an accredited Registrar. There are two main embodiments of the invention that incorporate Resellers into the process of allowing Customers to register domain names. The Resellers increase the number of domain names registered by Registrar by increasing the number of Customers that use the Registrar's services.

The first embodiment, which may be referred to as a turnkey reseller program, includes Resellers that are registered into a reseller program. The Resellers do not necessarily have to have their own web site to participate in the turnkey reseller program. The Resellers will typically advertise, often with the use of a link to the registrar web site, either on their own web site or on other web sites. The Resellers may also use other techniques, such as search engines or traditional advertising media, of directing Customers that want to register domain names or purchase other products and services, to a registrar web site. The registrar web site is preferably designed to accept the information and payment from a Customer necessary for the products or services. Typically, the services will be registering one or more domain names for the Customer with a Registry. The registrar web site may detect the Reseller that directed the Customer to the registrar web site and compensate the Reseller based on the purchases made by the Customer. The registrar web site may have a custom layout created by each Reseller that their Customers will see on the web page. The custom layout may include advertisement banners, pricing information or other information specifically selected by the Reseller. The Reseller may join and supply the necessary information for the turnkey registration program at a turnkey administration web site.

The second embodiment also includes Resellers that are registered into a reseller program. This reseller program may be referred to as an Application Program Interface (API) reseller program. While this embodiment is named after a particular Internet communication protocol, i.e. API, other methods and protocols of exchanging information may also be used. In this embodiment, the Resellers have their own web sites visited by their own Customers. The Resellers may wish to sell domain name registration services to their Customers (or other products or services offered by the Registrar), but may not want to become Registrars and may not want to direct their Customers to another web site, i.e., away from their web site. To accomplish this, the Resellers may accept the necessary information, desired domain name and payment from the Customers and communicate the information themselves to a registrar web site. The transfer of information may be done automatically using automated background software processes using known internet communication techniques. In a preferred embodiment, the reseller web site and registrar web site communicate via an application program interface (API) or via an extensible provisioning protocol (EPP). The Registrar web site may register the desired domain names with a Registry for the Resellers' Customers and receive payment from the Reseller for the services provided by the Registrar. If the registration process was unsuccessful, possibly because the domain name was already registered, the status information on the registration process may be communicated to the Reseller who may then inform the Customer. Another method that may be used is for the Reseller to provide links to a registrar web site. The Customer may purchase various products and services from the registrar web site. After completing the purchases, other links may be provided to the Customer to return the Customer to the reseller web site. The links may be done in such a way so that the reseller web site and registrar web site appear as a single virtual web site to the Customer. In fact, the Reseller and Registrar may agree on any number of different methods of exchanging information with each other combined with providing links to the Customer to transfer the Customer between the web sites. In a preferred embodiment, the exchange of information and links between the web sites act in such a way that it appears to the Customer that they have always remained in the reseller web site.

Additional advantages and aspects of the present invention will become apparent in the following detailed description and claims.

BRIEF DESCRIPTION OF THE DRAWINGS

FIG. 7 is an example of a screen shot to a Contact Information web page according to a first embodiment of the invention;

FIG. 19 is an example of a screen shot to a Company Info web page according to a first embodiment of the invention;

FIG. 21a is an example of a first screen shot to a Product Offering web page according to a first embodiment of the invention;

FIG. 21b is an example of a second screen shot to a Product Offering web page according to a first embodiment of the invention;

FIG. 21c is an example of a third screen shot to a Product Offering web page according to a first embodiment of the invention;

FIG. 22c is an example of a third screen shot to a Product Pricing web page according to a first embodiment of the invention;

FIG. 22d is an example of a fourth screen shot to a Product Pricing web page according to a first embodiment of the invention;

FIG. 22e is an example of a fifth screen shot to a Product Pricing web page according to a first embodiment of the invention;

FIG. 27 is an example of a screen shot to a Domain Registrations web page according to a first embodiment of the invention;

FIG. 28 is an example of a screen shot to a Domain Lookup web page according to a first embodiment of the invention;

FIG. 29 is an example of a screen shot to a Discounted Rate Sheet web page according to a first embodiment of the invention;

FIG. 32 is an example of a screen shot to a Pending Transfer Report web page according to a first embodiment of the invention;

FIG. 35 is an example of a screen shot to Contact Information web page according to a second embodiment of the invention;

FIG. 36a is an example of a first screen shot to an Account Access web page according to a second embodiment of the invention;

FIG. 41b is an example of a second screen shot to a Links to Your Storefront web page according to a second embodiment of the invention;

FIG. 57 is an example of a screen shot to a Pending Transfer Report web page according to a second embodiment of the invention.

DETAILED DESCRIPTION OF THE PREFERRED EMBODIMENTS

Figure 1:
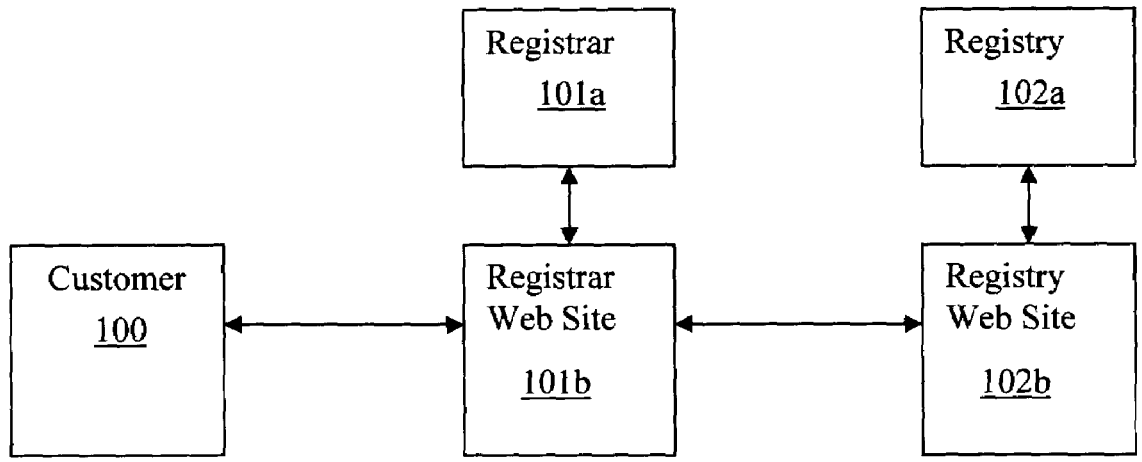
FIG. 1 is a block diagram of a prior art system for a Customer to register a domain name with a Registry via a Registrar.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

The reseller programs utilize Resellers to assist in increasing the number of Customers for the Registrar in exchange for compensation to the Resellers. The present invention has two primary embodiments of a reseller program. Both embodiments increase the revenue of a Registrar by increasing the number of Customers that register domain names or purchase other services with the Registrar.

The first embodiment, which may be referred to as a "turnkey reseller program", allows Resellers to utilize a web site, i.e. the registrar web site, hosted and run by a Registrar. This removes the burden from the Reseller of having to operate and maintain a web site. A Reseller may customize the Registrar web site and then, using various advertising methods, direct Customers to the Registrar web site. It should be noted that while the Registrar web site may be customized by each Reseller so as to appear as a web site specific to the Reseller, a single Registrar web site may advantageously be used by all the Resellers.

The second embodiment, which may be referred to as an "API reseller program", allows Resellers to host and run their own web site while still offering and selling the products and services of the Registrar. This allows Resellers to sell from their reseller web sites both their products and services and the Registrar's products and services. The reseller web sites may communicate and coordinate with the registrar web site using known Internet communication protocols and by using links between the reseller and registrar web site thereby creating a virtual web site. In a preferred embodiment, the communications and links between the reseller web site and the registrar web site are transparent to the Customers. Both embodiments will be discussed in greater detail below.

Turnkey Reseller Program

Figure 2:
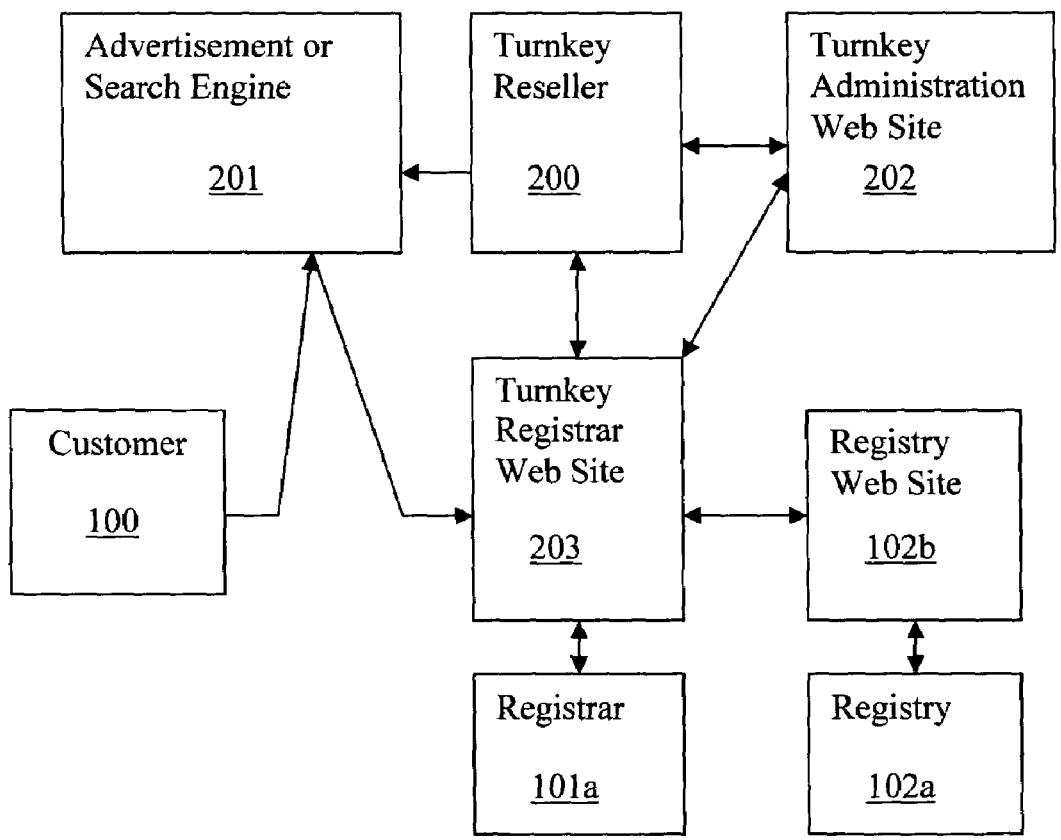
FIG. 2 is a block diagram of a first reseller program according to an embodiment of the invention.
Figure 3:
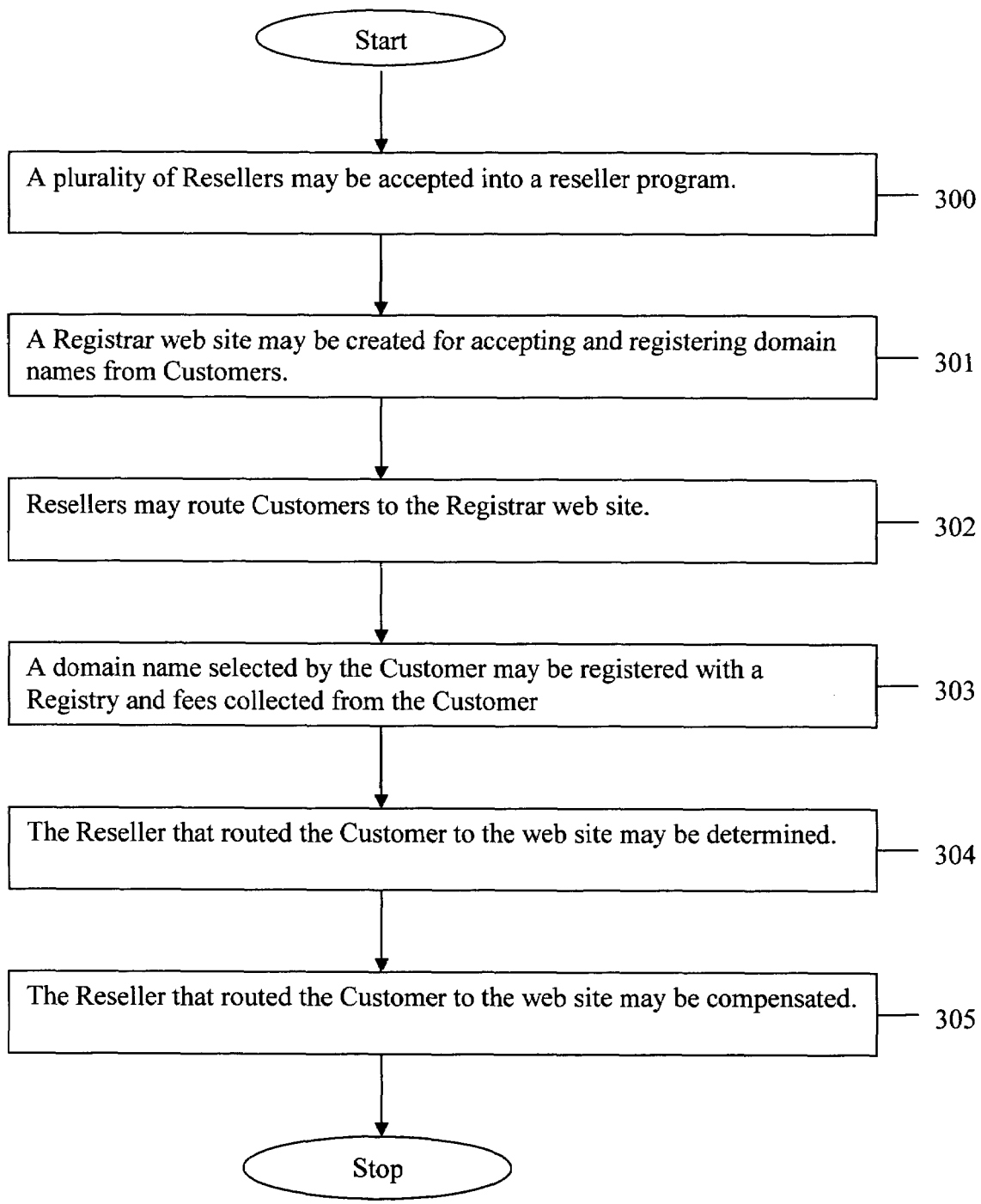
FIG. 3 is a flowchart of a process using the reseller program illustrated in FIG. 2.

A first embodiment of a reseller program of the present invention will be described with reference to the block diagram in FIG. 2 and the flowchart in FIG. 3. The illustrated turnkey reseller program is designed to increase the number of Customers 100 that register domain names with a Registrar 101a, thereby increasing the revenue of the Registrar 101a. The turnkey reseller program accepts turnkey Resellers 200 who may be individuals or corporations, into the turnkey reseller program. (Step 300) The Registrar 101a may advertise on third party web sites, computer magazines or traditional advertising media to attract turnkey Resellers 200 to its turnkey reseller program.

Figure 33A:
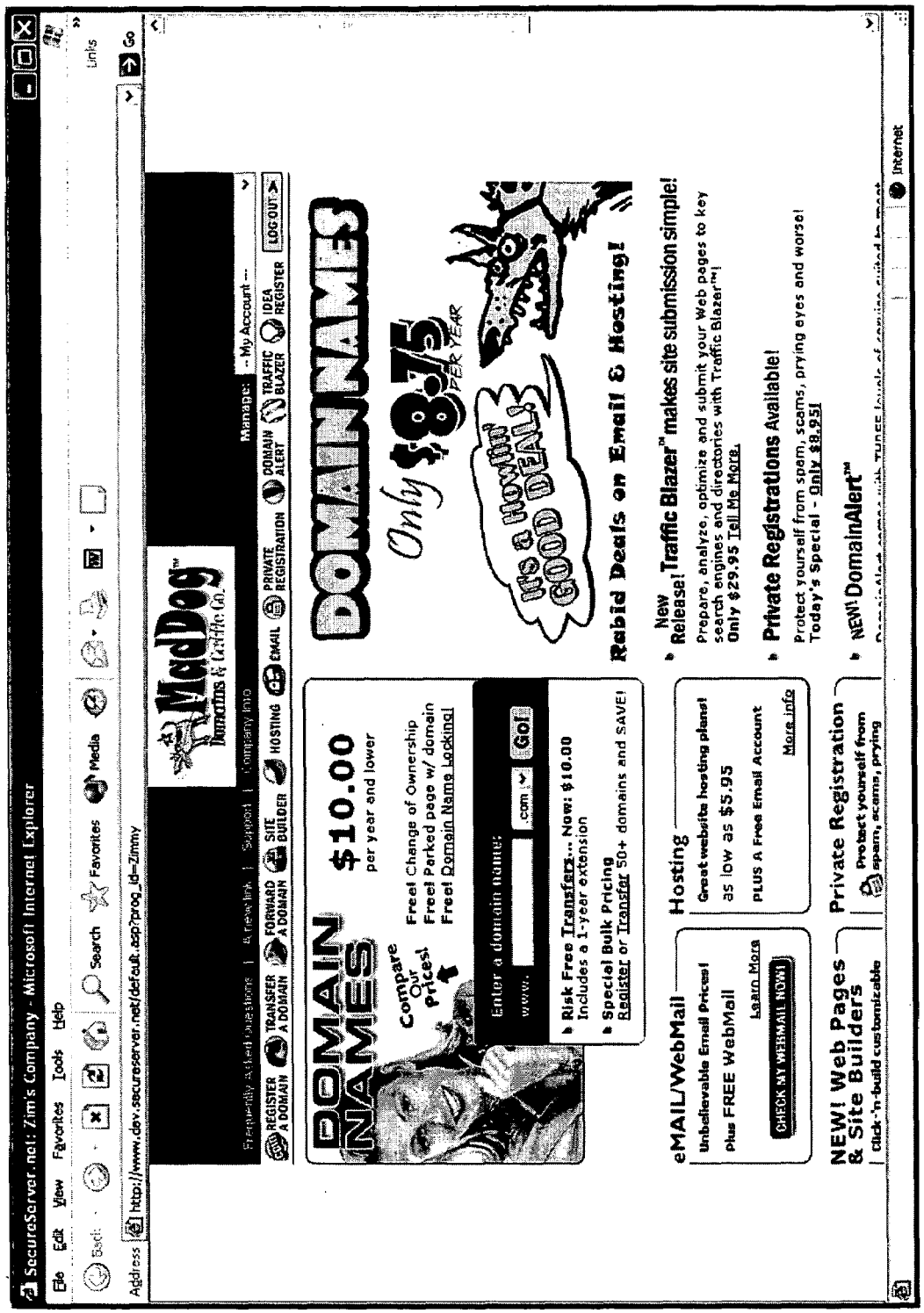
FIG. 33a is an example of a first screen shot to a home web page of a Registrar web site.
Figure 33B:
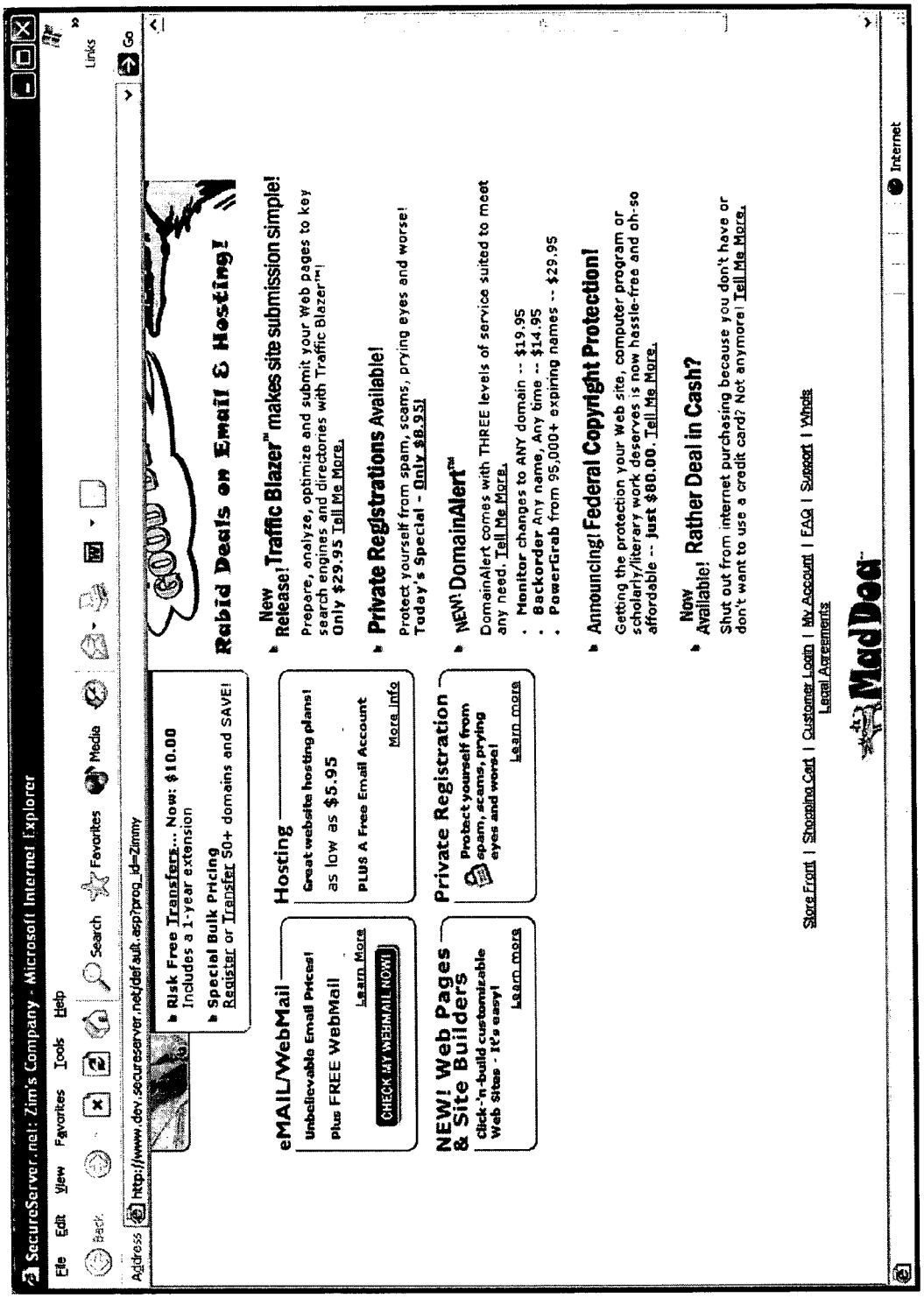
FIG. 33b is an example of a second screen shot to a home web page of a Registrar web site.

A turnkey registrar web site 203 may be created for allowing Customers 100 to purchase products and services, such as registering one or more domain names. (Step 301) The Registrar web site 203 may advantageously be created for access over the Internet by a traditional internet browser so that information may be easily read from and entered into the Registrar web site 203. This allows the Registrar web site 203 to accept desired domain names from the Customer 100, display the availability of the desired domain names, gather contact information from the Customer 100, register available domain names with an appropriate Registry web site 102b and accept payments from the Customers 100. An exemplary Turnkey Registrar web site 203 according to this embodiment may be found on the Internet at www.domainspricedright.com. FIG. 33 illustrates another example of a Turnkey Registrar web site 203.

The benefit of the turnkey reseller program to the Registrar 101a is that the Resellers 200 in the program actively guide and direct Customers 100 to the Registrar web site 203 increasing traffic and thereby increasing the Registrar's revenue. (Step 302) The methods employed by the Resellers 200 to guide Customers 100 to the Registrar web site 203 are limited only by the imagination and creativity of the Resellers 200. Typical methods used by Resellers 200 are to place advertisements or links in third party web sites, to place the Registrar web site 203 in one or more Internet search engines or by word of mouth.

Customers 100 directed to the Registrar web site 203 through the actions of a Reseller 200 may purchase products and services, such as registering available domain names, and pay fees at the Registrar web site 203. (Step 303) The Reseller 200 that guided the Customer 100 to the Registrar web site 203 may be determined (step 304) so that the Reseller 200 may be compensated (step 305) based on either the number of Customers 100 guided to the Registrar web site 203 or on the products and services purchases by the Customers 100. The Reseller 200 credited with guiding a particular Customer 100 to the Registrar web site 203 may be determined, for example, by the URL used by the Customer 100 in accessing the Registrar web site 203. Each Reseller 200 may use a different URL in this system to guide the Customers 100 to the Registrar web site 203. Custom features may be added to the Registrar web site 203 based on the particular account information of the Reseller 200 or based on the particular URL used by the Customer 100. This allows every Reseller 200 in the reseller program to make the Registrar web site 203 look like a custom web site of the Reseller 200.

Figure 6:
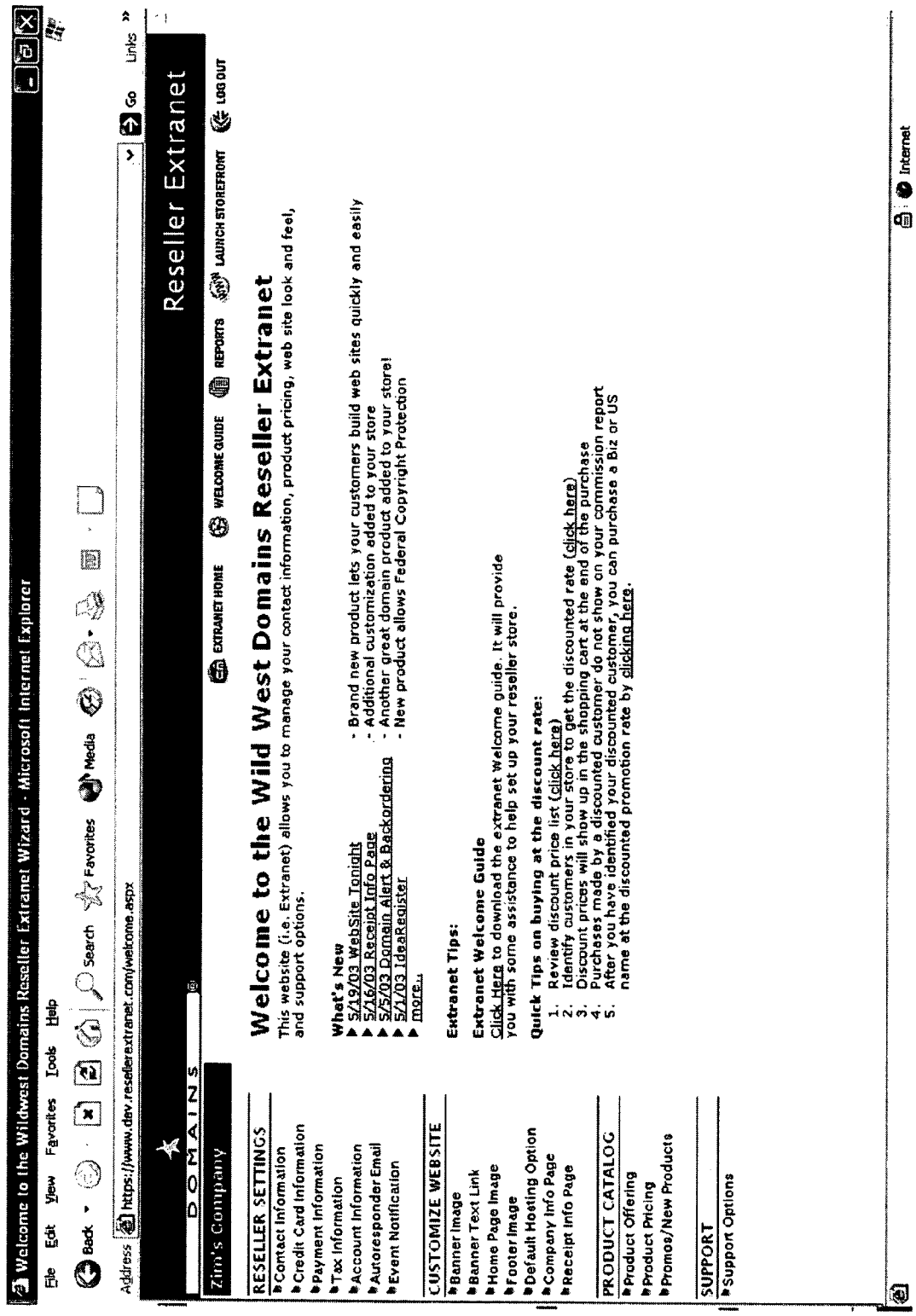
FIG. 6 is an example of a screen shot to a Welcome web page according to a first embodiment of the invention.

The Resellers 200 are preferably directed to an administration web site 202 to be registered into the reseller program. An example of a suitable administration web site may be found at www.resellerextranet.com. A sample home page, or welcome page, for the administration web site 202 is shown in FIG. 6. The welcome page is preferably designed to allow Resellers 200 to easily join the turnkey reseller program and to customize the Turnkey Registrar web site 203. The welcome page preferably has links to all the other web pages in the Registrar web site 203. This allows Resellers 200 to quickly and easily navigate throughout the administration web site 202.

Figure 7:
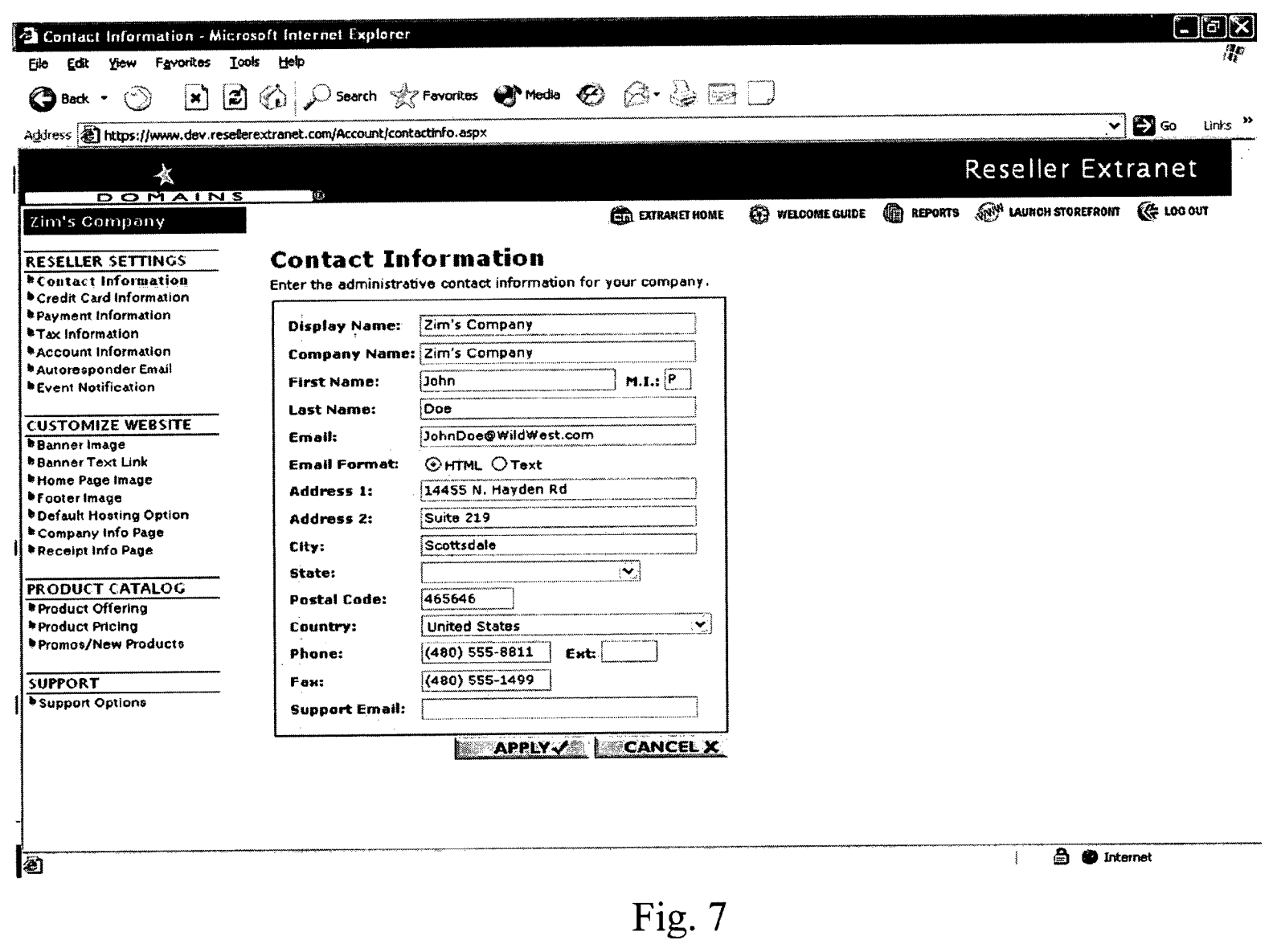

As part of joining the reseller program, Resellers 200 will typically need to provide contact information to the Registrar 101a. FIG. 7 shows a sample contact information web page which may be created for this purpose. The Resellers 200 may be asked to provide one or more of the following: a display name (dba name), company name, first name, middle name or initial, last name, e-mail address, email format (HTML or text), mailing address, phone number, fax number and a support email address. The contact information allows the Registrar 101a to contact Resellers 200 regarding any problems that may arise during the Resellers 200 participation in the turnkey reseller program.

Figure 8:
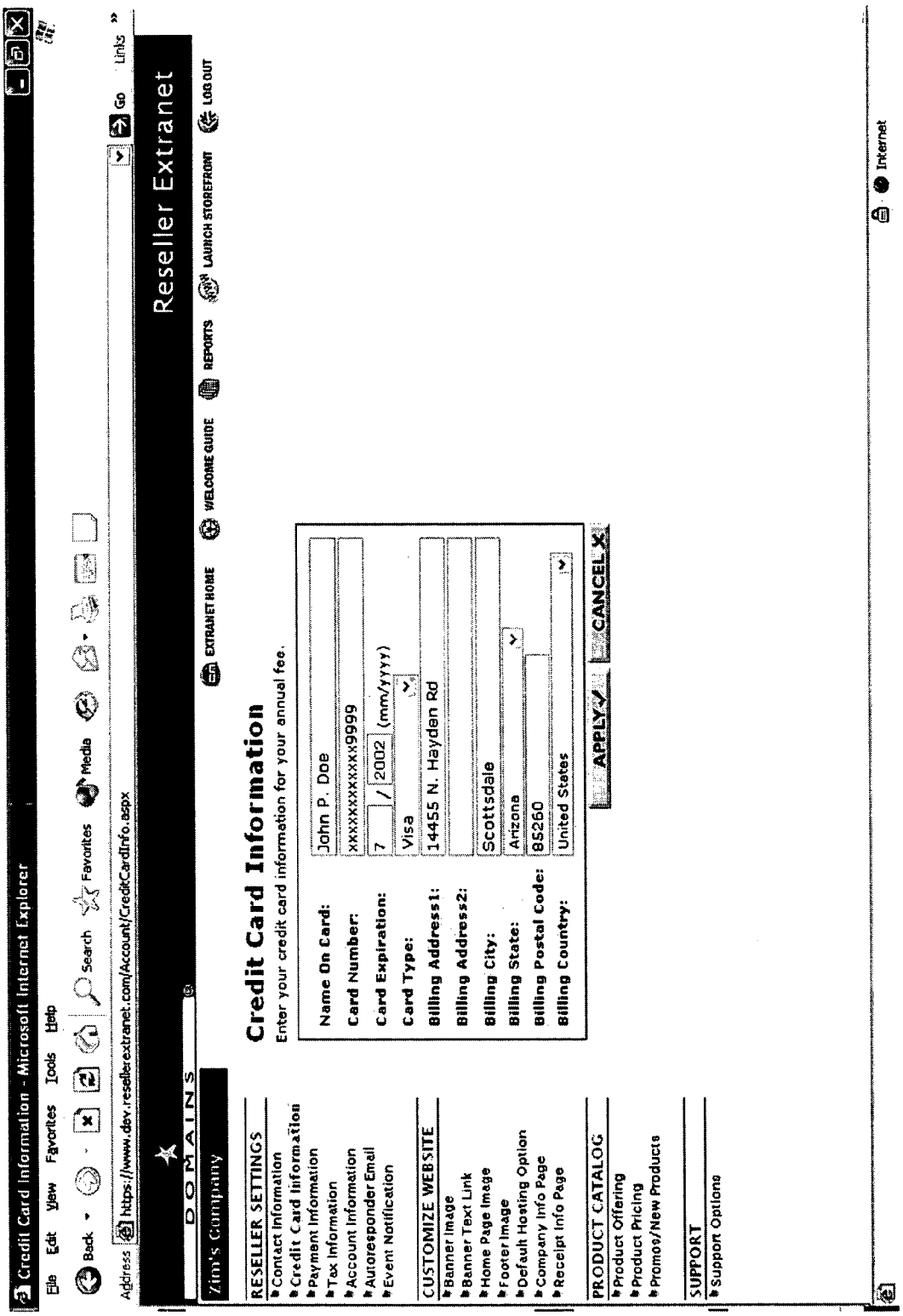
FIG. 8 is an example of a screen shot to a Credit Card Information web page according to a first embodiment of the invention.

Resellers 200 may be asked to periodically pay a fee for membership in the reseller program. These fees may be paid by a credit card if desired. FIG. 8 illustrates an example web page for facilitating the payment of these fees by the Resellers 200 to the Registrar 101a with a credit card. Payment by credit card allows the Registrar 101a to maintain the credit card information in a secure database and automatically deduct fees authorized by Resellers 200 in a highly efficient manner.

Figure 9:
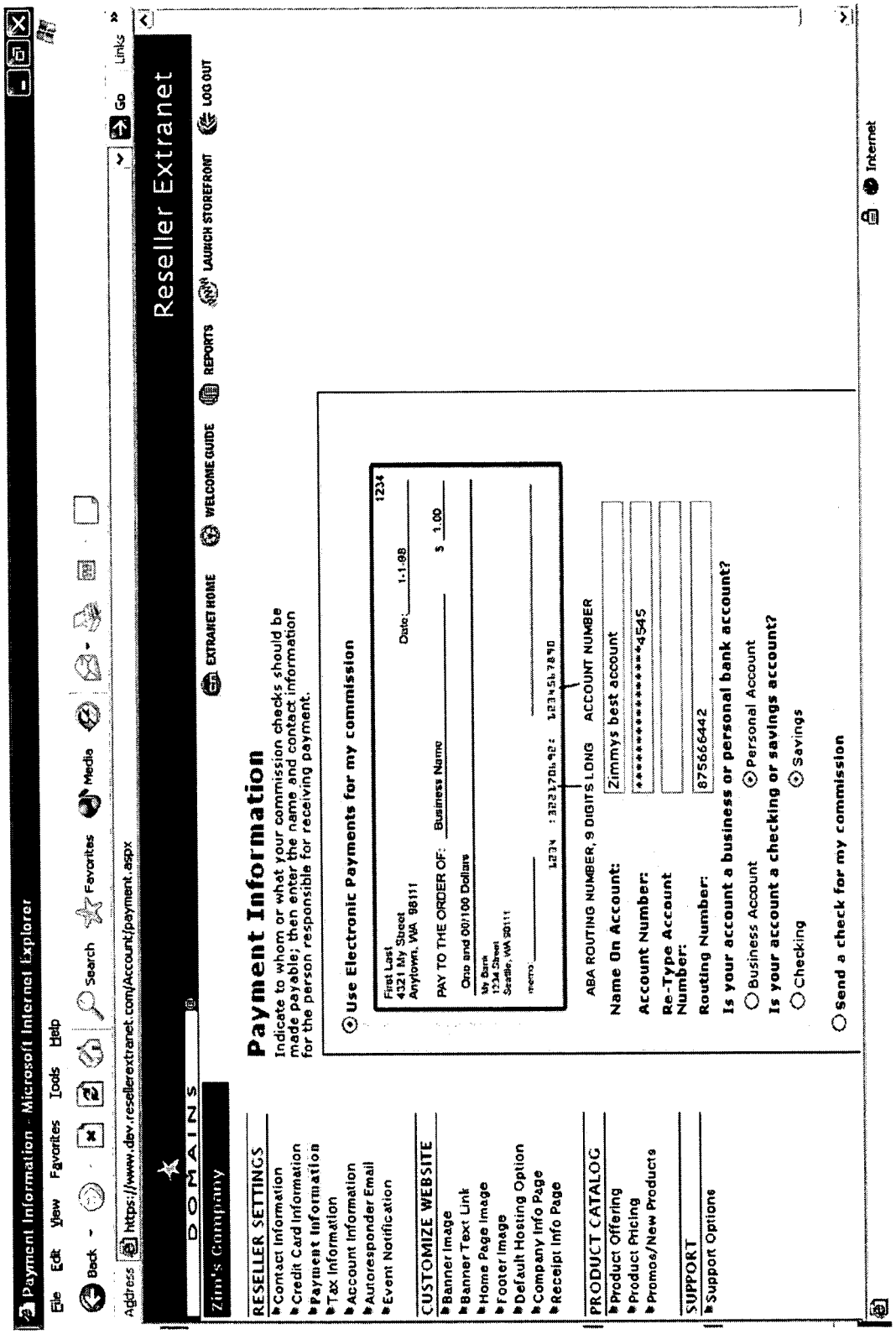
FIG. 9 is an example of a screen shot to a Payment Information web page according to a first embodiment of the invention.

Resellers 200 will typically want to inform the Registrar 101a of the location to send or transmit the Resellers' commission payments. Resellers 200 may request commission checks to be mailed to a particular address or the Resellers 200 may request electronic payment into an account. FIG. 9 shows a sample web page that is configured to accept payment information from Resellers 200 allowing the Resellers to direct where their compensation is to be sent or transmitted.

Figure 10:
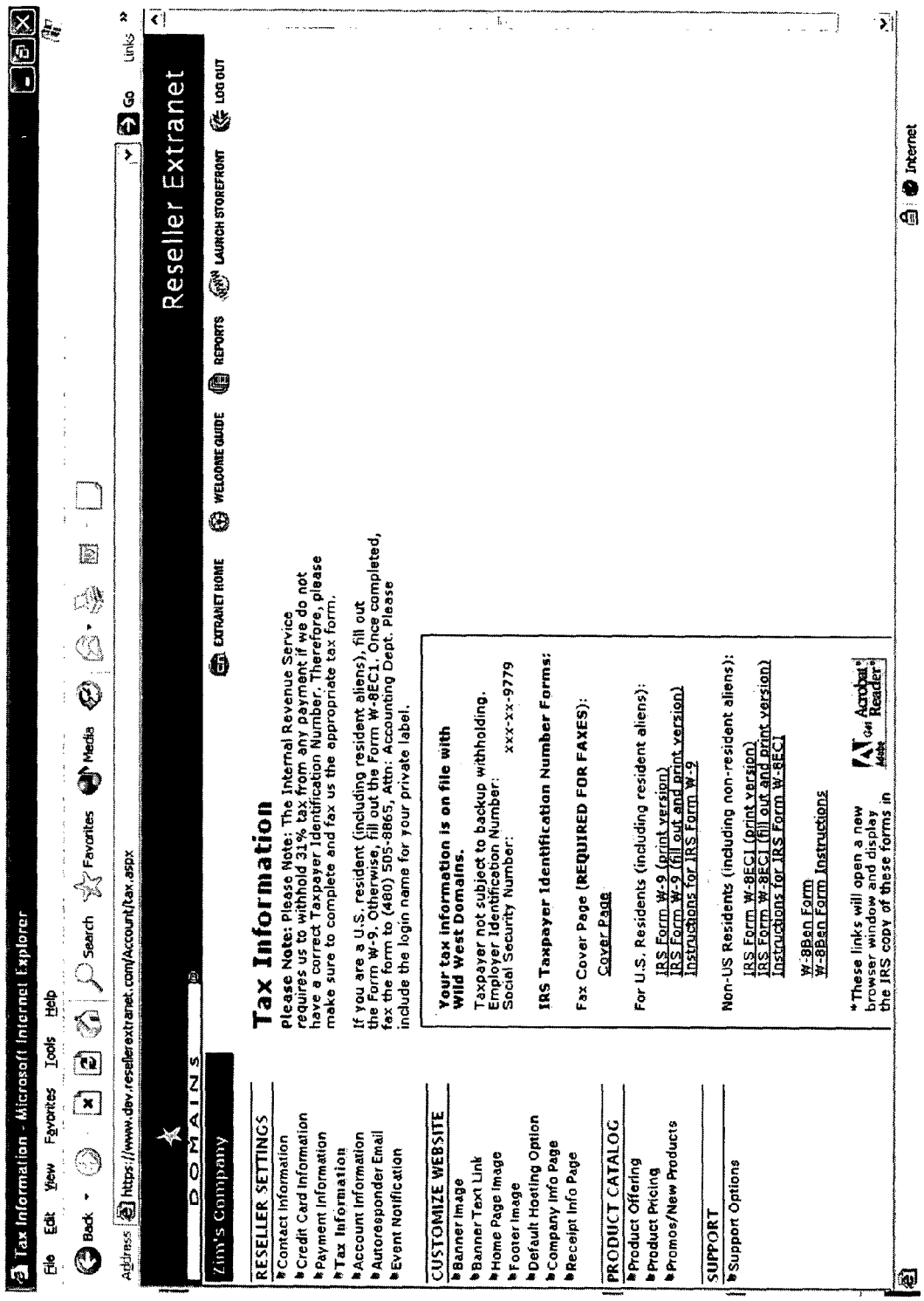
FIG. 10 is an example of a screen shot to a Tax Information web page according to a first embodiment of the invention.

Resellers 200 may desire to disclose to the Registrar 101a their taxpayer identification number, or other tax payer information, to avoid the Registrar 101a from having to withhold taxes from the Resellers' commissions as would be required by US tax laws. The tax information may either be, for example, provided directly into the administration web site or the information may be faxed to the Registrar 101a, preferable on a form provided by the administration web site 202. FIG. 10 shows a sample web page for collecting tax information.

Figure 11:
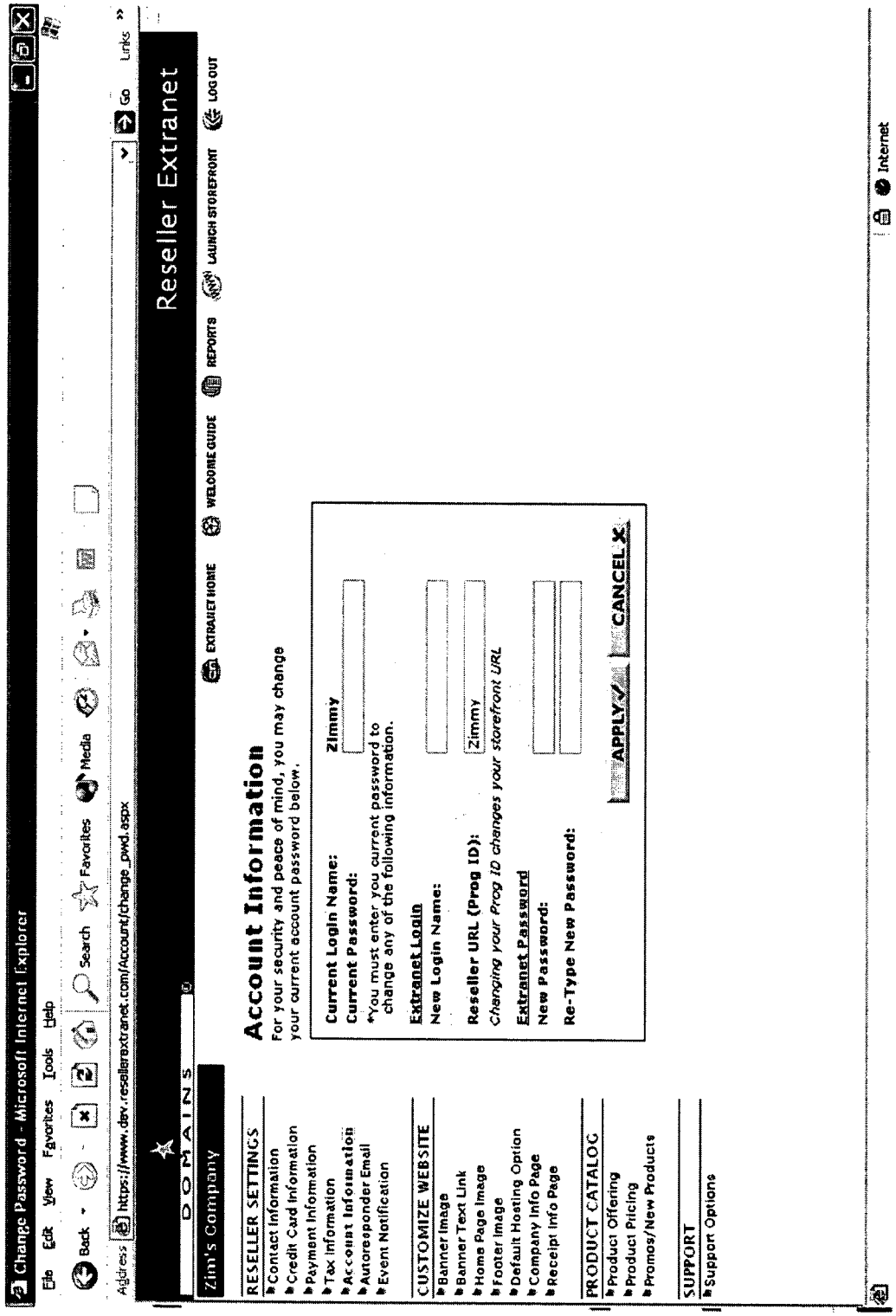
FIG. 11 is an example of a screen shot to an Account Information web page according to a first embodiment of the invention.

Resellers 200 may desire to change their reseller login name and password used to enter the administration web site 202. FIG. 11 shows a web page in the administration web site 202 suitable for allowing Resellers 200 to update this information. This allows Resellers 200 that wish to change their login name or that need to replace a compromised password to do so. In a preferred embodiment, the previous password needs to be entered before changing either the login name or the password.

Figure 12:
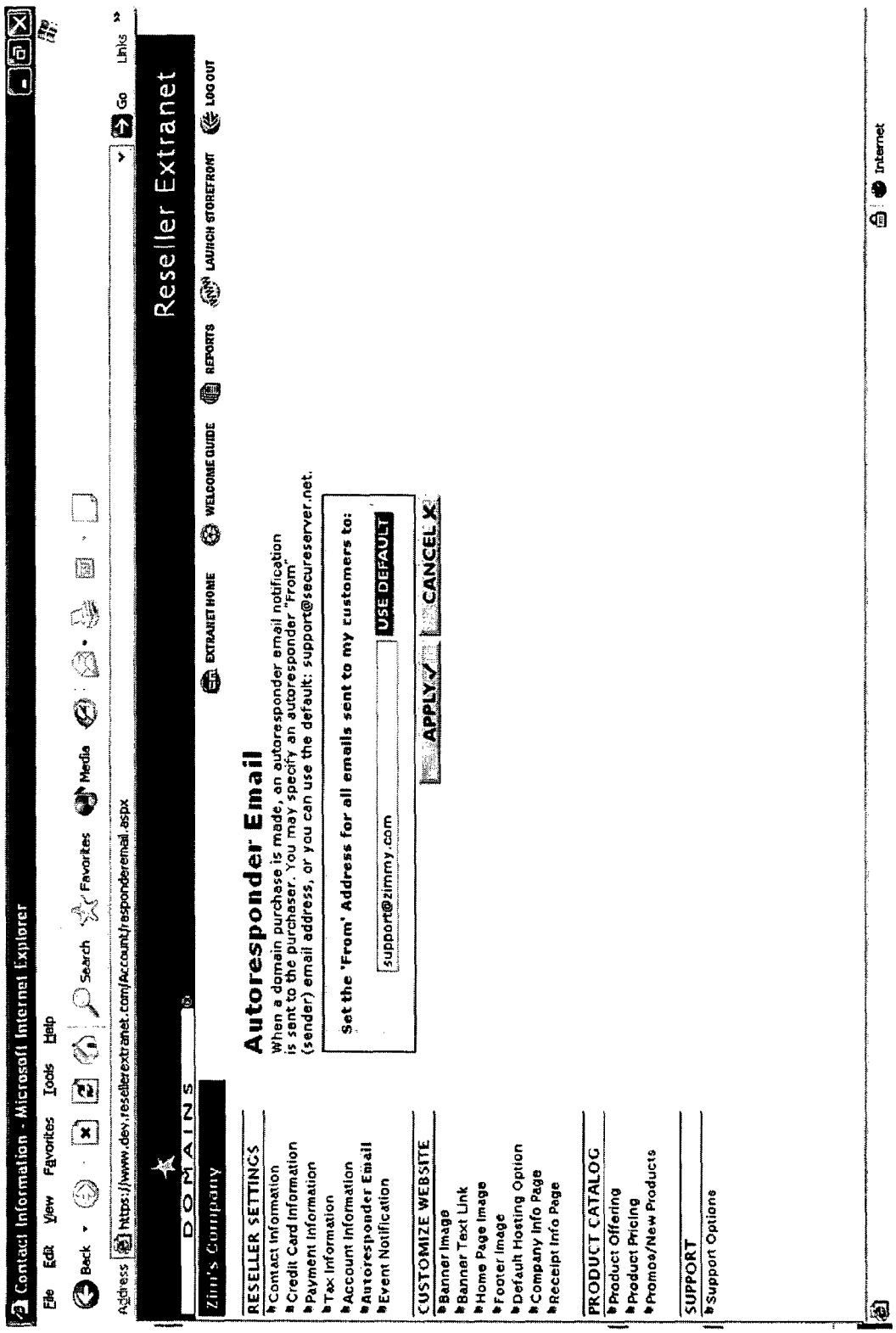
FIG. 12 is an example of a screen shot to an Autoresponder Email web page according to a first embodiment of the invention.

When a domain name or other service is purchased from the registrar web site 203, an autoresponder email may be used to notify the Customer 100 of the status of their purchase. The email may have a "From" address indicating, for example, that the email came from either the Reseller 200 or the Registrar 101a. This allows Resellers 200 who desire to provide customer support services to use their email address and also allows Resellers 200 to use the Registrar's email address if the Registrar 101a is to provide customer support services. A suitable web page for entering the desired autoresponder email address is shown in FIG. 12.

Figure 13:
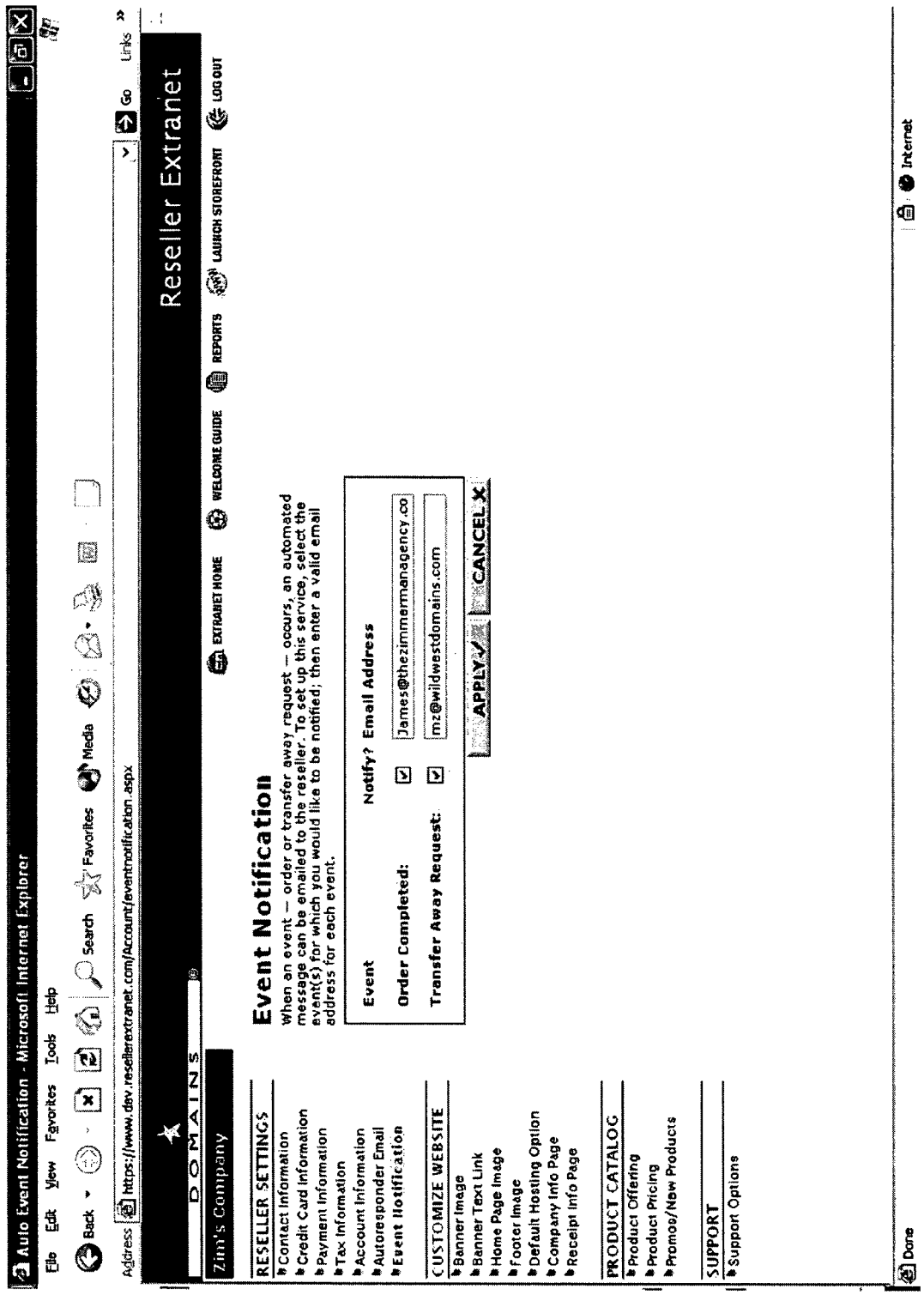
FIG. 13 is an example of a screen shot to an Event Notification web page according to a first embodiment of the invention.
Figure 14:
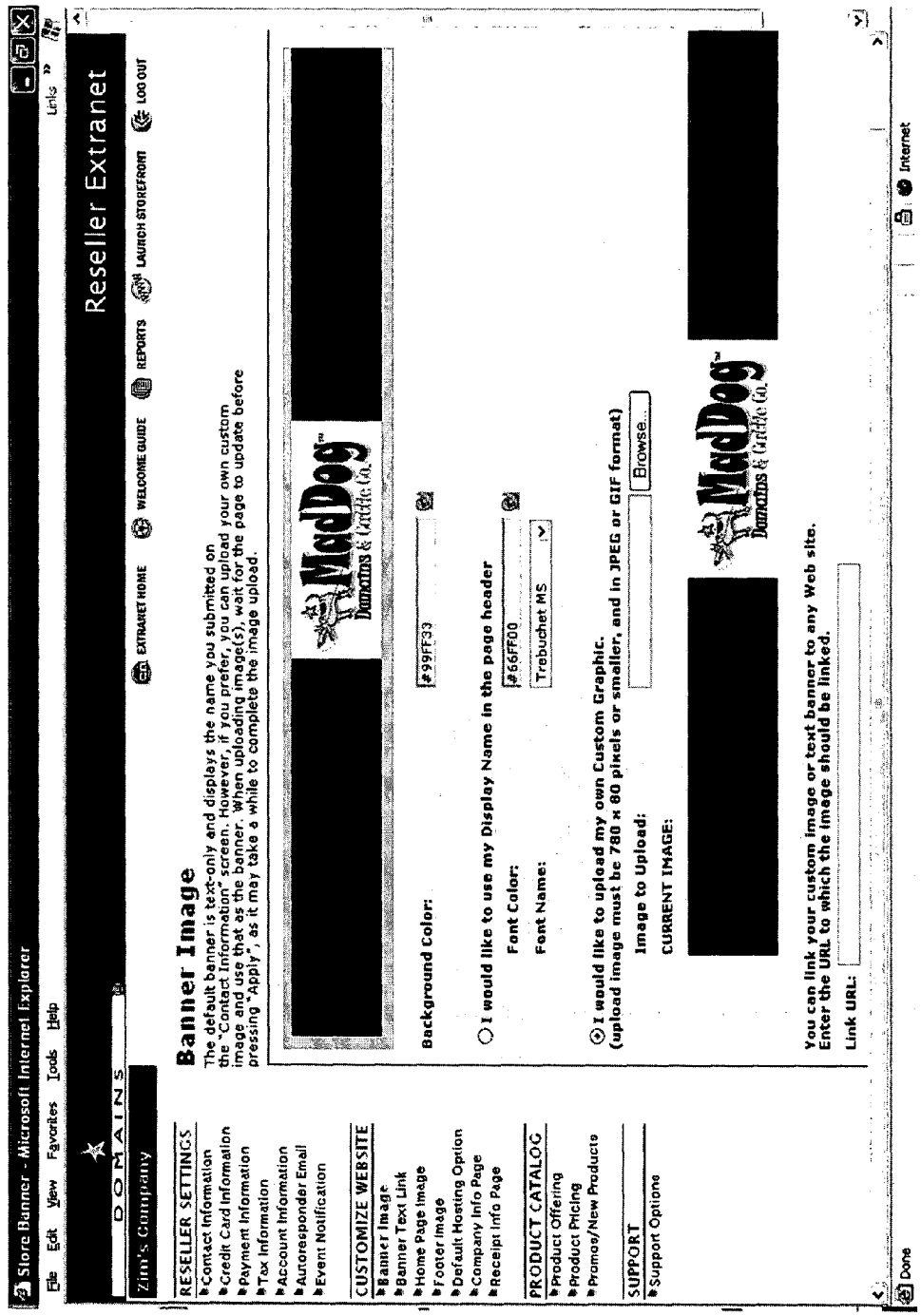
FIG. 14 is an example of a screen shot to a Banner Image web page according to a first embodiment of the invention.

Resellers 200 may desire to know as soon as possible when particular "events" have occurred on the registrar web site 203. Typically, an event will correspond to a change in the commission the Reseller 200 has earned. For example, an event may be related to a purchase or cancellation of a product or service. Each Resellers 200 is preferably able to select events that, upon their occurrence, cause a notification to be sent to the Reseller 200. The notification may be sent via an email to an address selected by the Reseller 200. A web page similar to the web page shown in FIG. 13 may be used to select events and corresponding email addresses for notification of a Reseller 200.

In a preferred embodiment of the invention, one Registrar web site 203 may be used to handle a plurality of different Resellers 200 and their associated plurality of Customers 100. However, each Reseller 200 will typically want the registrar web site 203 to appear to the Customers 100 as if the registrar web site 203 belonged exclusively to that Reseller 200. To accomplish this, the registrar web site 203 may be created to determine the Reseller 200 associated with each Customer 100 that enters the registrar web site 203 and display for the Customer 100 custom features selected by their Reseller 200. The registrar web site 203 may determine the Reseller 200 associated with a particular Customer 100 in any number of different ways. For example, a different URL may be assigned to each Reseller 200, but all the URLs lead to the same registrar web site 203. The registrar web site 203 may then examine the URL and determine the Reseller 200 for that Customer 100 and then interact with the Customer 100 in a manner selected by the Reseller 200.

Unique graphics and text may be selected by Resellers 200 to create the appearance of a registrar web site 203 belonging exclusively to a particular Reseller 200. For example, a custom banner, home page image and footer image may be selected by each Reseller 200. Unique graphics on a web page will typically enhance the visual appearance of the web page, thereby improving the shopping experience of each Customer 100 and leading the Customers 100 into making more purchases at the registrar web site 203. Resellers 200 may select from default images provided by the administration web site 202, but the Resellers 200 preferably provide their own distinctive graphics. The graphics may have different colors for fonts and background and text for each Reseller 200. A web pages, as shown in FIG. 14, FIGS. 16a and 16b, and FIG. 17 may be used by each Reseller 200 to easily select the desired features for their banner, home page image or footer image respectively.

Figure 15:
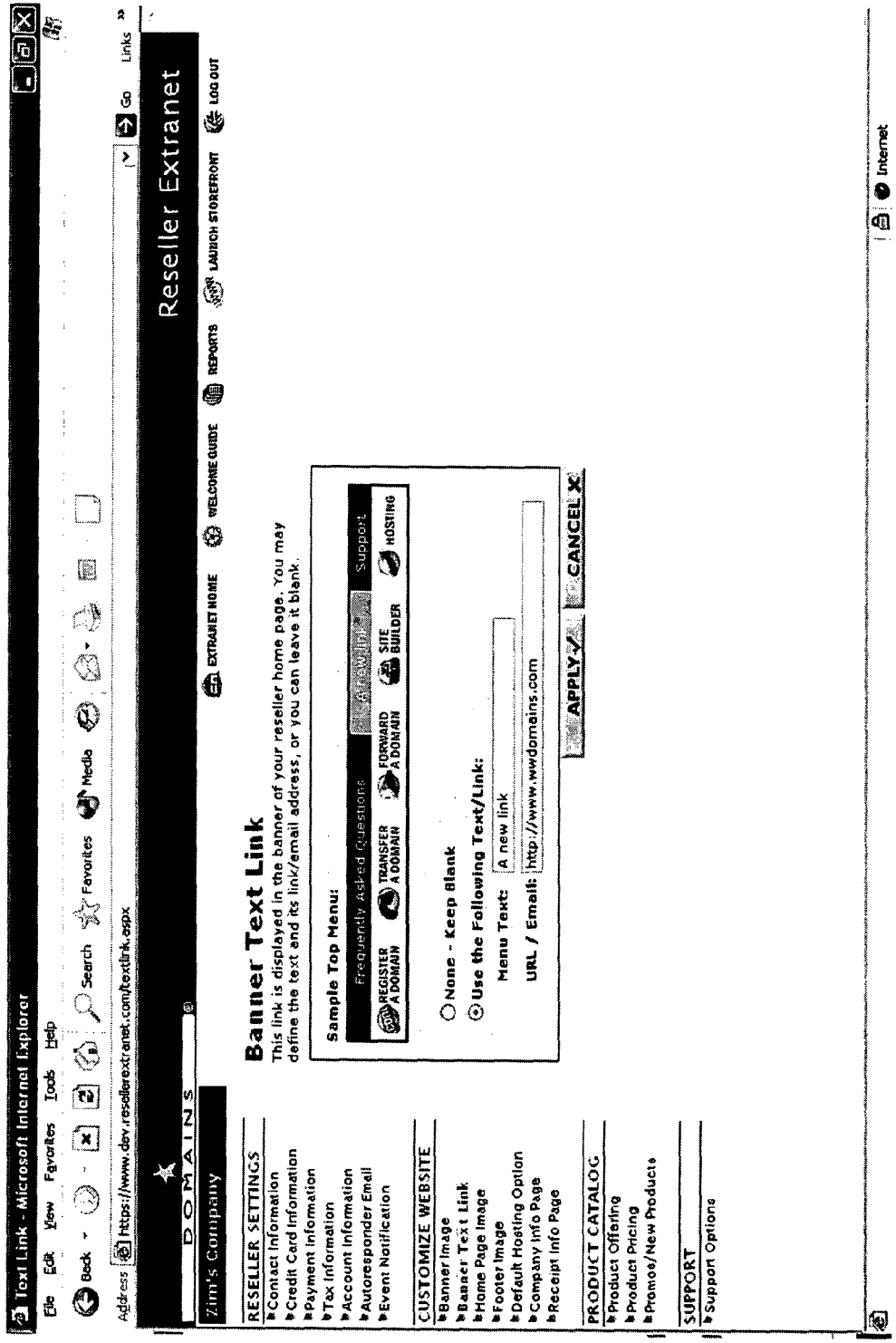
FIG. 15 is an example of a screen shot to a Banner Text Link web page according to a first embodiment of the invention.
Figure 16A:
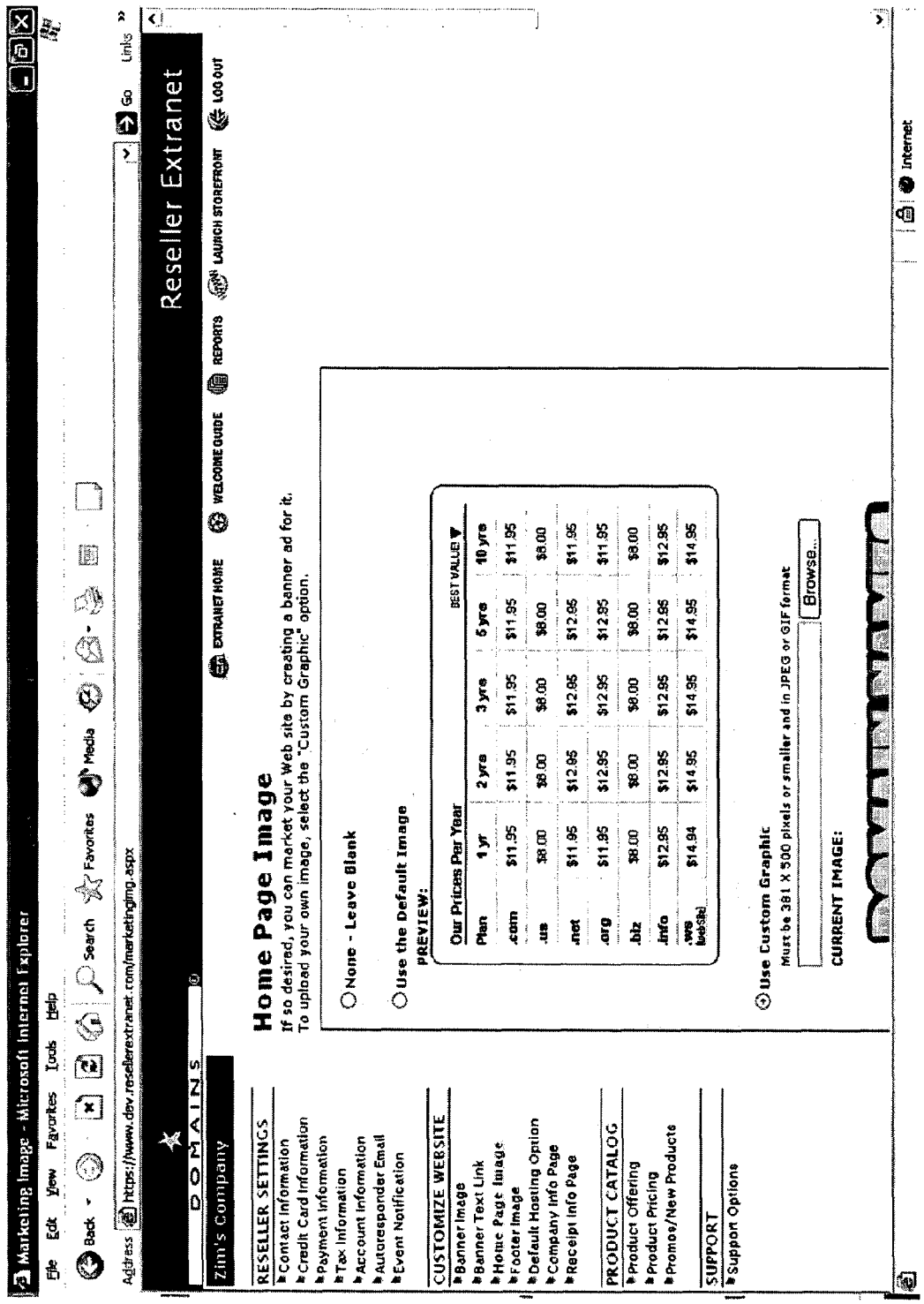
FIG. 16a is an example of a first screen shot to a Home Page Image web page according to a first embodiment of the invention.
Figure 16B:
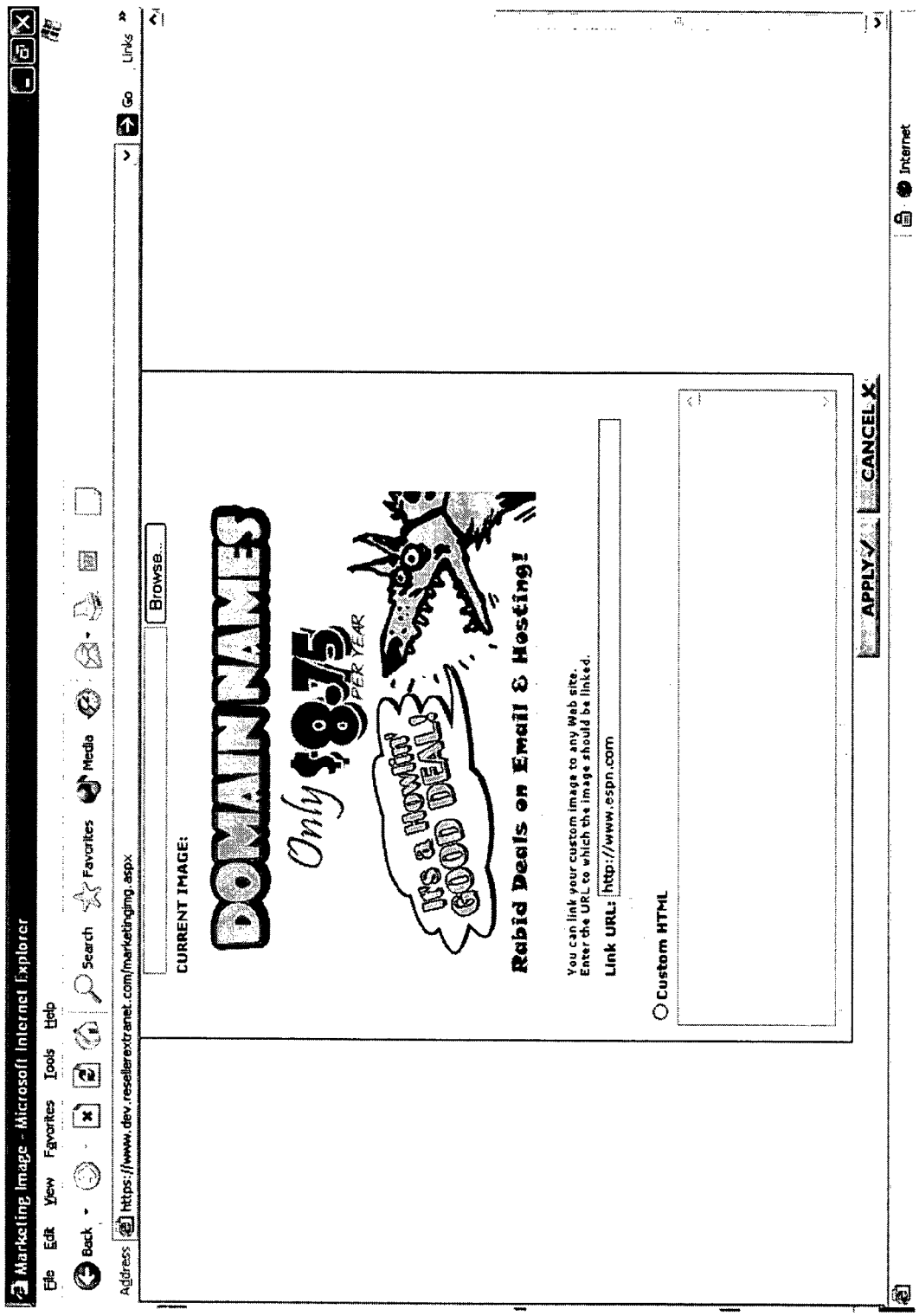
FIG. 16b is an example of a second screen shot to a Home Page Image web page according to a first embodiment of the invention.
Figure 17:
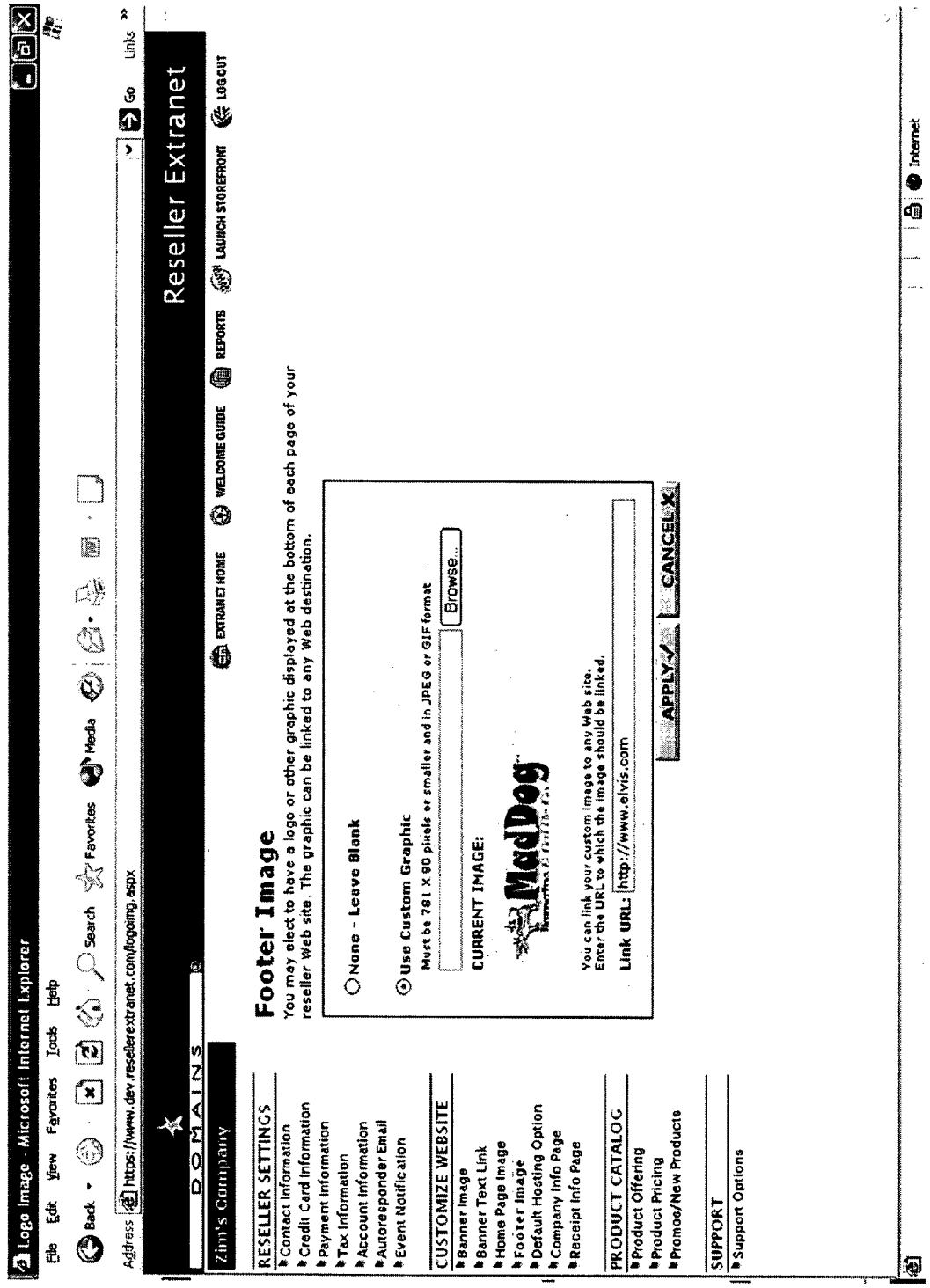
FIG. 17 is an example of a screen shot to a Footer Image web page according to a first embodiment of the invention.

In a preferred embodiment, a text link may be placed within the banner. A Customer 100 that selects the text link may be linked to another web site or may be given an opportunity to email a message to the Reseller 200 that set up the banner. FIG. 15 shows an example of a web page in the administration web site 202 that may be used to create the text link and the text link's associated URL or email address.

Figure 18:
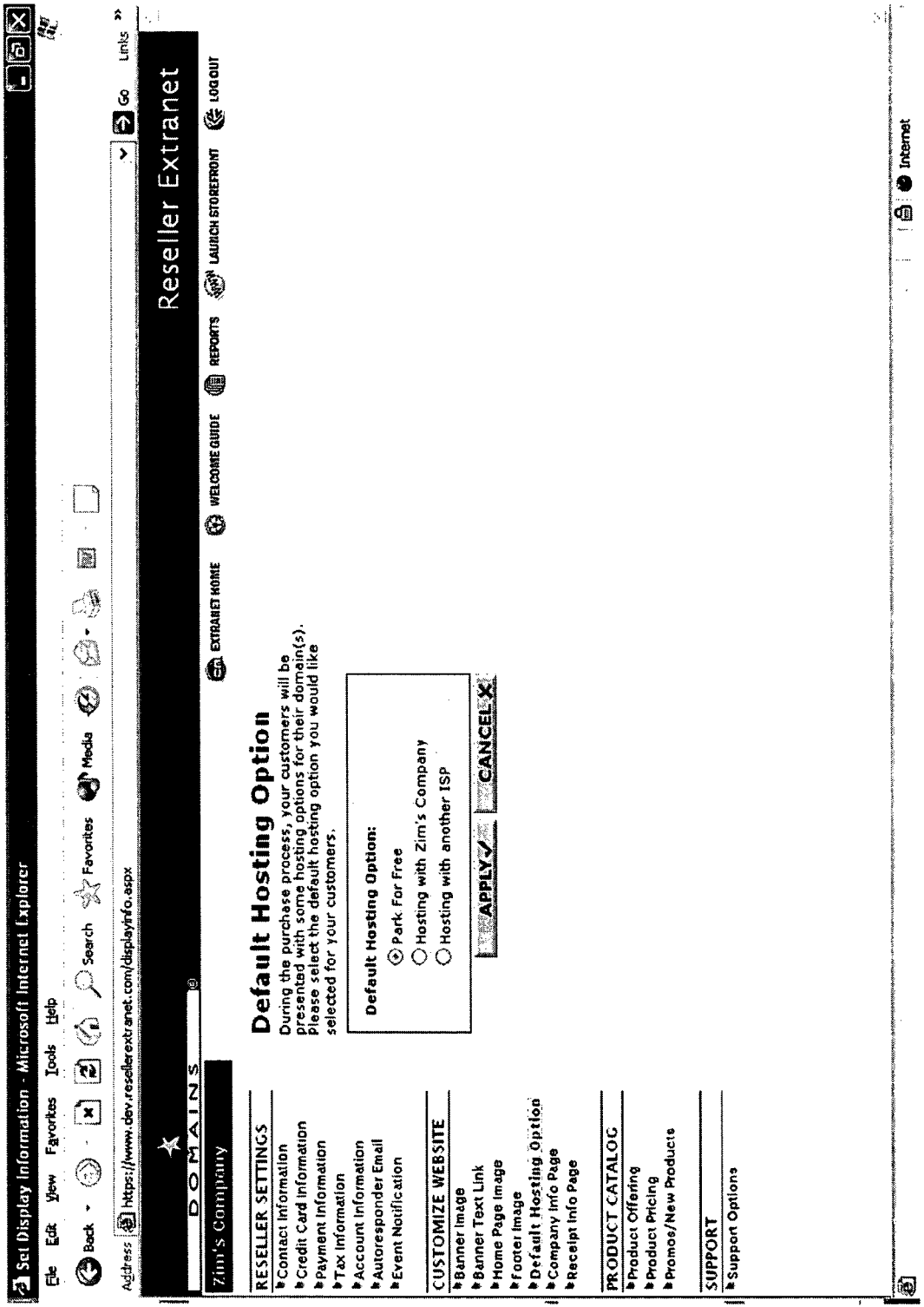
FIG. 18 is an example of a screen shot to a Default Hosting Option web page according to a first embodiment of the invention.

Any number and type of products and services may be sold by Resellers 200 using the registrar web site 203. Preferably, services related to domain name registration are sold. Resellers 200 may wish to provide their Customers 100 with options regarding the hosting for registered domain name. For example, Customers 100 may be given the option to have the Registrar 101a, Reseller 200 or an ISP host the registered domain name. FIG. 18 shows a web page in the administration web site 202 that may be used to allow a Reseller 200 to select how these options will be displayed for Customers 100 on the registrar web site 203.

Figure 19:
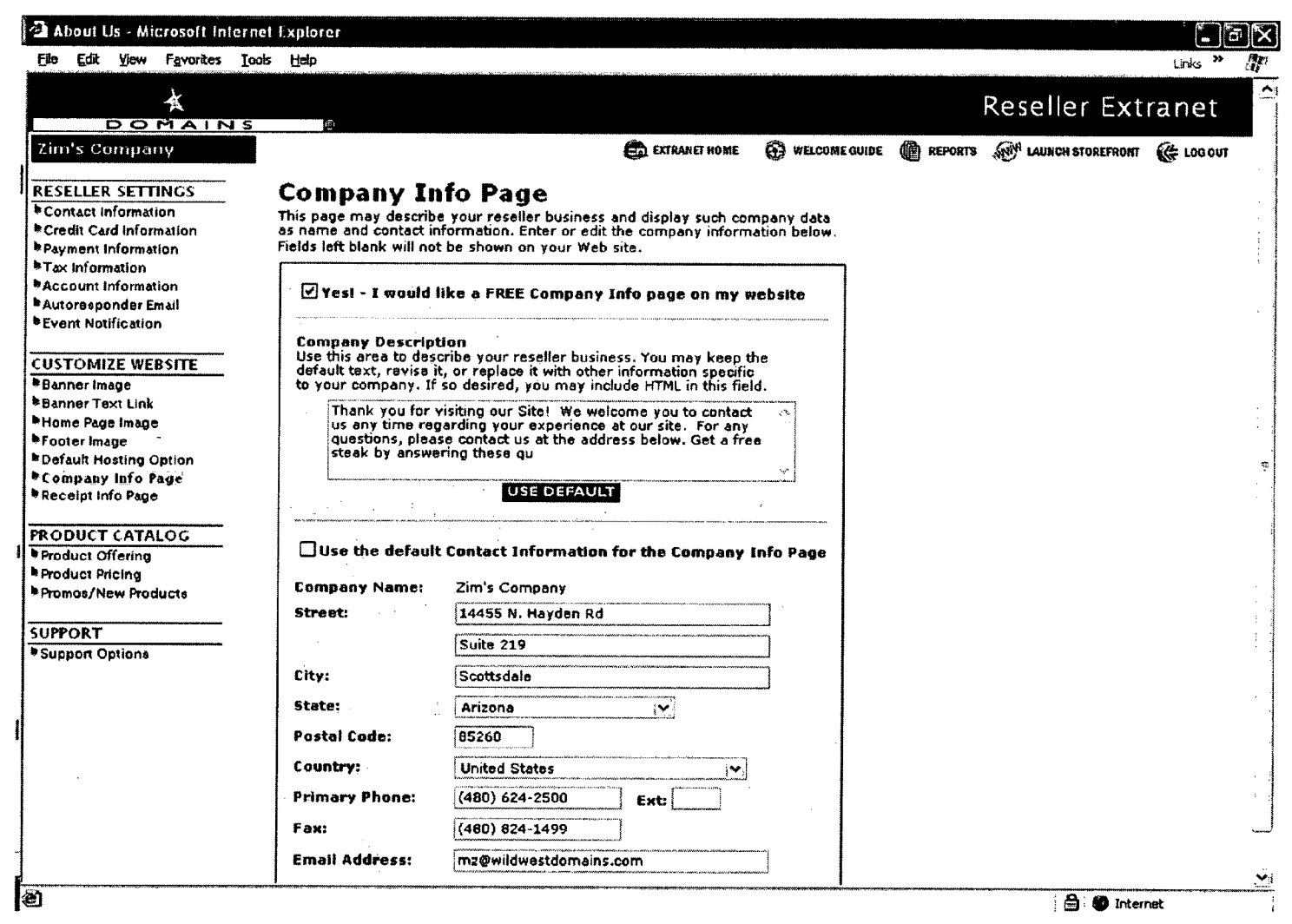

Resellers 200 may want to allow Customers 100 to view their company and contact information and to give their Customers 100 a personal message or greeting. This information may be entered into a web page in the administration web site 202 specifically created for this purpose, such as the example web page shown in FIG. 19. The company and contact information and personal message or greeting may then be displayed on one of the web pages in the registrar web site 203 for Customers 100 to view. The personal message and greeting allow Resellers 200 to perform marketing activities, such as offer promotions, and further enhance the appearance of the registrar web site 203 belonging exclusively to one of the Resellers 200.

Figure 20:
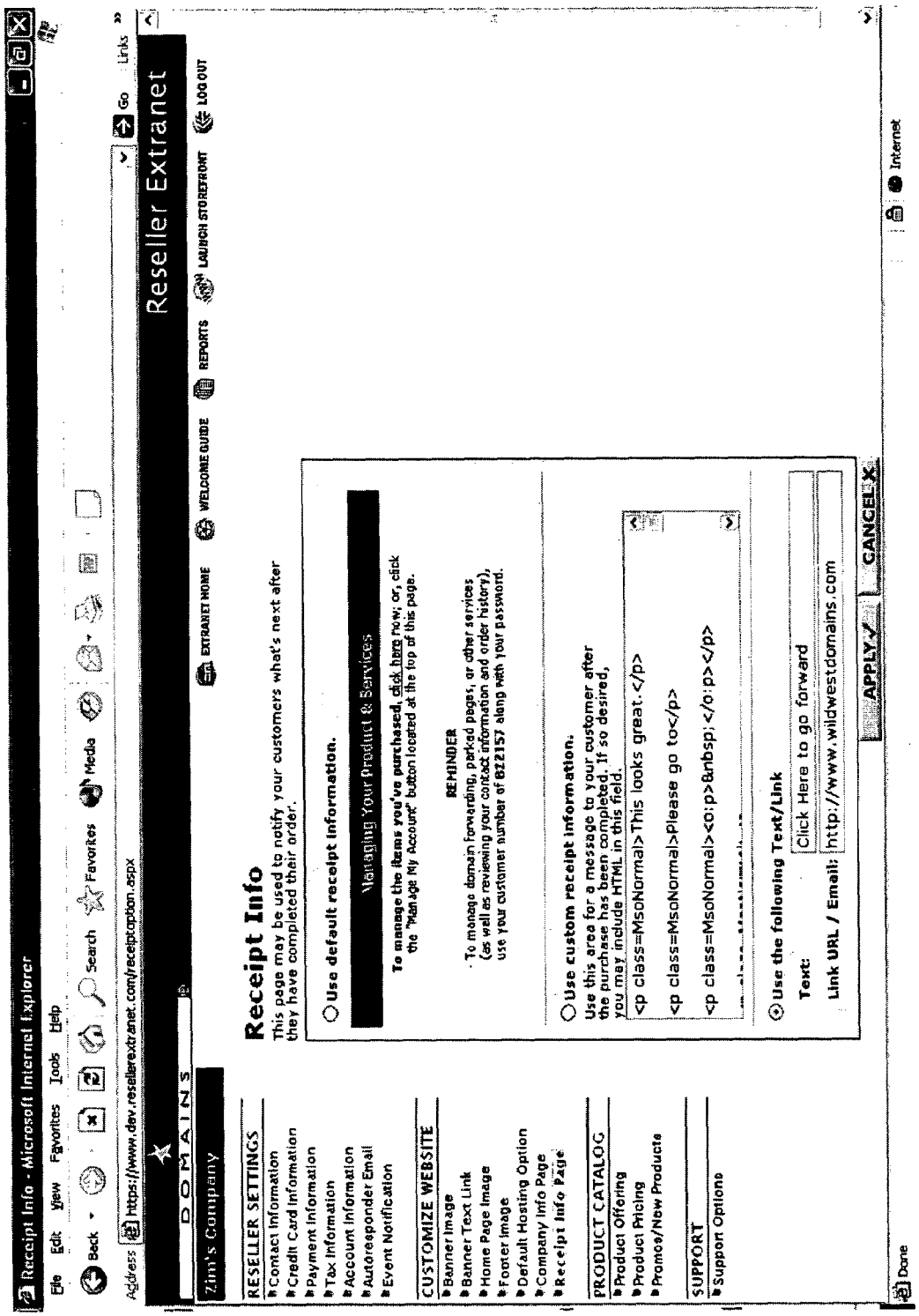
FIG. 20 is an example of a screen shot to a Receipt Info web page according to a first embodiment of the invention.
Figure 22A:
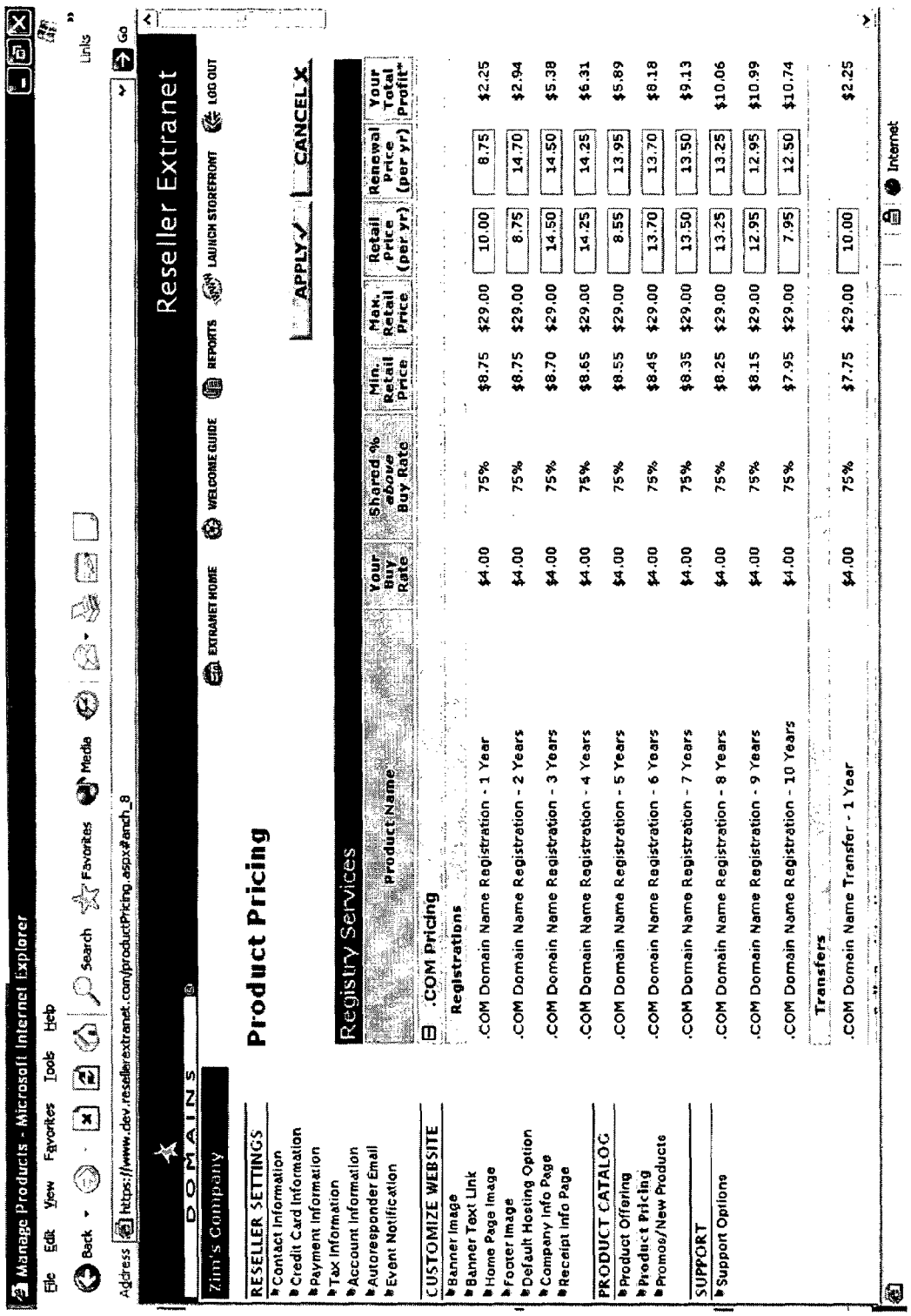
FIG. 22a is an example of a first screen shot to a Product Pricing web page according to a first embodiment of the invention.
Figure 22B:
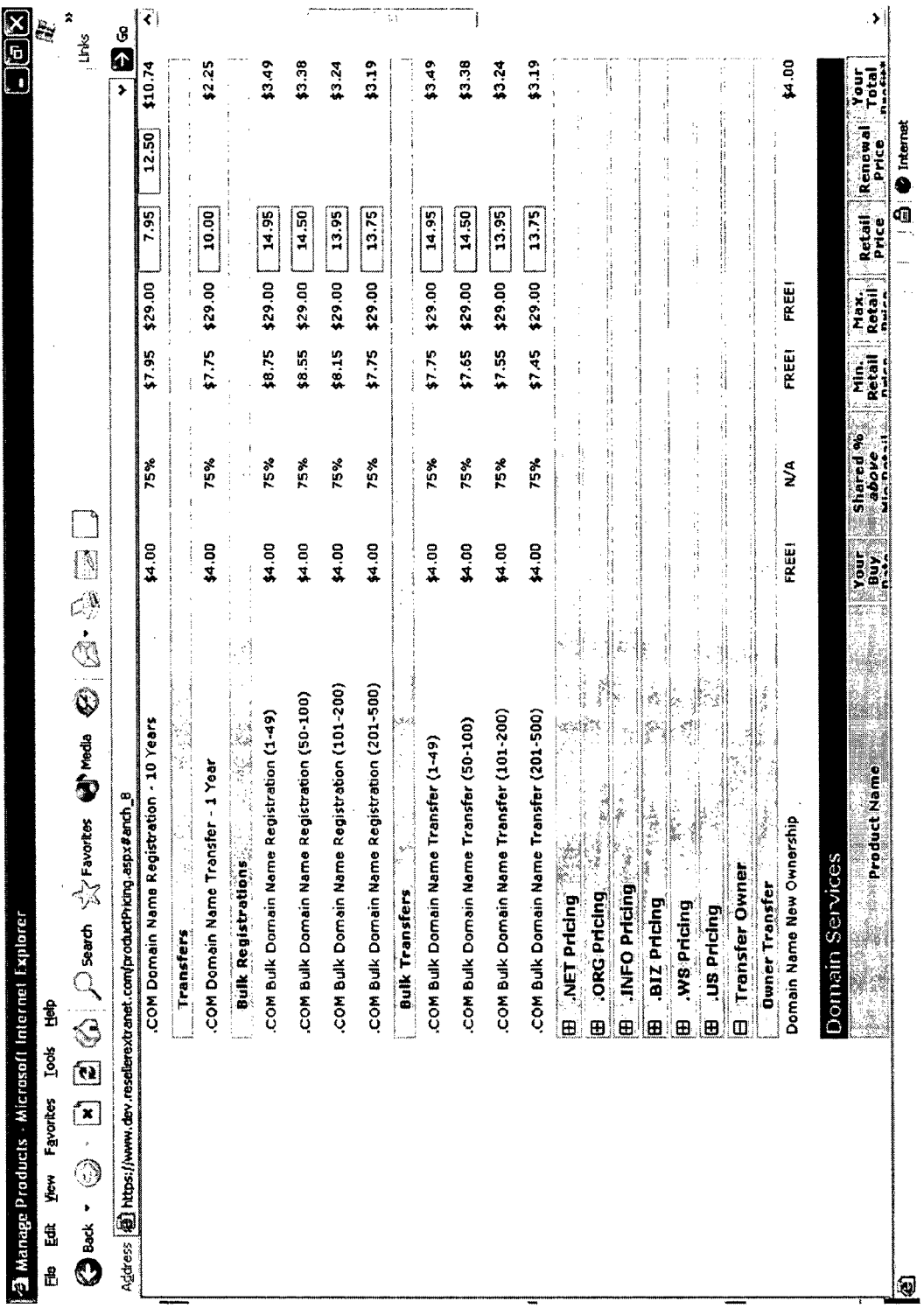
FIG. 22b is an example of a second screen shot to a Product Pricing web page according to a first embodiment of the invention.

Resellers 200 may wish to send a post sale message to a Customer 100 after the Customer purchased a product or service from the registrar web site 203. The message may be used to acknowledge the sale and inform the Customer 100 of any post sale issues. An example web page for accepting the post sale message and acknowledgement is shown in FIG. 20. The post sale message may be immediately displayed for the Customer 100 on the registrar web site 203 or the message may be emailed to the Customer 100.

Resellers 200 may desire to select the top level domains they wish to offer their Customers 100 for registration. Typically top level domains that Resellers 200 may wish to offer their Customers 100 include, but are not limited to, .COM, .NET, .ORG, .INFO, .BIZ, US, .WS. A Reseller might not want to offer all the TLD's because the TLDs may not relate to their offering. For example, an Australian Reseller may have no interest in offering a US domain name. In a preferred embodiment, registration, transfer, bulk registration and bulk transfer capabilities may be individually selected for each top level domain. Resellers 200 may also desire to offer any number of other products and services. As examples, Resellers 200 may desire to offer domain name change of ownership, domain name forwarding, domain name masking for forwarding, domain name hosting and email services, custom park pages for domain names, private or proxy registration, wire transfer payments and account balances, notice when desired domain names become available, copyright registration services or website creation software.

Proxy registration services allow a proxy's name and contact information, e.g. the name and contact information for the Registrar 101a or Reseller, to be stored in the public databases, while all the legal rights of ownership are contractually assigned to the Customer 100. The proxy registration service greatly enhances the reseller program since the Reseller or Registrar 101a may accept or assign to a third party the proxy position thereby allowing the Resellers 200 to sell this highly desired service.

Figure 21A:
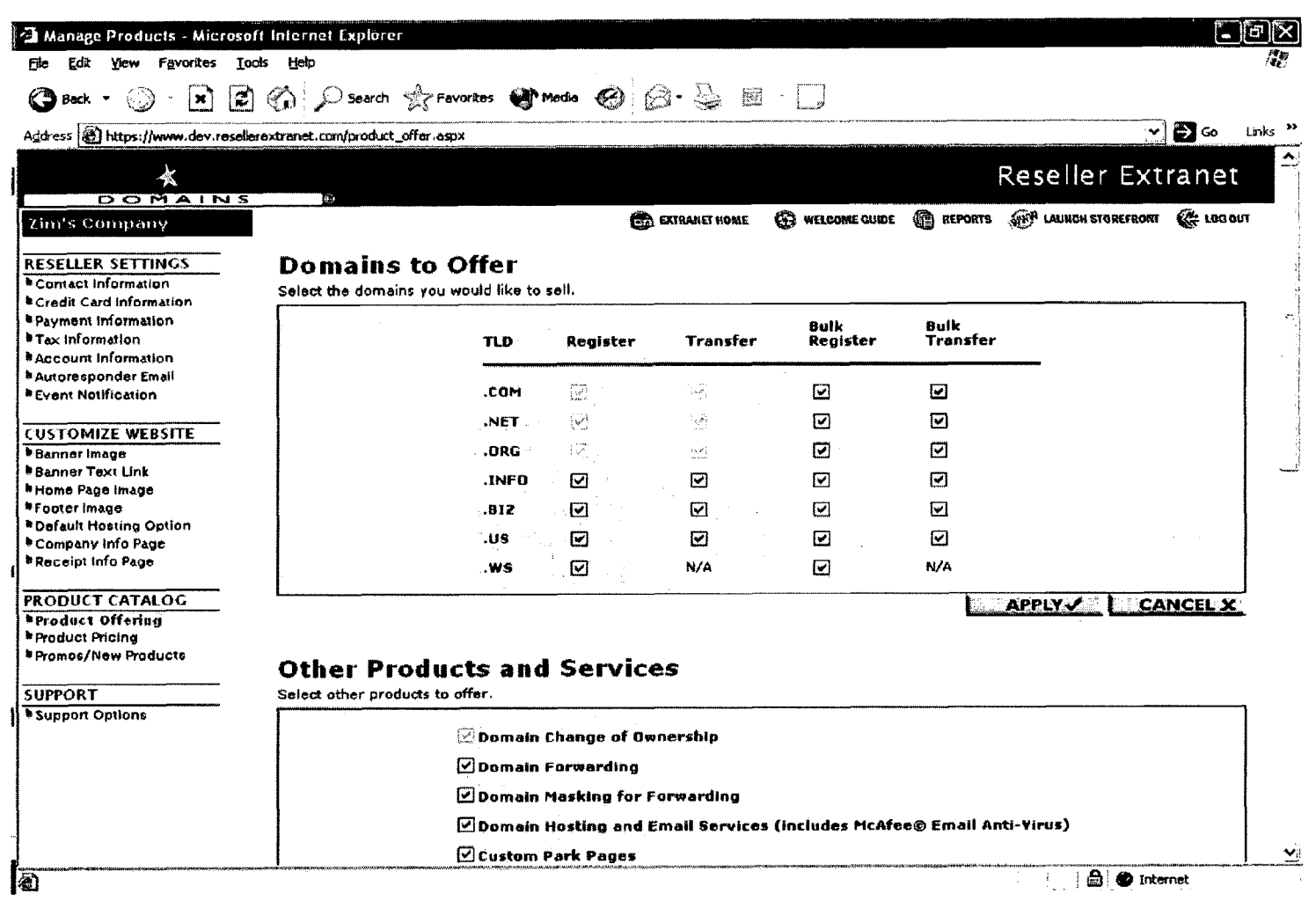
Figure 21B:
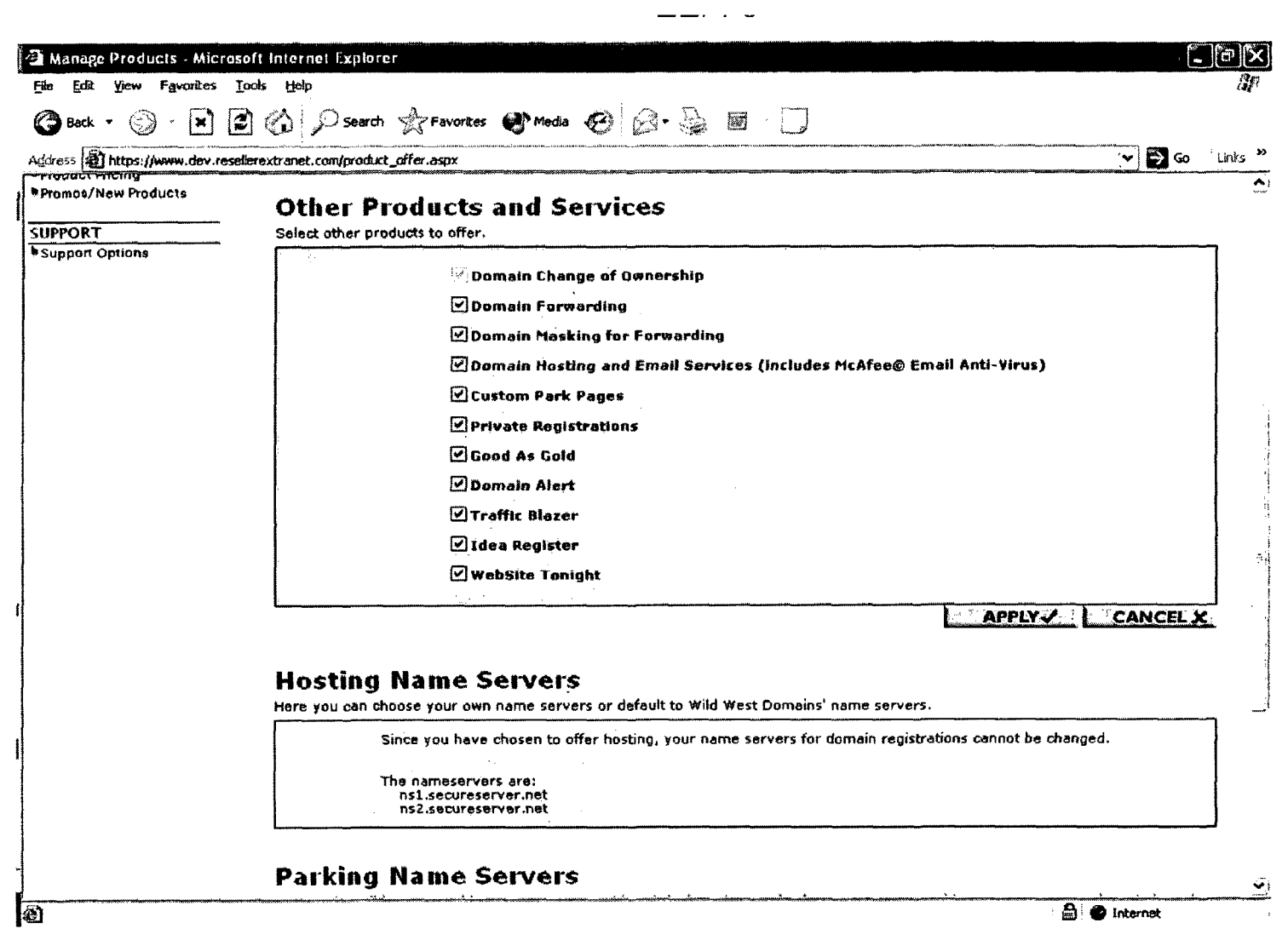
Figure 21C:
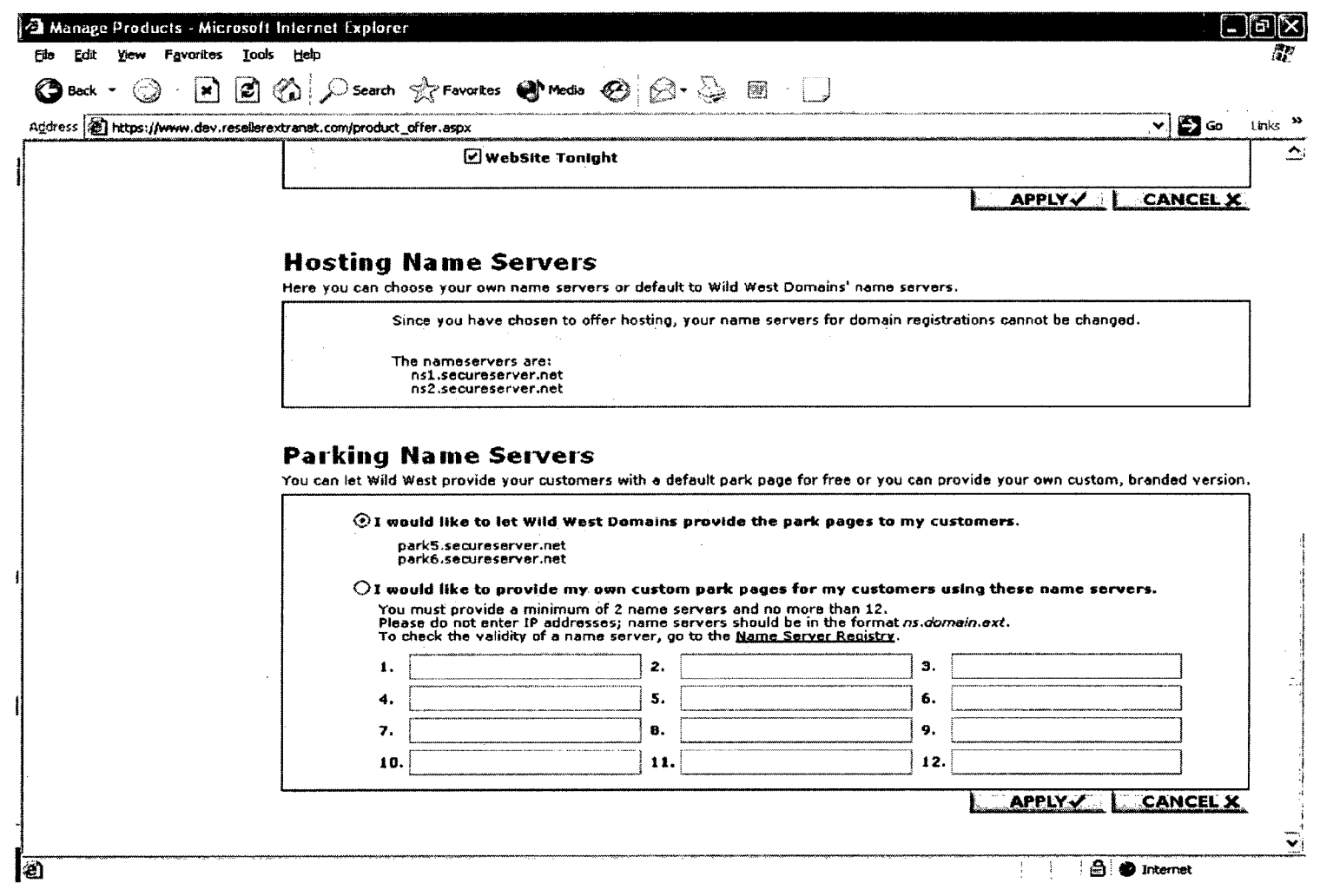

If hosting services are to be offered by a Reseller 200, a method for Customers 100 to select domain name servers may be provided. Resellers 200 may desire to provide their Customers 100 with a parking name server or the Resellers 200 may allow the Registrar 101a to provide parking name servers for the Customers 100. FIGS. 21a, 21b and 21c show an example web page at an administration web site 202 that may be used to allow Resellers 200 to select the top level domains, product and services, hosting name servers and parking name servers that they wish to offer to their Customers 100 at the registrar web site 203.

Resellers 200 may desire to set their own prices for the various products and services that they have selected to offer their Customers 100. Example web pages on an administration web site 202 are illustrated in FIGS. 22a, 22b, 22c, 22d and 22e and show one possible method for allowing Resellers 200 to set custom prices for their Customers 100. Allowing Resellers 200 to individually set their own prices greatly enhances each Reseller's 200 ability to create a unique marketing strategy and specifically target a portion of the market based on the level of service the Reseller 200 wishes to provide.

Figure 23:
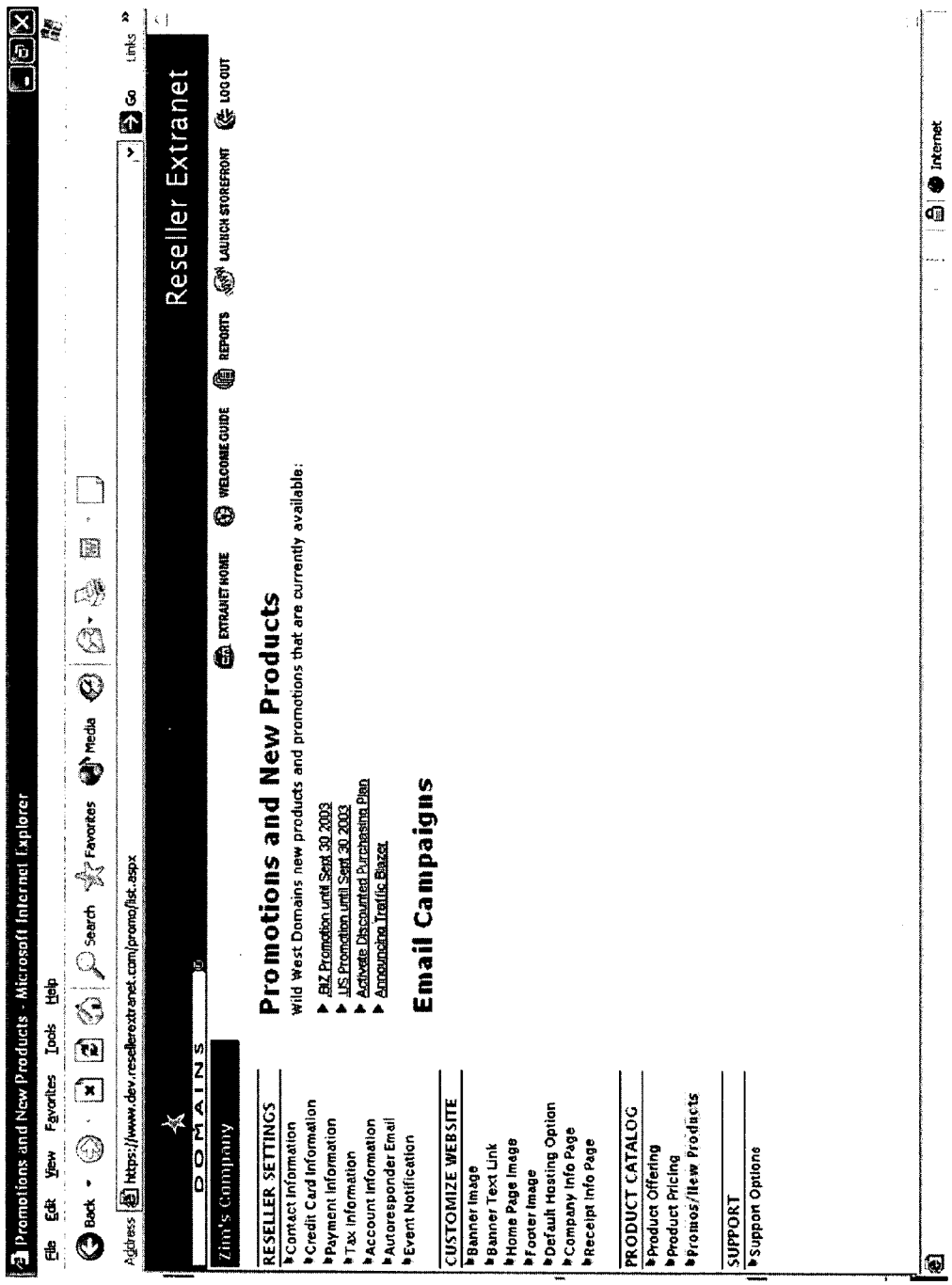
FIG. 23 is an example of a screen shot to a Promotions and New Products web page according to a first embodiment of the invention.

The Registrar 101a may desire to offer promotional products and services that they wish to sell through their Resellers 200 and the Resellers 200 may desire to offer the promotional products to their Customers 100. In a preferred embodiment of the invention, a web page, for example a web page similar to the one shown in FIG. 23, may be provided to allow Resellers to select the promotional products and services they would like to offer their Customers 100.

Figure 24:
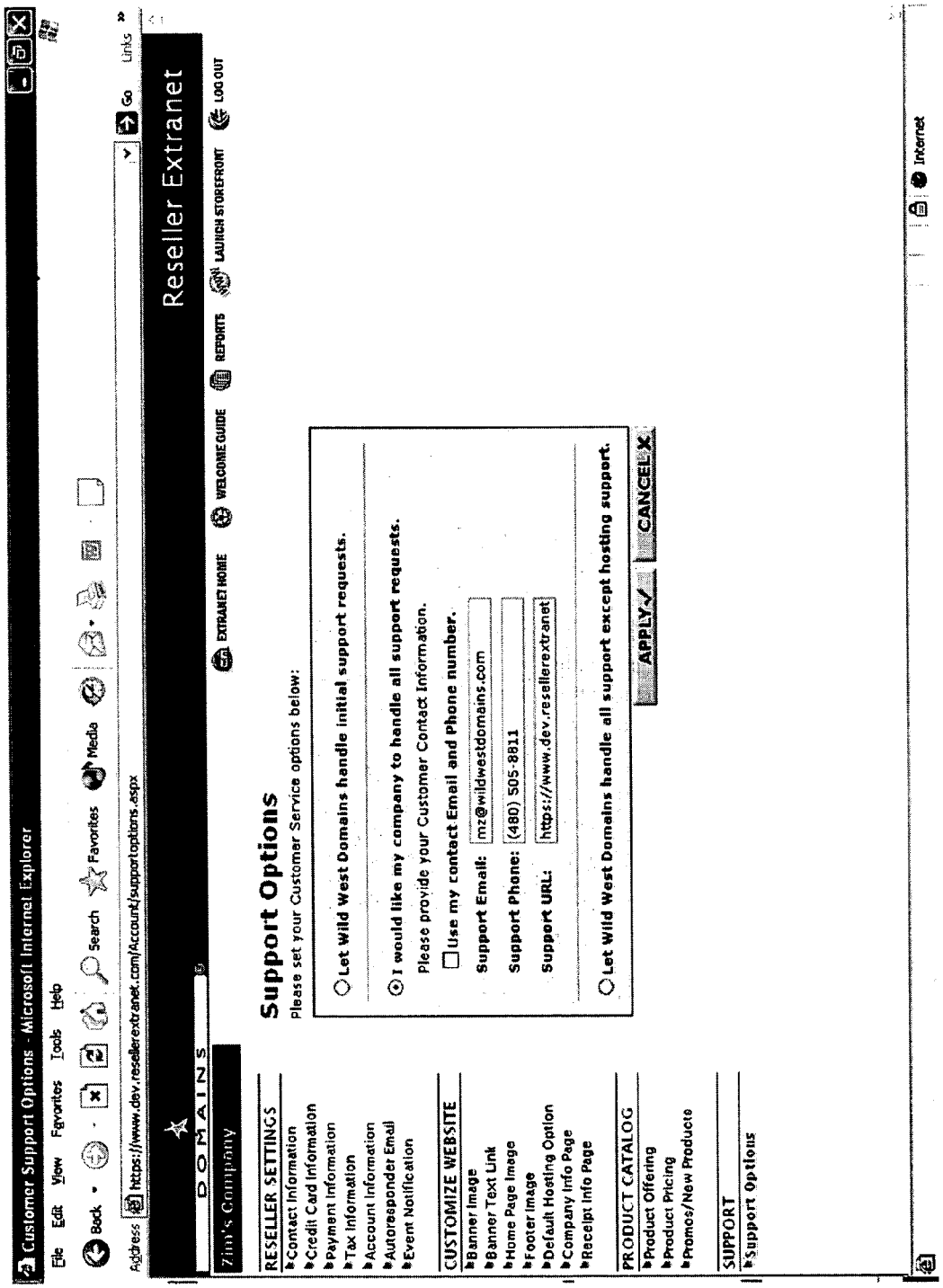
FIG. 24 is an example of a screen shot to a Support Options web page according to a first embodiment of the invention.

Resellers 200 may desire to select custom support options for their Customers 100 regarding the products and services that they have chosen to sell. Resellers 200 may desire to handle the support requests themselves or they may desire that the Registrar 101a handles the support requests. If the Resellers 200 desire to handle the support requests, they will need to provide contact information for their support service. In a preferred embodiment, each Reseller 200 may select who will be handling the support requests from their Customers 100 for each product and service the Reseller 200 has chosen to sell. A web page, similar to the one shown in FIG. 24, may be used on the administration web site 202 to allow the Resellers 200 to customize their method of handling support issues.

Figure 25:
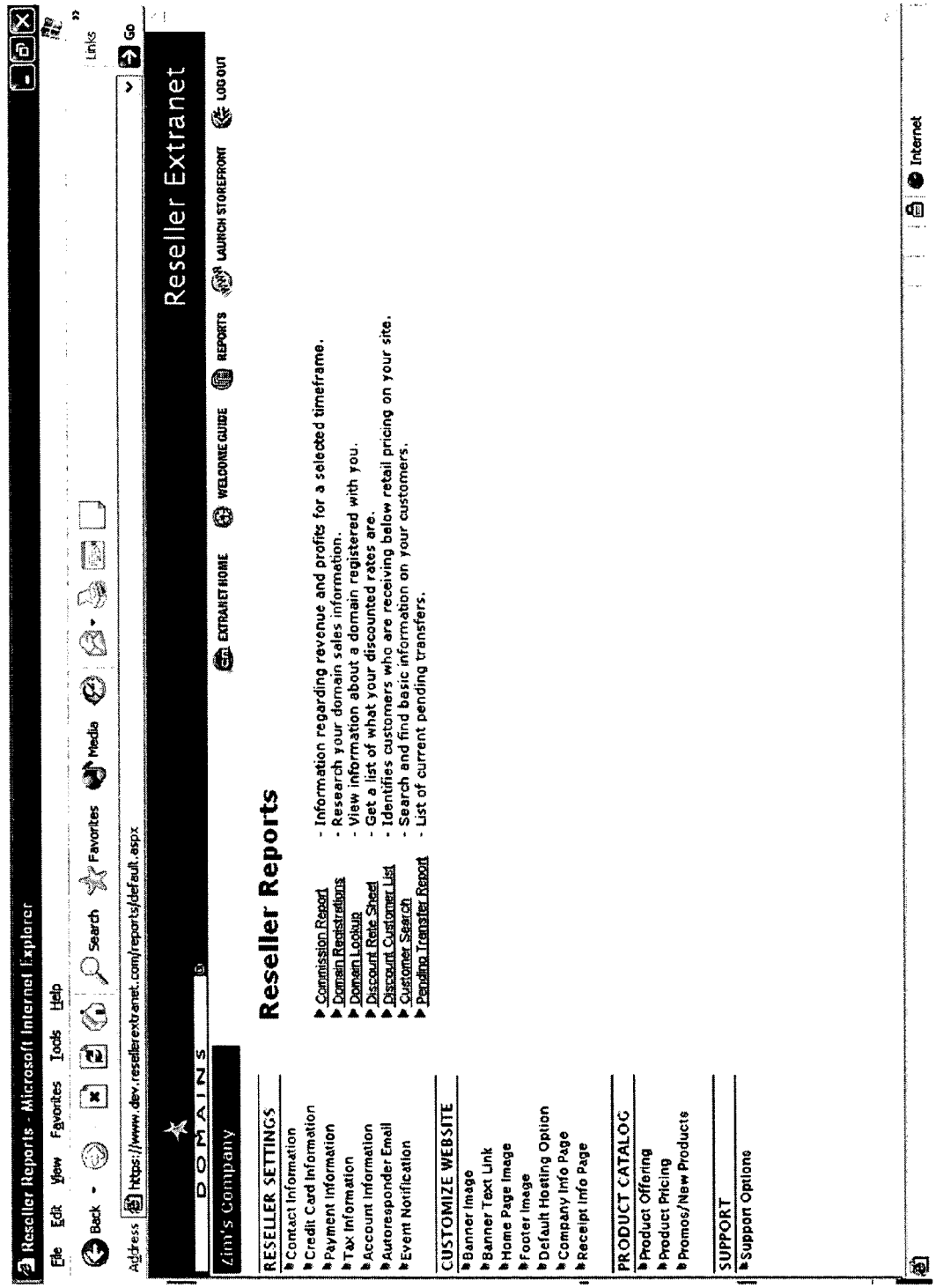
FIG. 25 is an example of a screen shot to a Reseller Reports web page according to a first embodiment of the invention.
Figure 26:
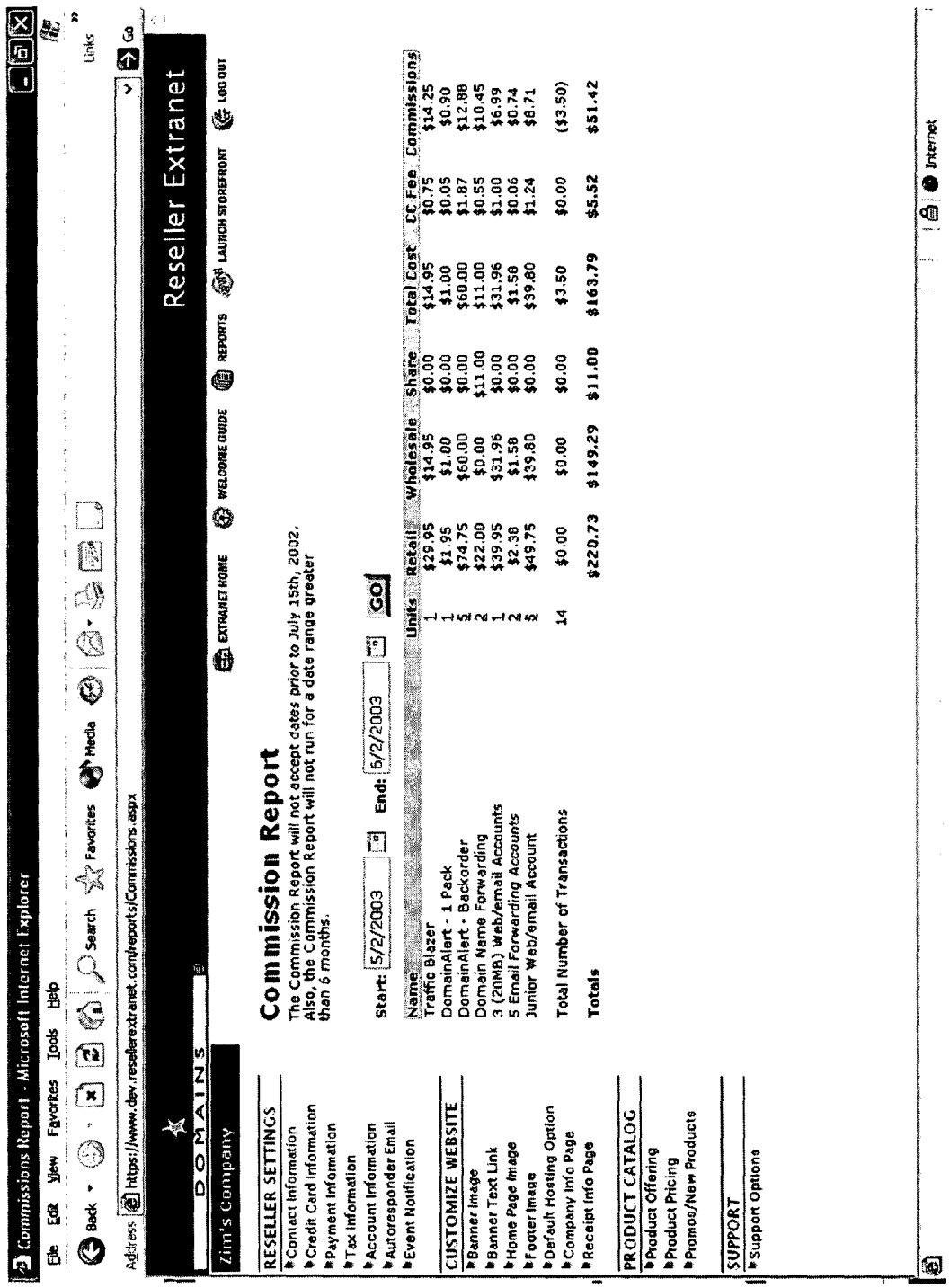
FIG. 26 is an example of a screen shot to a Commission Report web page according to a first embodiment of the invention.
Figure 28:
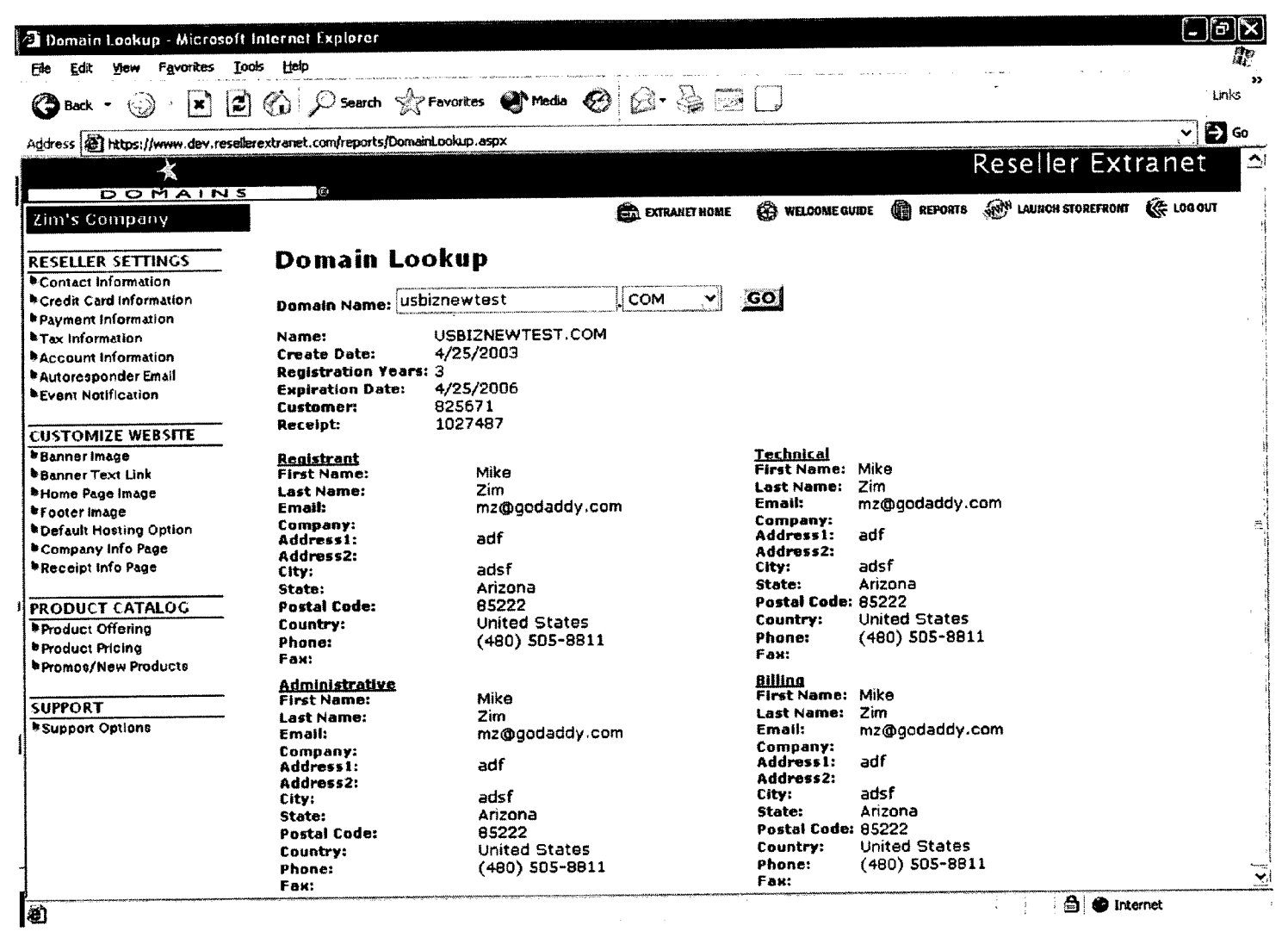
Figure 30:
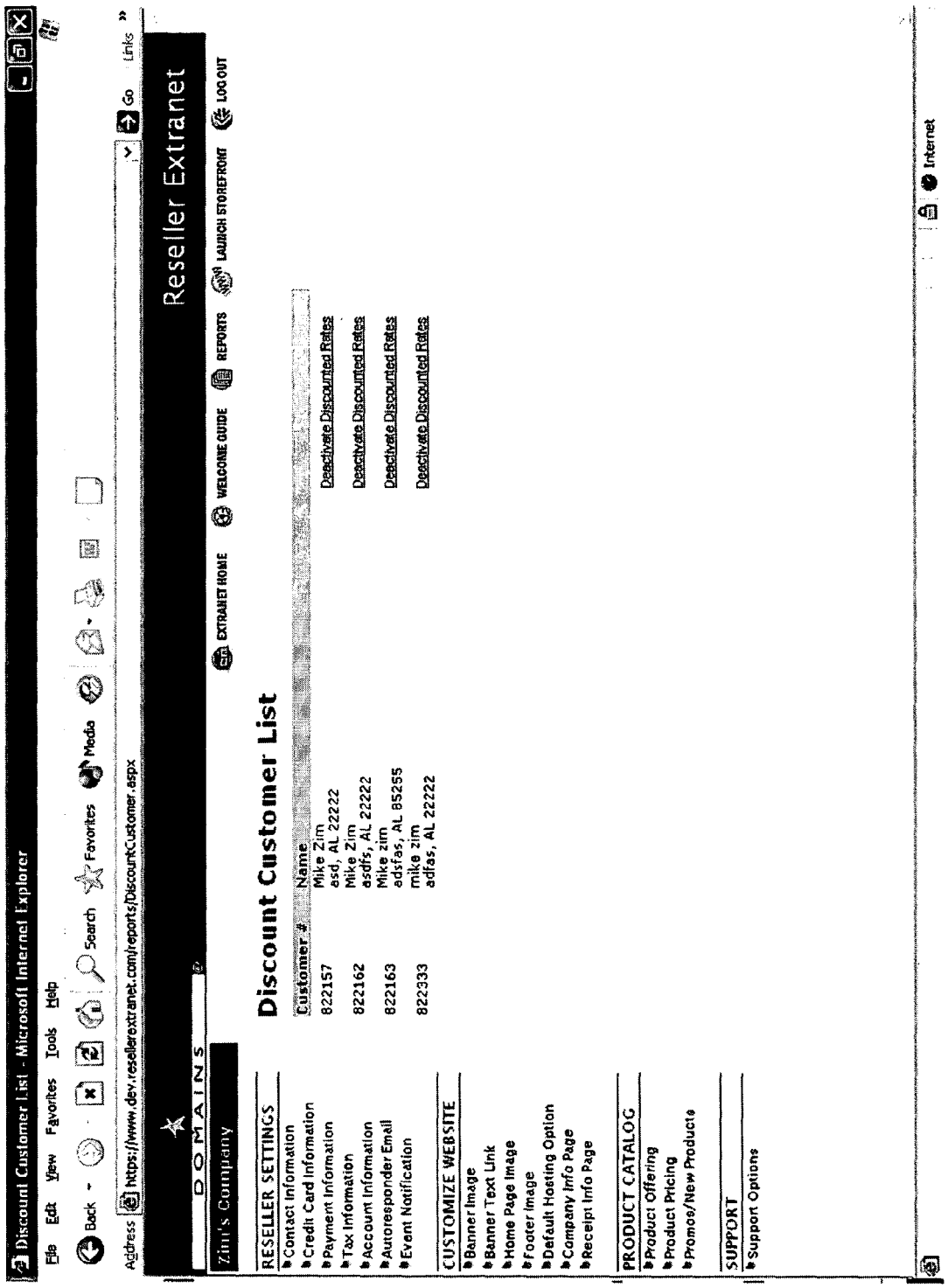
FIG. 30 is an example of a screen shot to a Discount Customer List web page according to a first embodiment of the invention.
Figure 31:
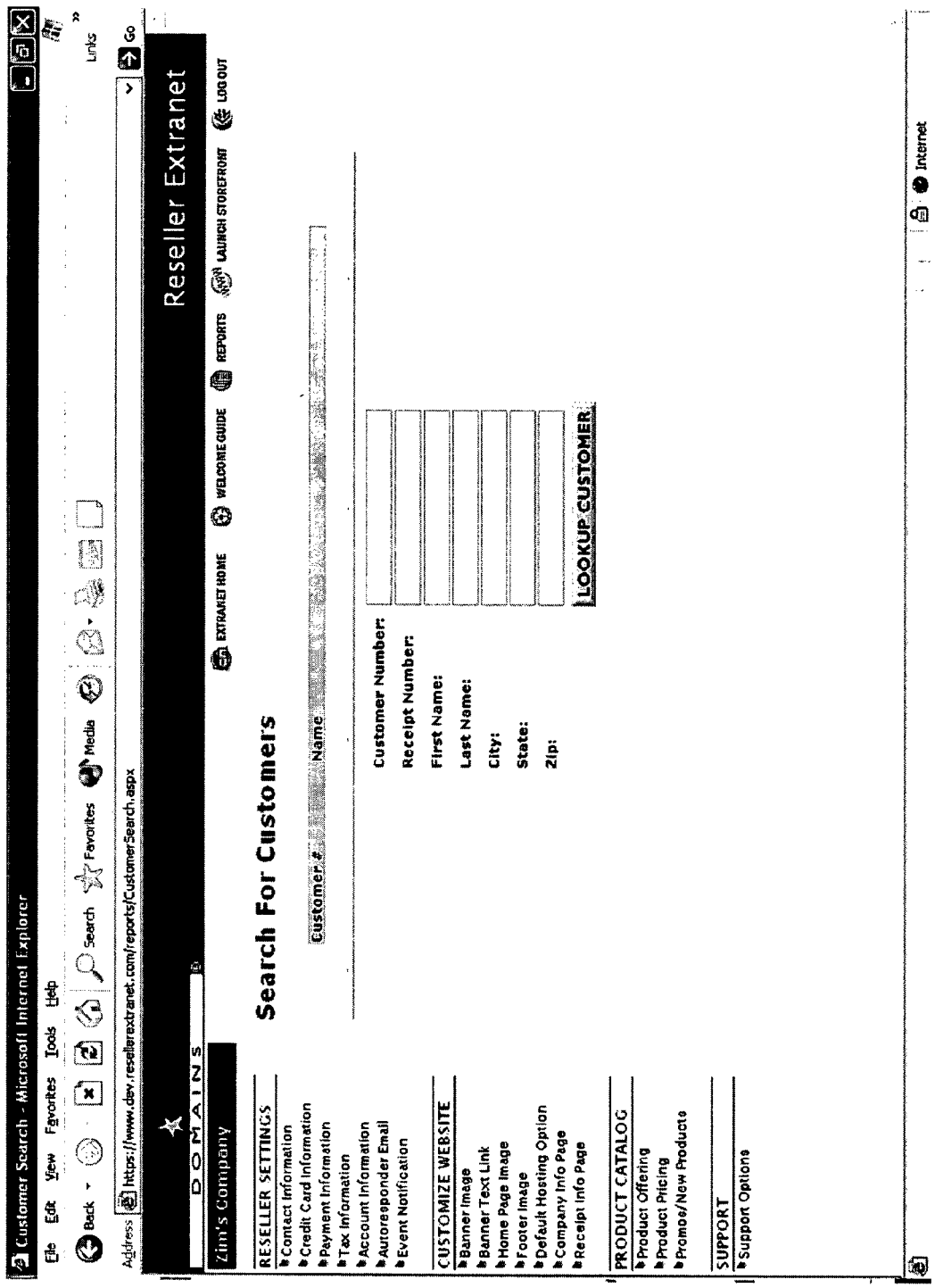
FIG. 31 is an example of a screen shot to a Customer Search web page according to a first embodiment of the invention.

Resellers 200 may desire to see reports regarding the success of their reseller business. The administration web site 202 may include a web page, for example one similar to the web page shown in FIG. 25, for allowing the Resellers 200 to link to and view one or more reports. As examples of possible reseller reports, a commission report, domain name registration report, domain lookup, discounted rate sheet, discount customer list, customer search and pending transfer report may all be made available to the Resellers 200. Corresponding sample web pages for each of these reports are shown in FIGS. 26 through 32.

API Reseller Program

Figure 4:
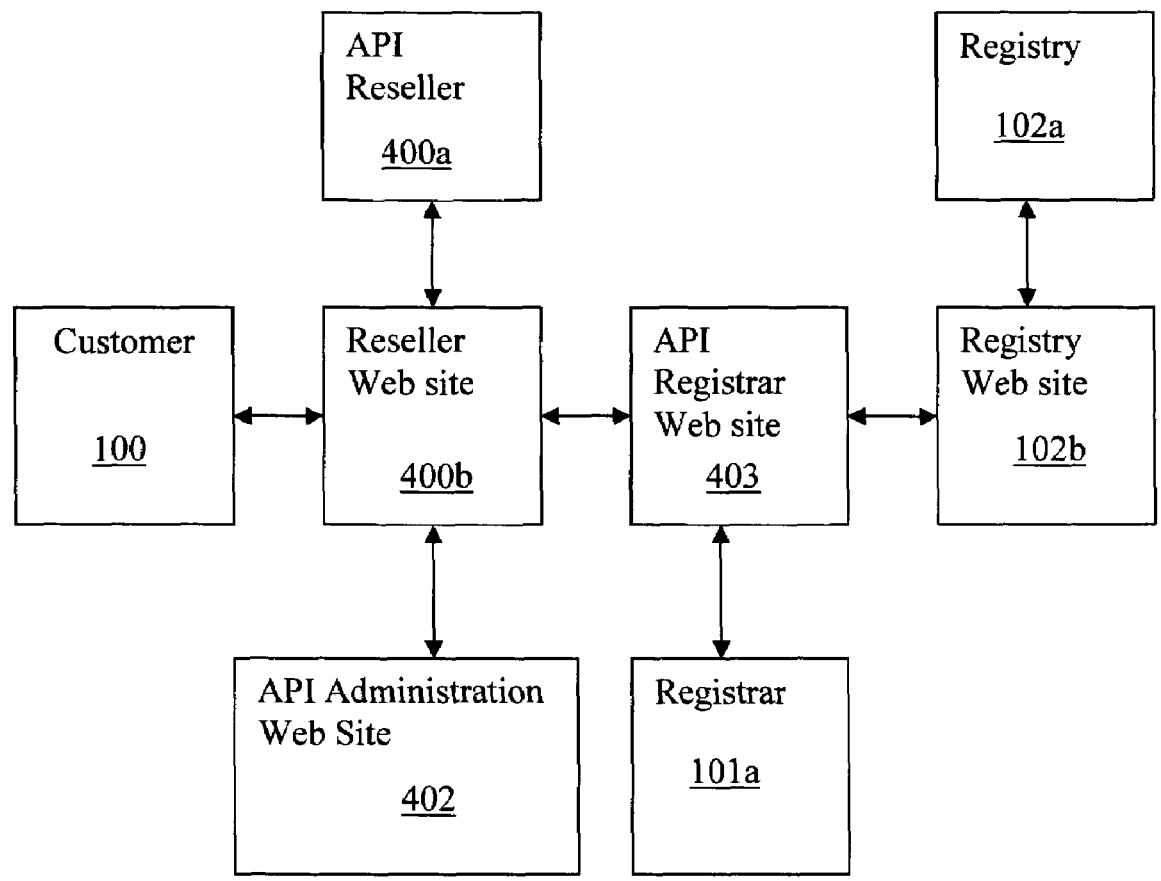
FIG. 4 is a block diagram of a second reseller program according to an embodiment of the invention.
Figure 5:
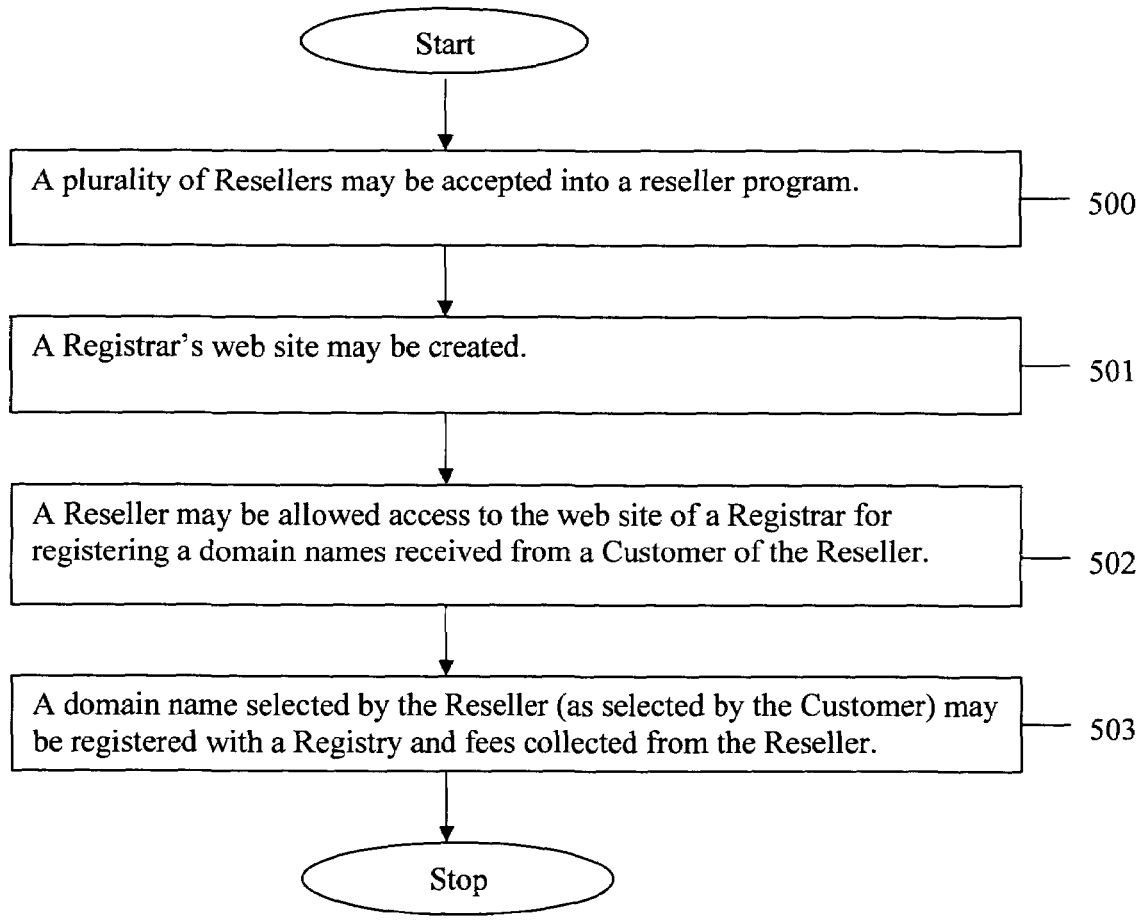
FIG. 5 is a flowchart of a process using the reseller program illustrated in FIG. 4.

A second embodiment of the reseller program of the present invention will be described with reference to the block diagram in FIG. 4 and the flowchart in FIG. 5. In this embodiment, each API Reseller 400a has their own Reseller web site 400b where they may conduct their own business and sell their own products and services. The advantage of this embodiment for the Resellers 400a is that Customers 100 are less likely to leave the reseller web site 400b in order to purchase products and service from the API registrar web site 403. Thus, Resellers 400a may participate in this embodiment of the reseller program without having the disadvantage of directing Customers 100 away from their products and services on their web sites 400b.

This embodiment requires Resellers 400a to be accepted into a reseller program and for the Registrar 101a to create an API registrar web site 402. (Steps 500 and 501) The registrar web site 403 may be a full featured web site accessible by Customers 100 with an Internet browser as in the first embodiment although this feature is not necessary for this embodiment to operate. The registrar web site 403 does, however, need to be accessible by the reseller web sites 400b to permit the exchange of information between the web sites. (Step 502) The exchange of information between the web sites is preferably automated by computer systems created for this purpose. The communication protocol between the reseller web site 400b and the registrar web site 403 may be according to any known internet protocol such as the Application Program Interface (API) protocol or the Extensible Provisioning Protocol (EPP). Customers may be directed between the reseller web site 400b and the registrar API web site 403 using known Internet links or URLs to create a virtual web site.

Figure 34:
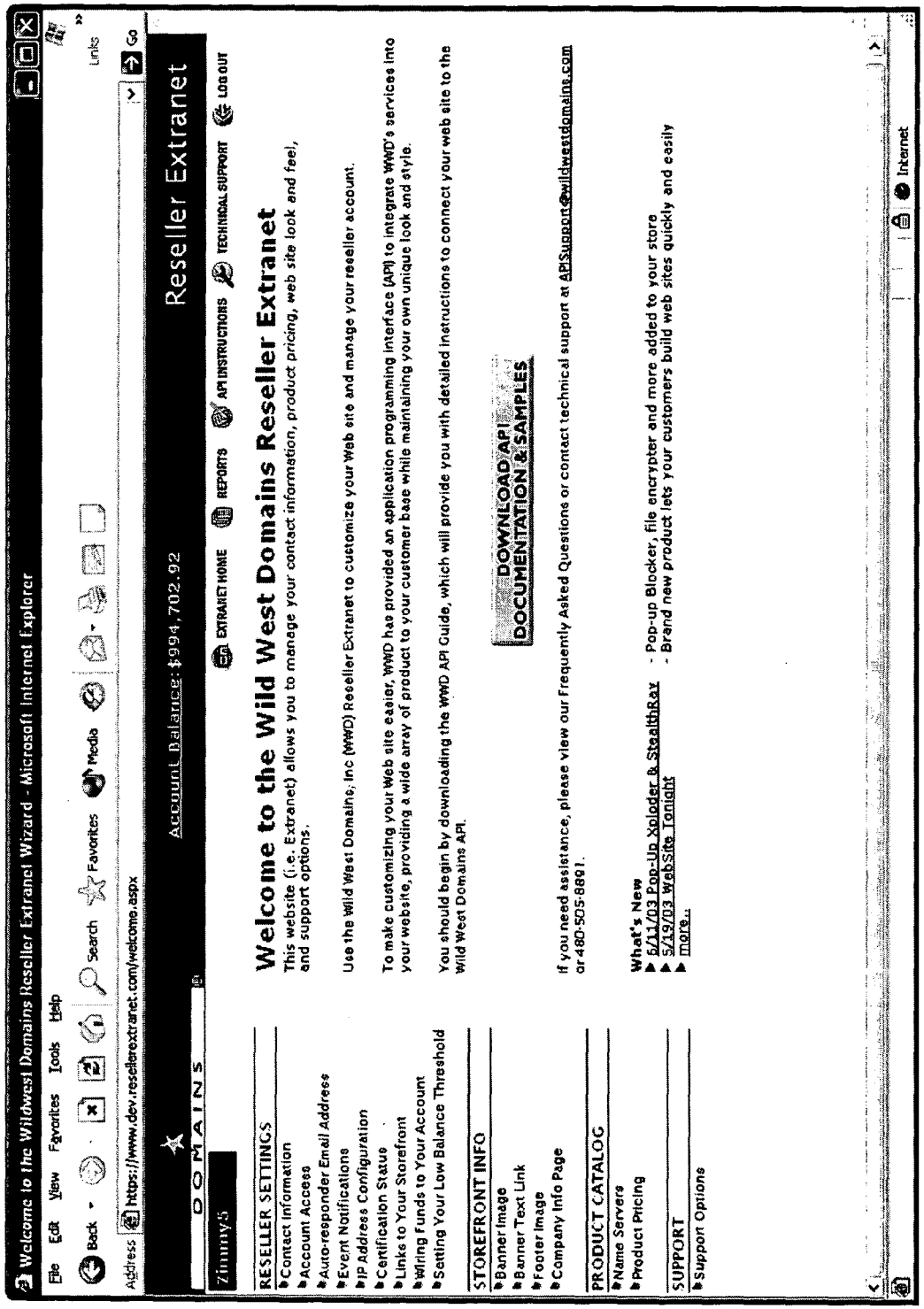
FIG. 34 is an example of a screen shot to a Welcome web page according to a second embodiment of the invention.

The Resellers 400a are preferably directed to an administration web site 402 to be registered into the API reseller program. An example of a suitable administration web site 402 may be found at www.dev.resellerextranet.com. They may receive a username and password at a reseller web site 400b, such as the one at www.wildwestdomains.com, to allow them access to the administration web site 402. A sample home page, or welcome page, for the administration web site 402 is shown in FIG. 34. The welcome page is preferably designed to allow Resellers 400a to easily join the reseller program and to customize the interaction between the reseller web site 400b and the registrar web site 403. The welcome page preferably has links to all the other web pages in the administration web site 402. This allows Resellers 400a to quickly and easily navigate throughout the administration web site 402.

Figure 35:
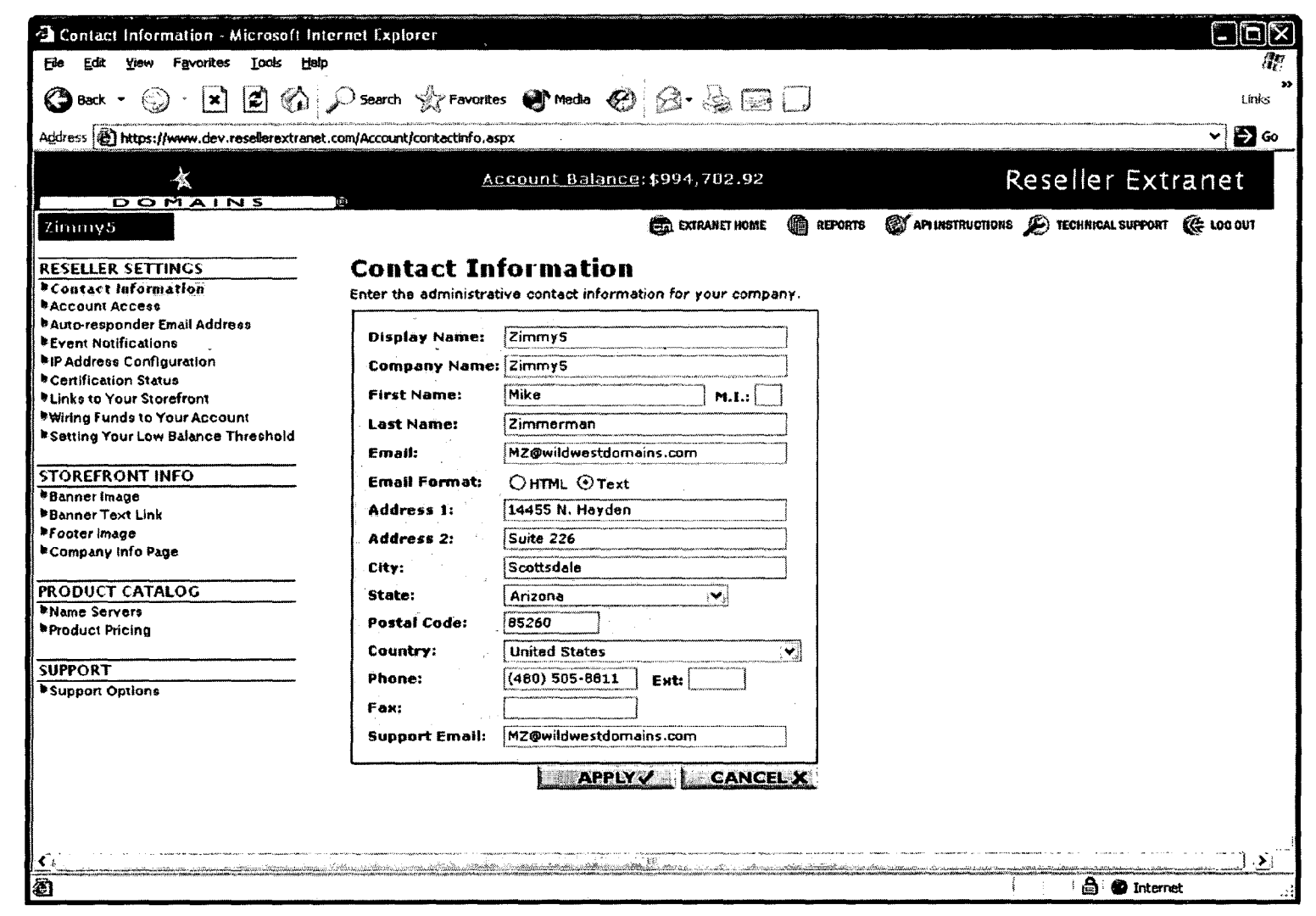

As part of joining the reseller program, Resellers 400a will typically need to provide contact information to the Registrar web site 403. FIG. 35 shows a sample contact information web page which may be used for this purpose. The Resellers 400a may be asked to provide one or more of the following pieces of information: a display name (dba name), company name, first name, middle name or initial, last name, e-mail address, email format (HTML or text), mailing address, phone number, fax number and a support email address. The contact information allows the Registrar 101a to contact the Resellers 400a regarding any problems that may arise during the Resellers 400a participation in the reseller program.

Figure 36A:
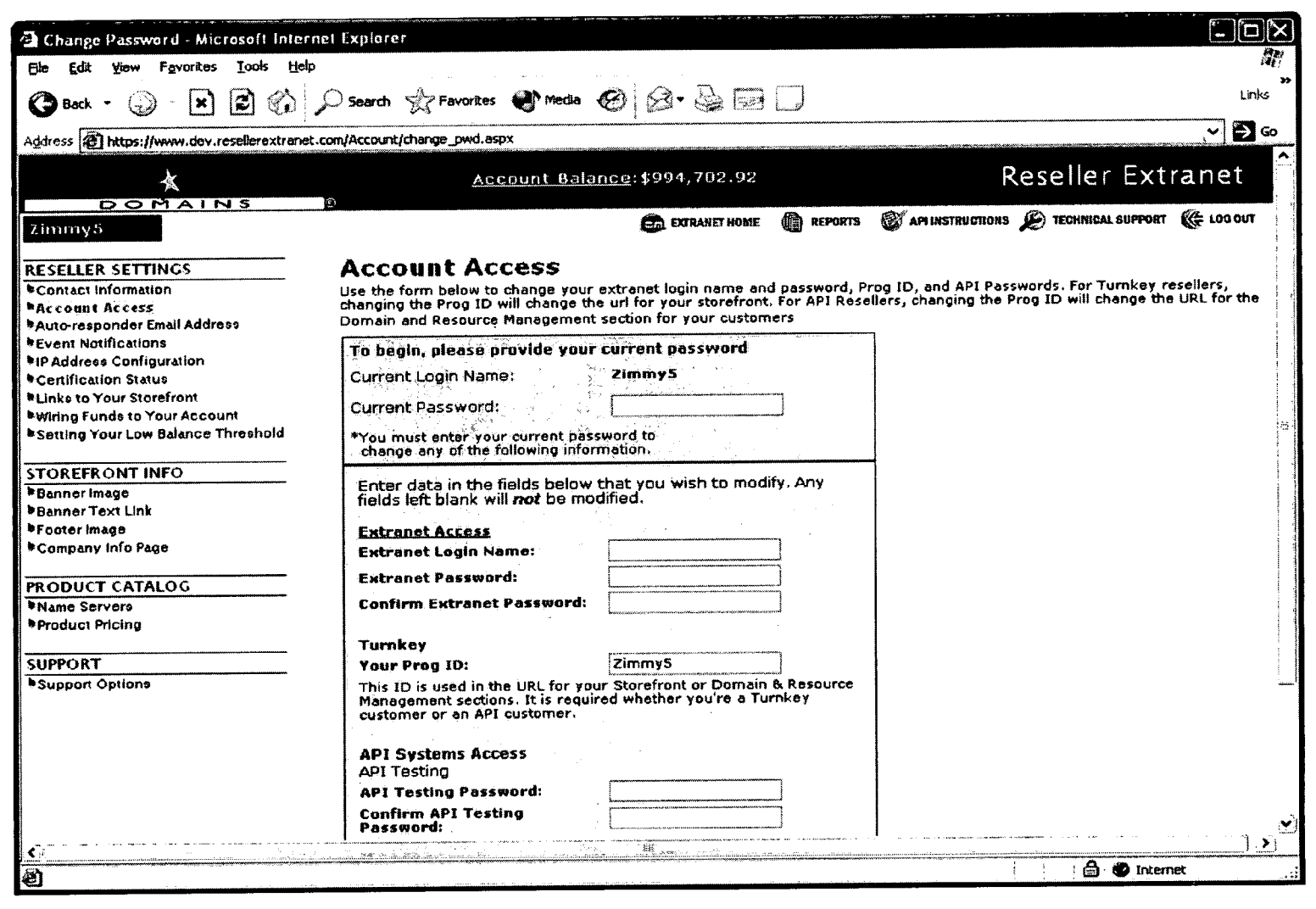
Figure 36B:
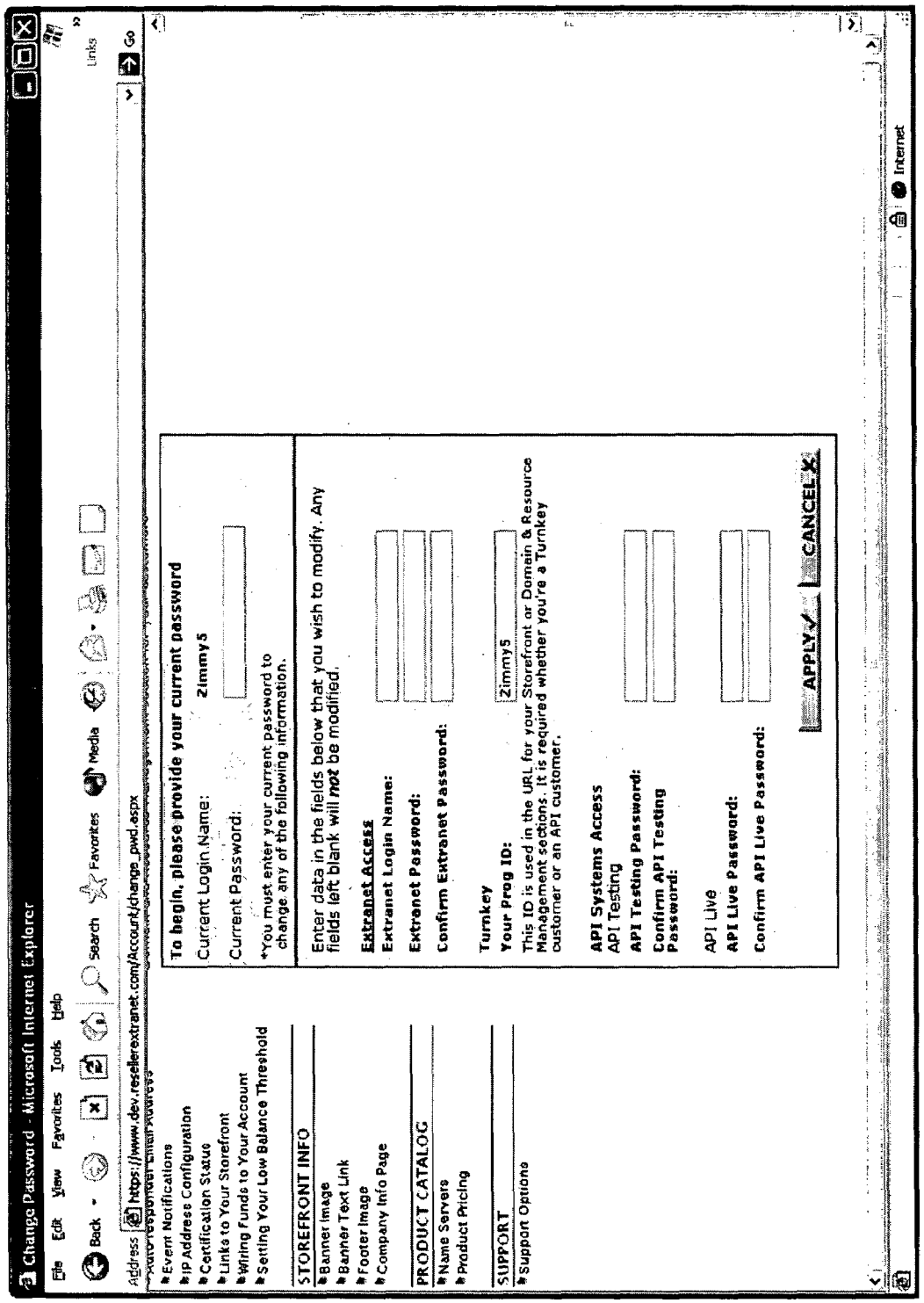
FIG. 36b is an example of a second screen shot to an Account Access web page according to a second embodiment of the invention.

Resellers 400a may desire to change their reseller login name and password used to enter the administration web site 402. FIGS. 36a and 36b show a web page in the administration web site 402 suitable for allowing Resellers 400a to update this information. This allows Resellers 400a that wish to change their login name or that need to replace a compromised password to do so. In a preferred embodiment, the previous password needs to be entered before changing either the login name or the password.

Figure 37:
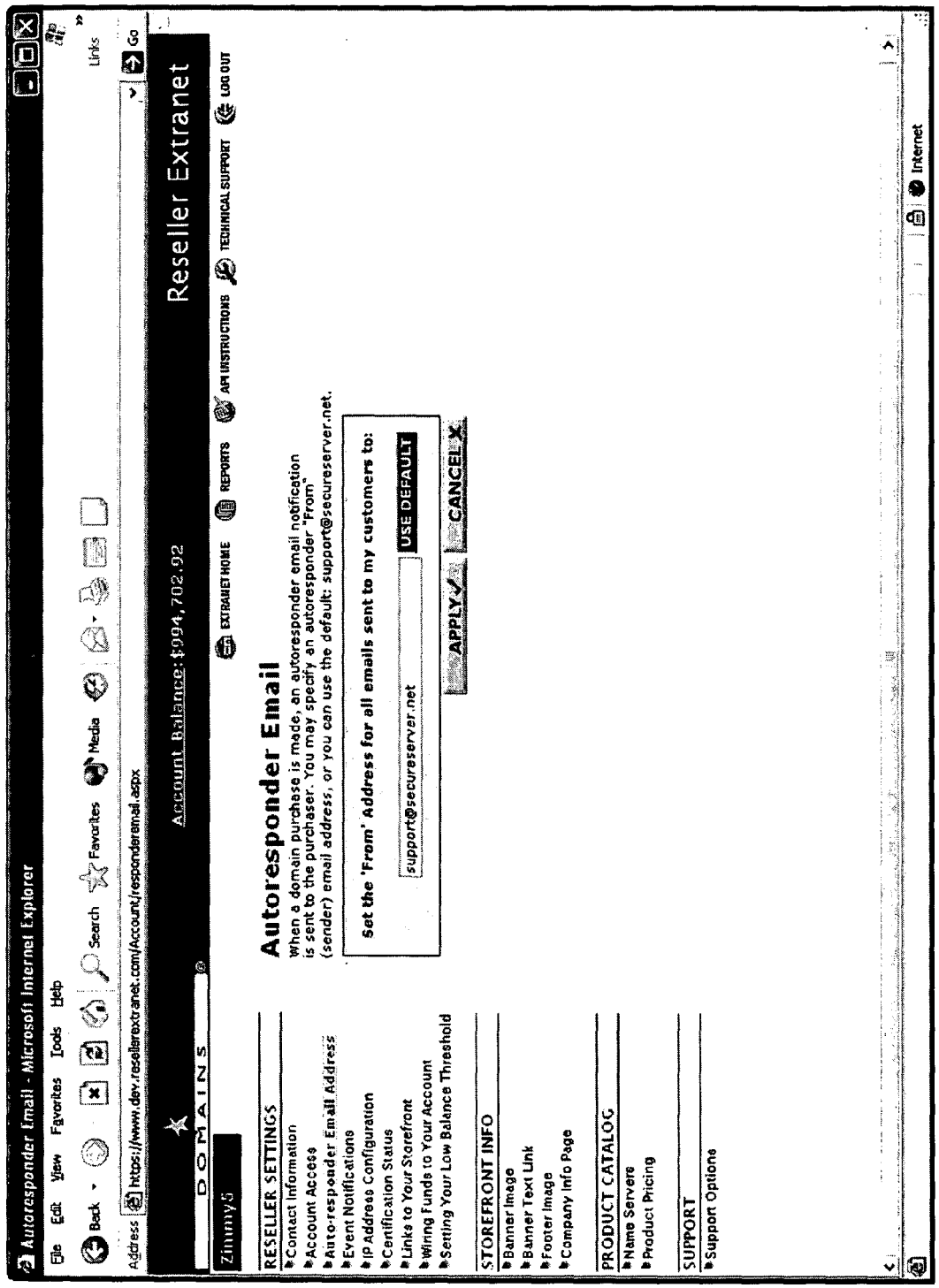
FIG. 37 is an example of a screen shot to an Autoresponder Email web page according to a second embodiment of the invention.

When a product or service is purchased by a Customer 100, an autoresponder email may be used to notify the Customer 100 of the status of their purchase. The email may have a "From" address indicating, for example, that the email came from either the Reseller 400a or the Registrar 101a. This allows Resellers 400a who desire to provide customer support services to use their email address and also allows Resellers 400a to use the Registrar's email address if the Registrar 101a is to provide customer support services. A web page for entering the desired autoresponder email is shown in FIG. 37.

Figure 38:
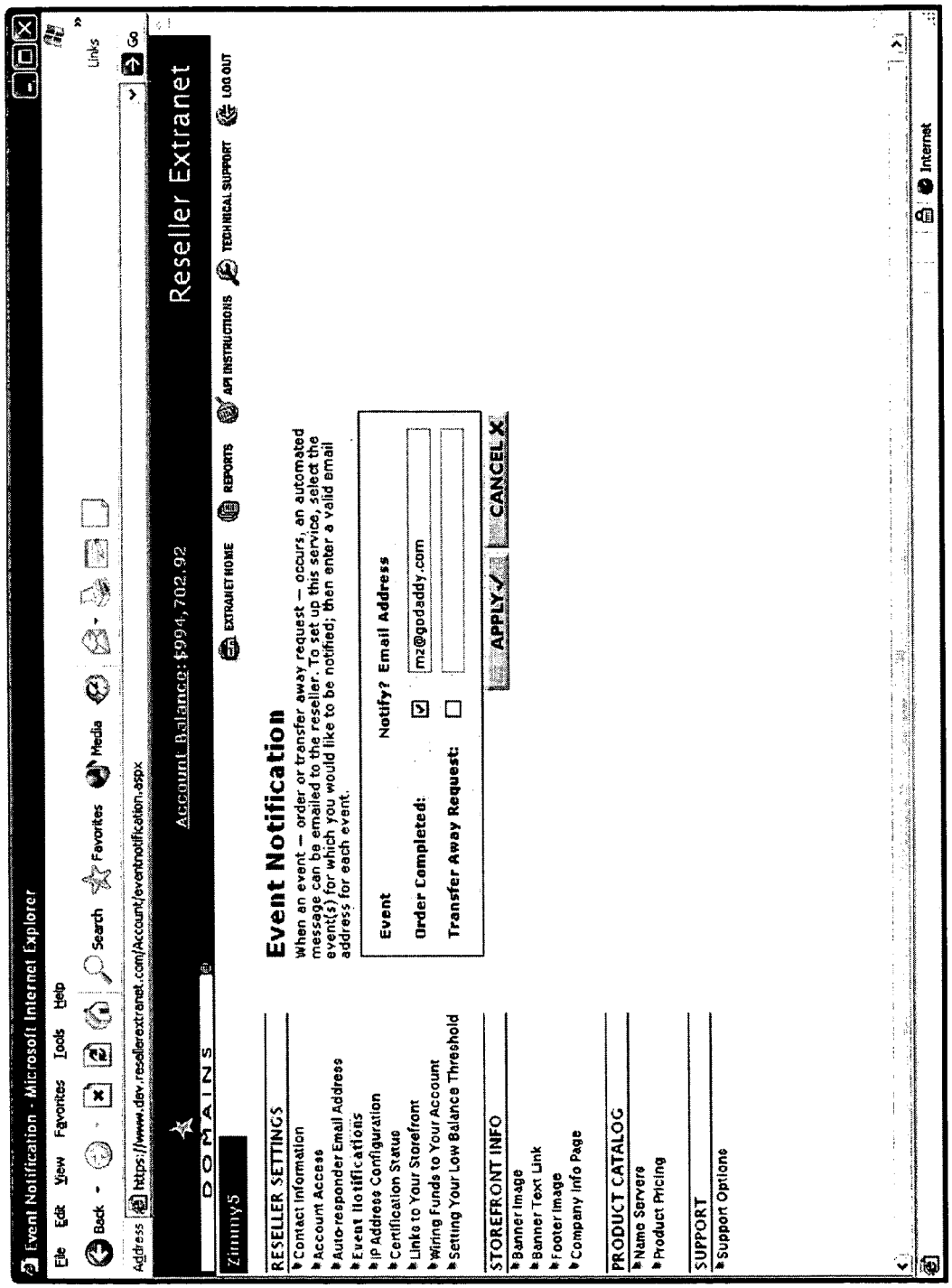
FIG. 38 is an example of a screen shot to an Event Notification web page according to a second embodiment of the invention.

Resellers 400a may desire to know as soon as possible when particular "events" have occurred on the registrar web site 403. For example, an event may be related to an order for a product or service or for a cancellation of a product or service by a Customer 100 on the registrar web site 403. Resellers 400a are preferably able to select events that, upon their occurrence, cause a notification to be sent to the affected Reseller 400a. The notification may be sent via an email to an address selected by the Reseller 400a. A web page similar to the web page shown in FIG. 38 may be used to select events and corresponding email addresses for notification of the Resellers 400a on the occurrence of the selected events.

Figure 39:
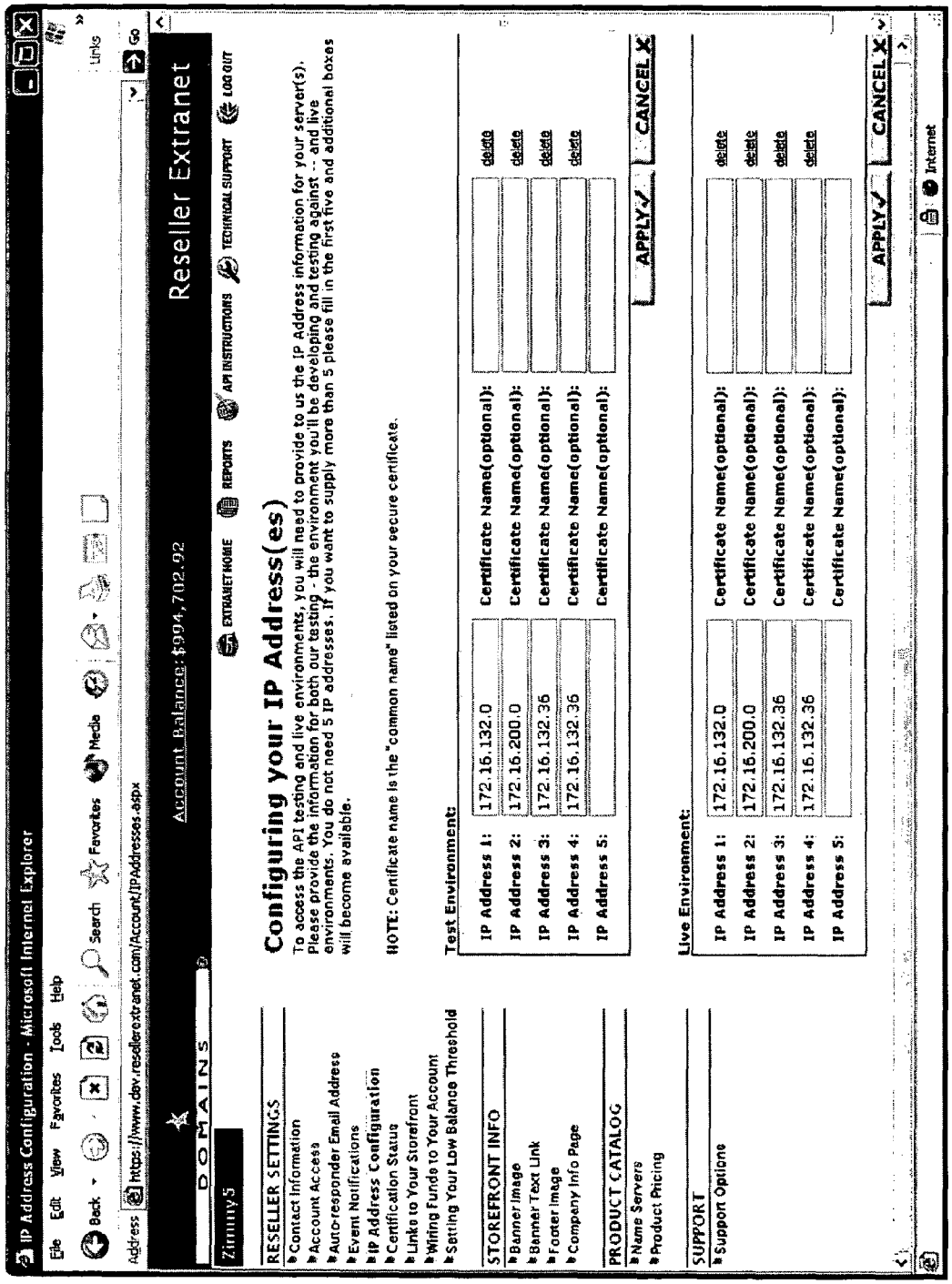
FIG. 39 is an example of a screen shot to an IP Addresses web page according to a second embodiment of the invention.

The exchanges of information between the reseller web sites 400b and the API registrar web site 403 may include information regarding bank account numbers, credit card numbers as well as other personal information. It is thus desirable to protect the confidentiality and integrity of the exchanged information using available security measures on the Internet. One security measure that may be used involves the registrar web site 403 authenticating the digital certificates of the reseller web sites 400b to verify the identities of the reseller web sites 400b. As part of this process, the reseller web site 400b needs to disclose to the administration web site 402 its IP addresses. The IP addresses may be transmitted to the administration web site 402 via a web page in the administration web site 402 similar to the web page shown in FIG. 39.

Figure 40A:
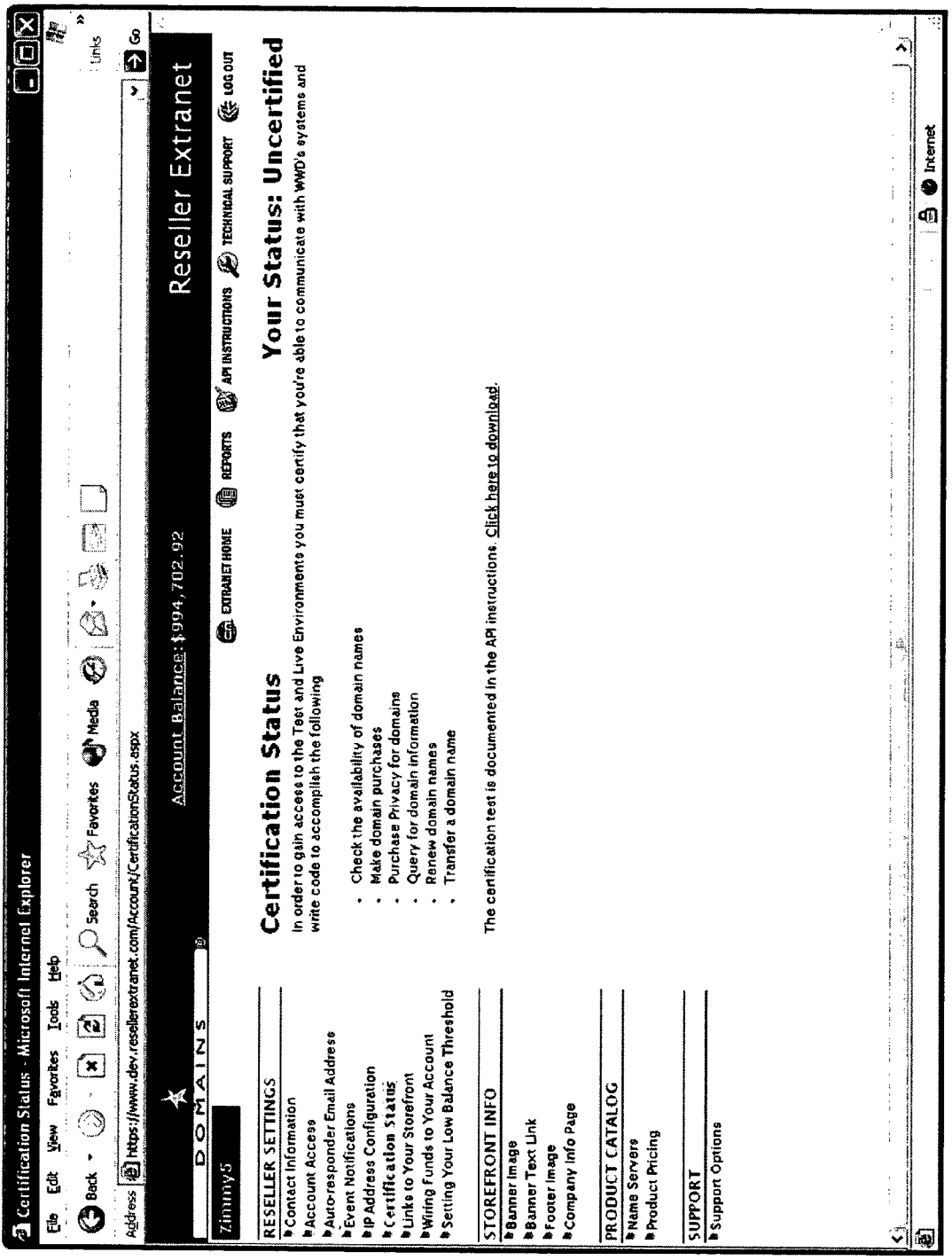
FIG. 40a is an example of a Certification Status web page according to a second embodiment of the invention.
Figure 40B:
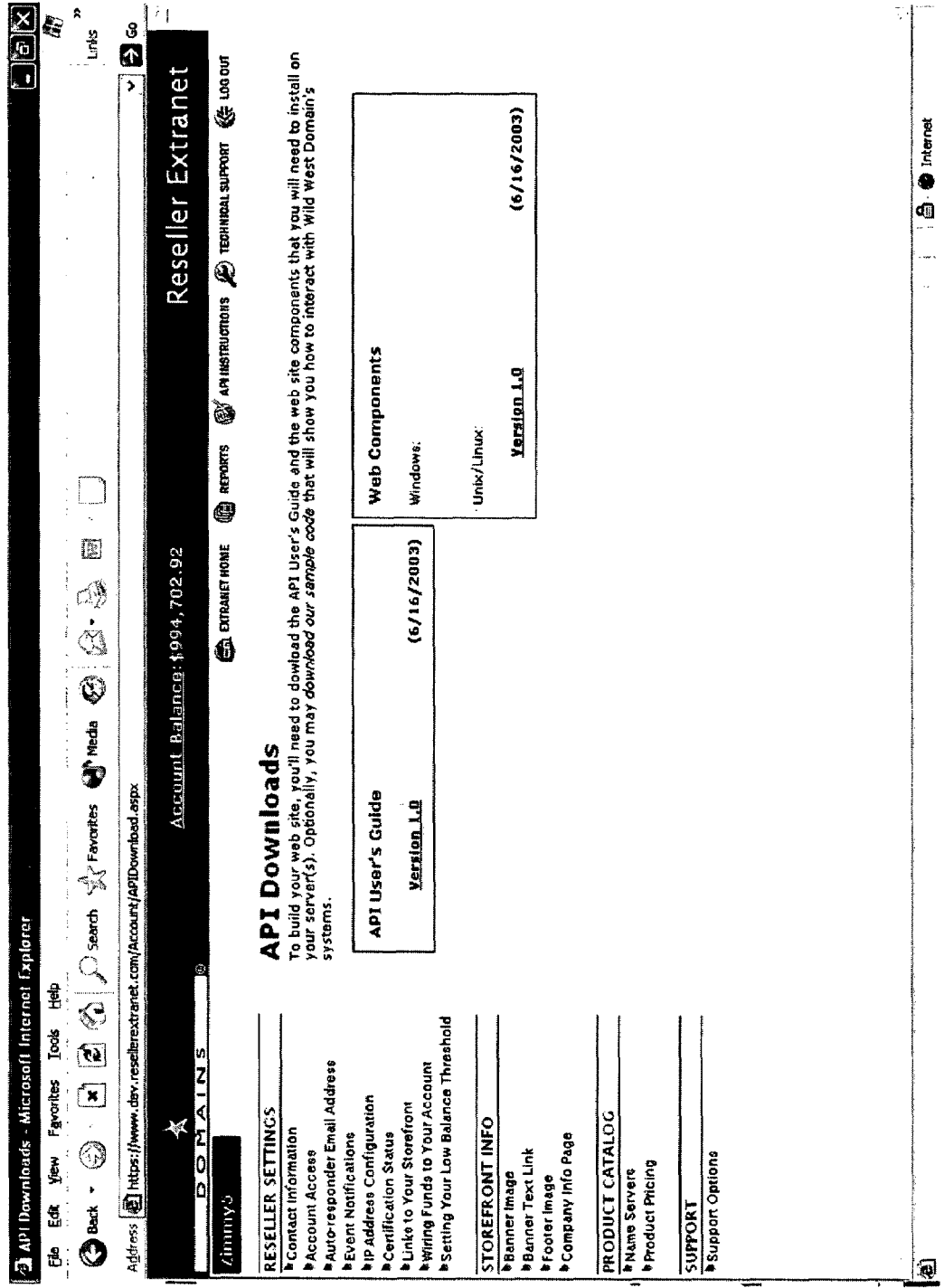
FIG. 40b is an example of an API Downloads page to assist Resellers in communicating with the Registrar.

As part of the process for registering a new Reseller 400a, it may be desirable to assist the Reseller 400a in communicating with the API Registrar web site 403. For example, a web page may be created in the API administration web site 402, similar to the example web page in FIG. 40b, to assist the Reseller 400a in obtaining the necessary software and instructions to communicate with the API registrar 403 web site. It may also be desirable to allow the Reseller 400a to download example software and provide whatever additional assistance the Reseller 400a may need. It may also be desirable to verify that the reseller web site 400b is able to communicate with the registrar web site 403. FIG. 40a shows an example web page for testing the capabilities of the reseller web site 400b. Allowing the Reseller 400a to thoroughly test their reseller web, site 400b greatly assists the Reseller 400a in setting up and trouble-shooting any technical problems they may have with their reseller web site 400b.

Figure 41A:
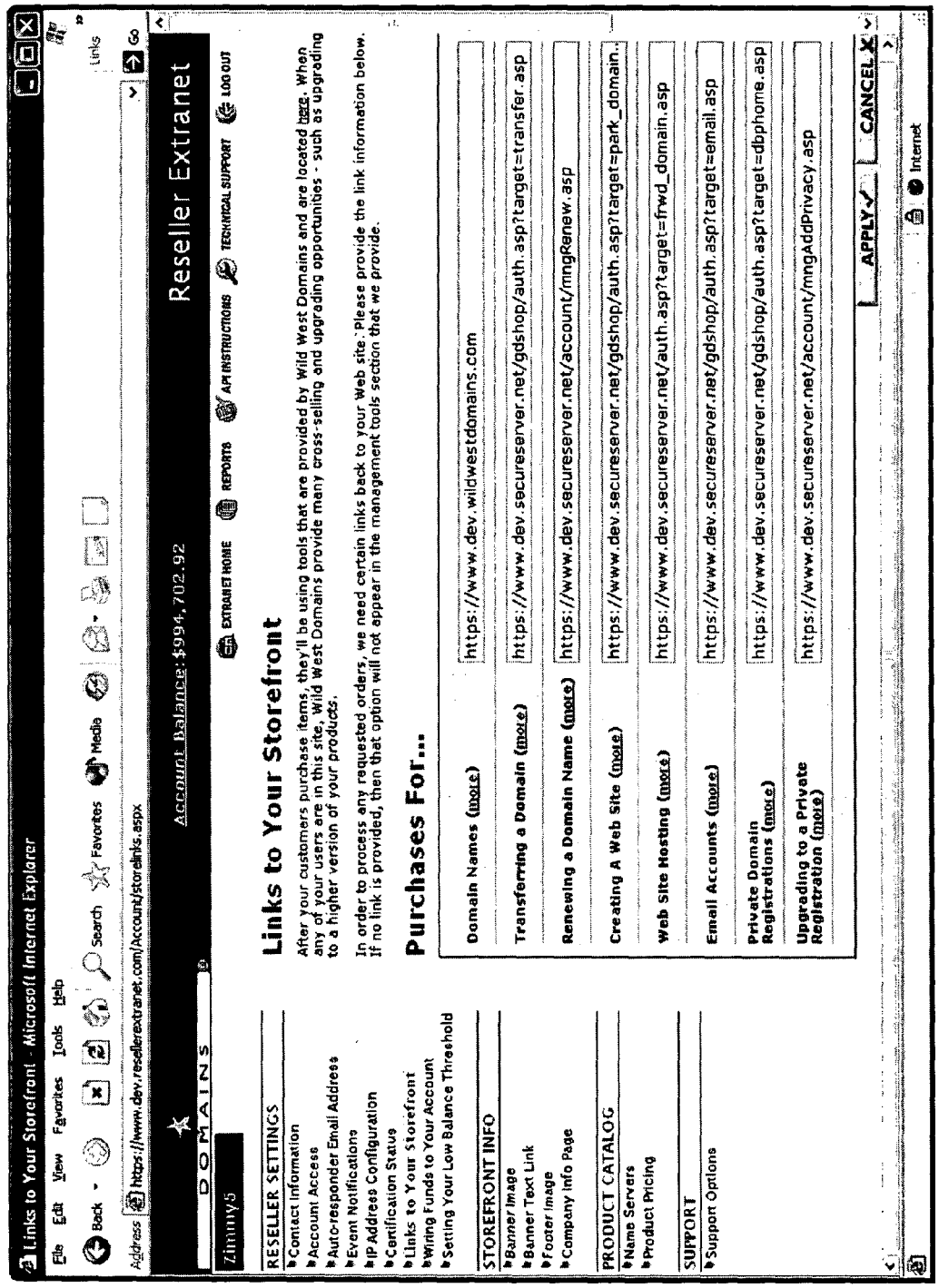
FIG. 41a is an example of a first screen shot to a Links to Your Storefront web page according to a second embodiment of the invention.
Figure 41B:
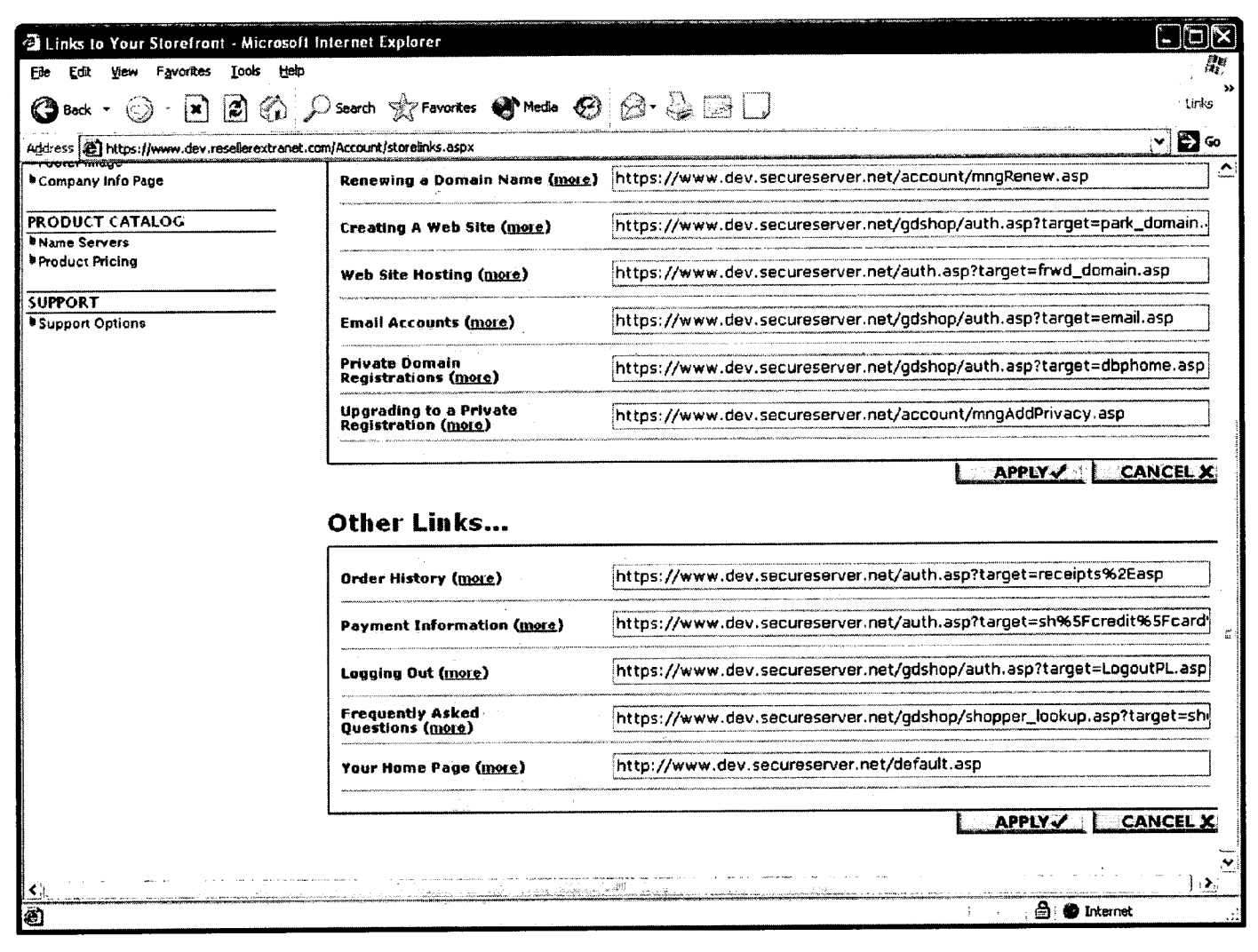

As part of the cooperation between the Resellers 400a and the Registrar 101a, links may be provided for the Customers 100 in the reseller web site 400b to link to the API registrar web site 403 and vice versa. Resellers may link the Customers 100 to the registrar web site 403 to permit the Customers to purchase and manage their purchased products and services from the Registrar 101a. Registrars 101a may link the Customers 100 back to the reseller web site 400b so that the Resellers 400a do not lose control of their Customers 100. This arrangement creates a virtual web site that makes shopping for both the products and services from the Reseller 400a and the Registrar 101a easier for the Customers 100. Resellers 400a and Registrar 101a will need to share link information to properly guide the Customers 100 between the web sites. A web page in the administration web site 402 illustrated in FIGS. 41a and 41b show a possible method for the Reseller 400a to share this information with the Registrar 101a. The information preferably includes link addresses and the condition, e.g. upon a particular type of sale, upon which the link should occur.

Figure 42:
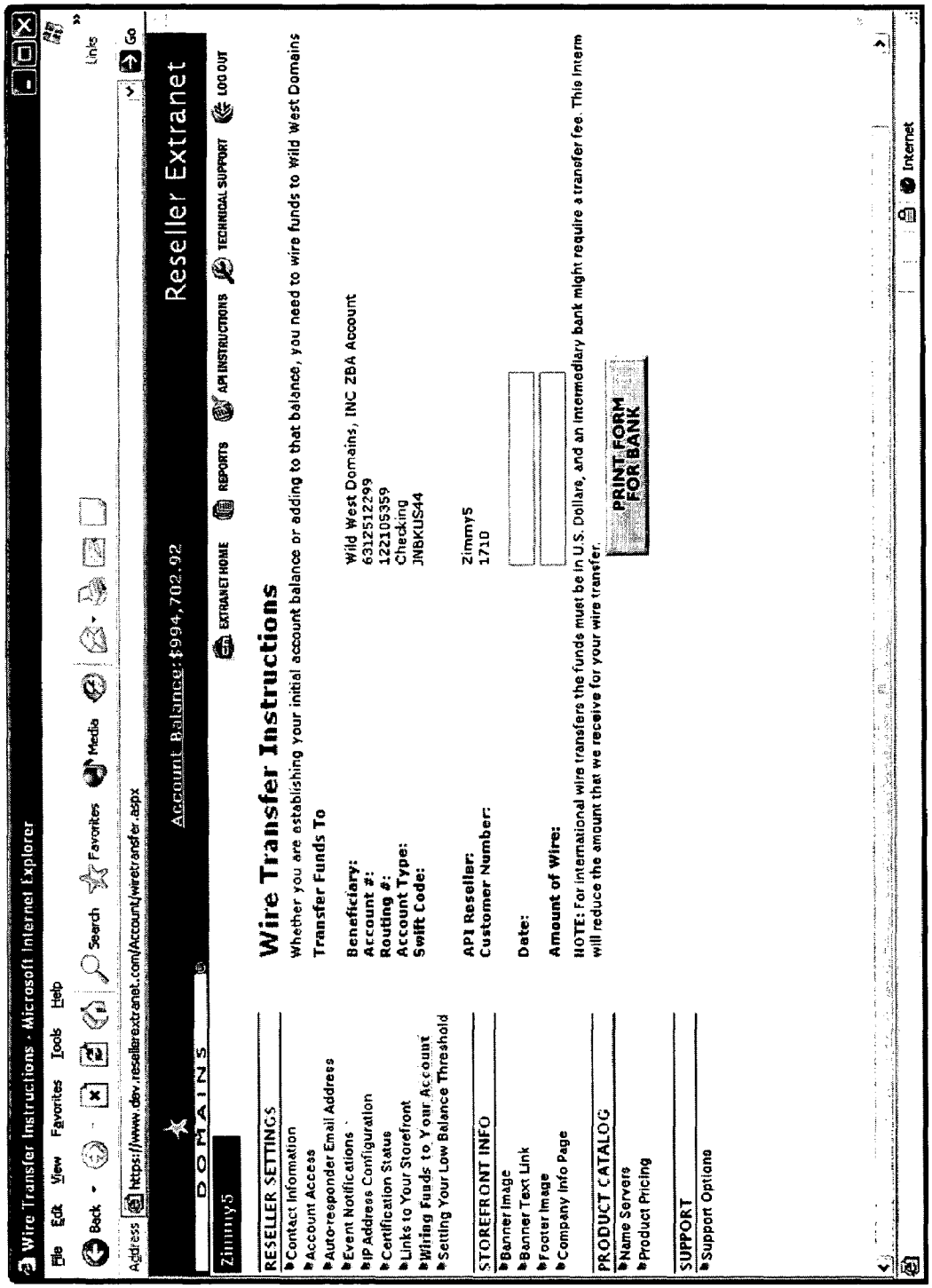
FIG. 42 is an example of a screen shot to a Wire Transfer Form web page according to a second embodiment of the invention.
Figure 43:
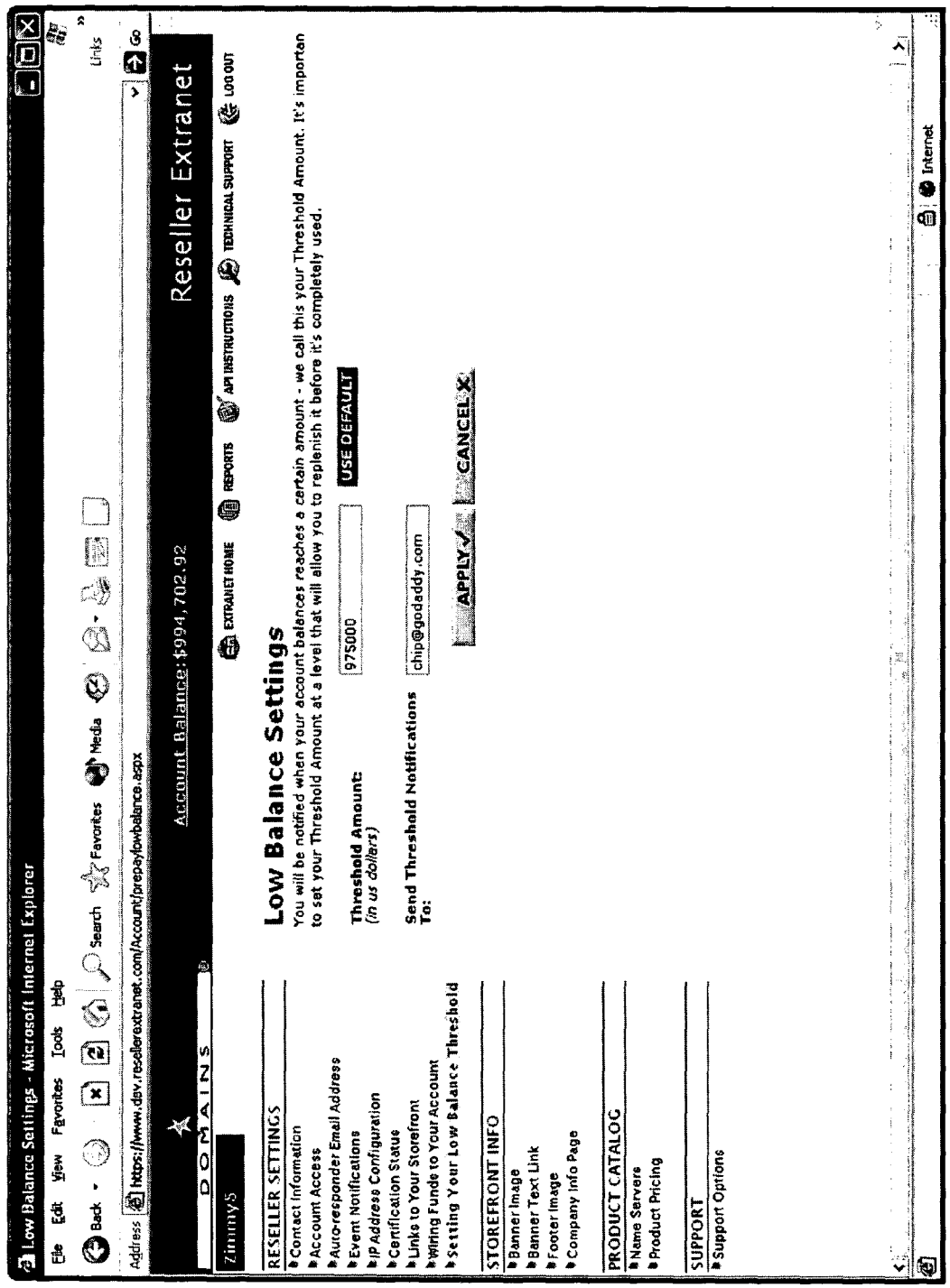
FIG. 43 is an example of a screen shot to a Low Balance Settings web page according to a second embodiment of the invention.

For this embodiment of the invention, Customers 100 will typically pay their Reseller 400a and the Reseller 400a will typically pay the Registrar 101a for the products and services purchased by the Customers 100. Resellers 400a may pay the Registrar 101a during or after the products or services are purchased by the Customer 100, but the Resellers 400a preferably, from the point of view of the Registrar 101a, have a prepaid account with the Registrar 101a. FIG. 43 shows a web page that may be used to manage prepaid accounts that would transmit an email to one or more email addresses in the event that the prepaid account drops below a selected level. FIG. 42 shows a web page that may be used to facilitate wire transfers from a Reseller 400a to the Registrar 101a.

Figure 44:
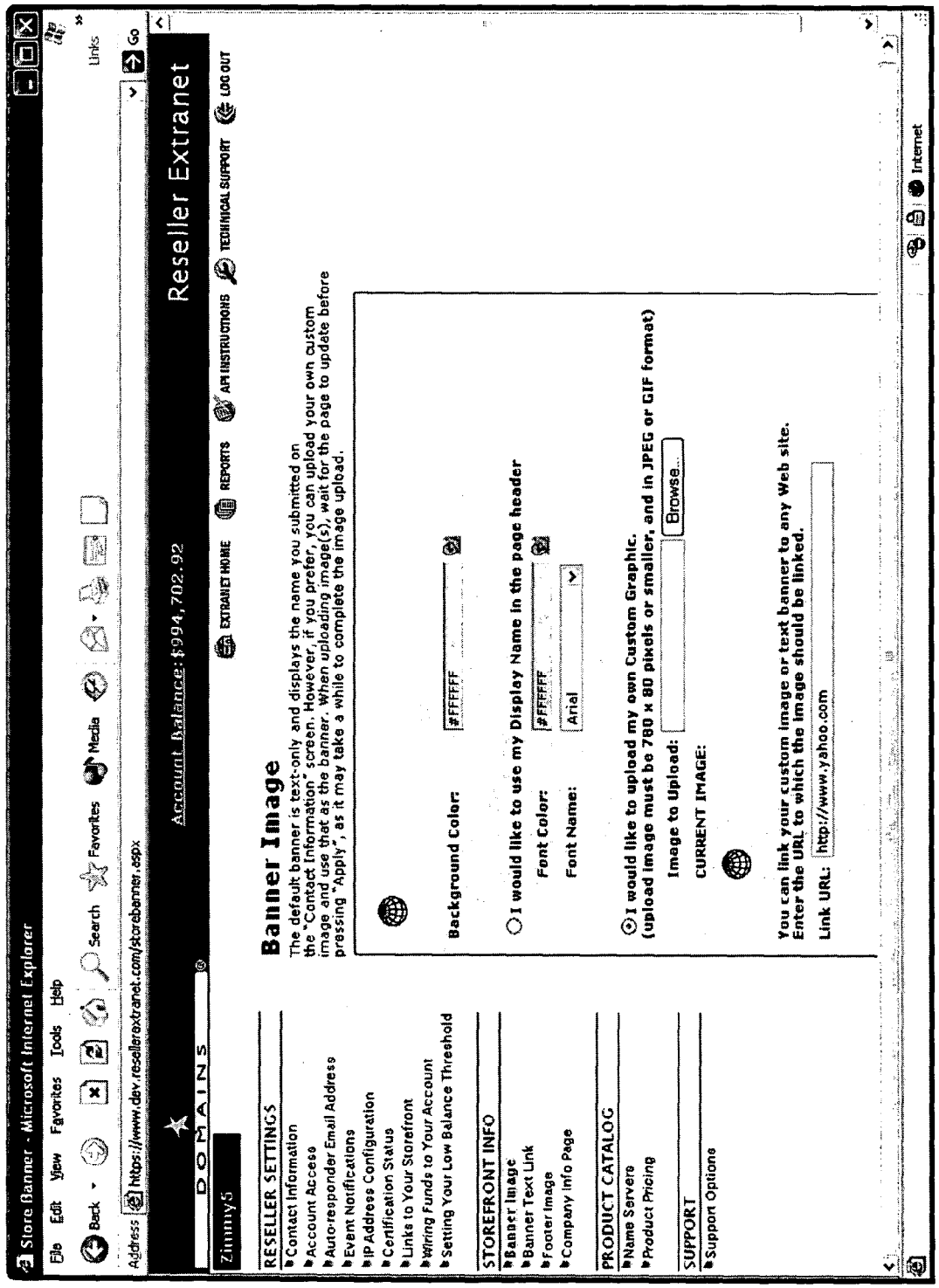
FIG. 44 is an example of a screen shot to a Banner Image web page according to a second embodiment of the invention.
Figure 46:
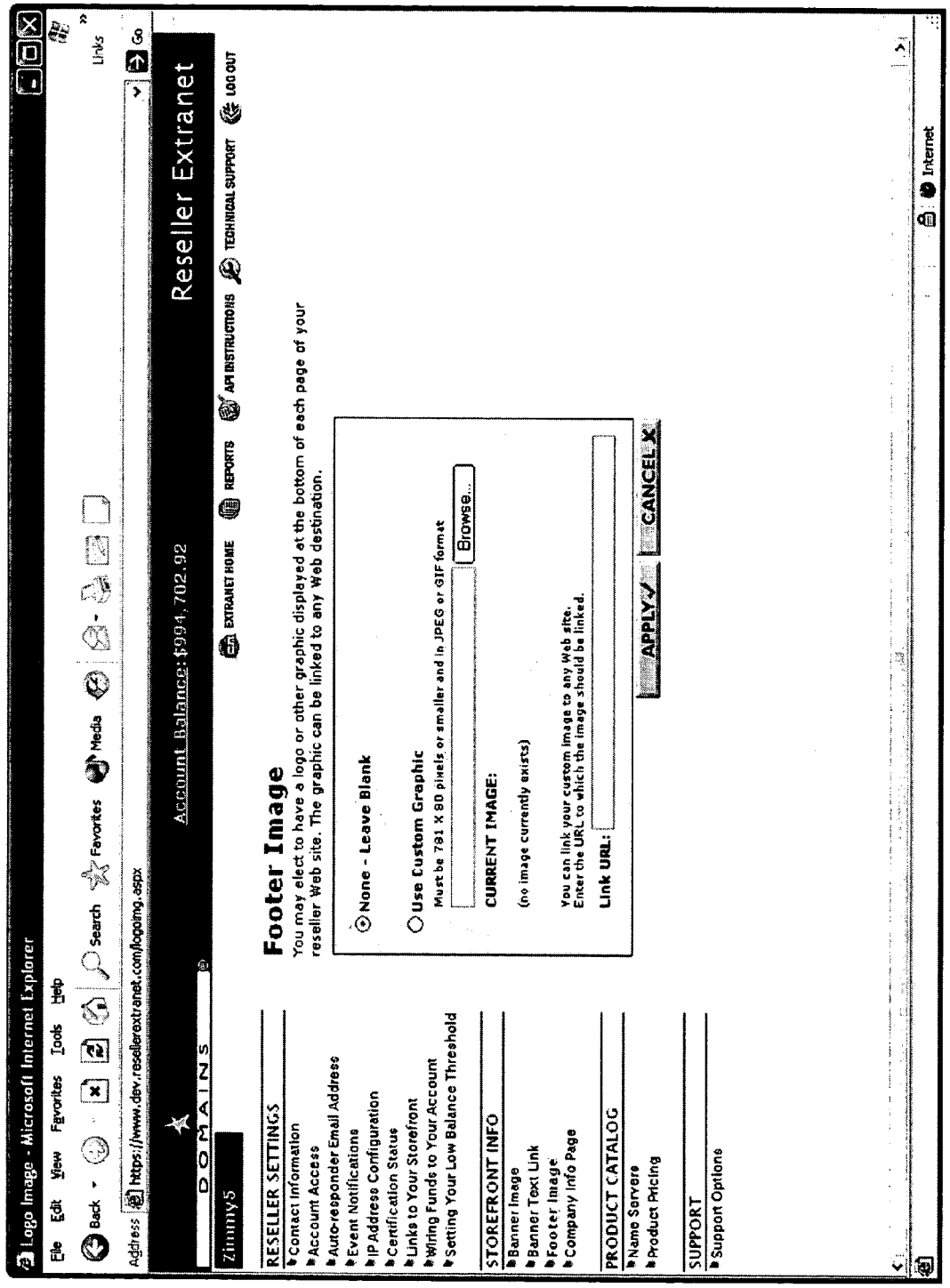
FIG. 46 is an example of a screen shot to a Footer Image web page according to a second embodiment of the invention.

In order to maintain the appearance of a single web site, i.e. the virtual web site, by the Reseller 400a, graphics and text may be selected by the Reseller 400a to be applied to the registrar web site 403. For example, a custom banner, home page image and footer image may be selected by each Reseller 400a. Unique graphics on a web page will typically enhance the visual appearance of the web page, thereby improving the shopping experience of each Customer 100 and leading the Customers 100 into making more purchases at the registrar web site 403. Resellers 400a may select from default images provided by the administration web site 402, but the Resellers 400a preferably provide their own distinctive graphics. The graphics may have different colors for fonts and background and text for each Reseller 400a. Web pages, as shown in FIG. 44, and FIG. 46 may be used by each Reseller 400a to easily select the desired features for their banner and footer image respectively.

Figure 45:
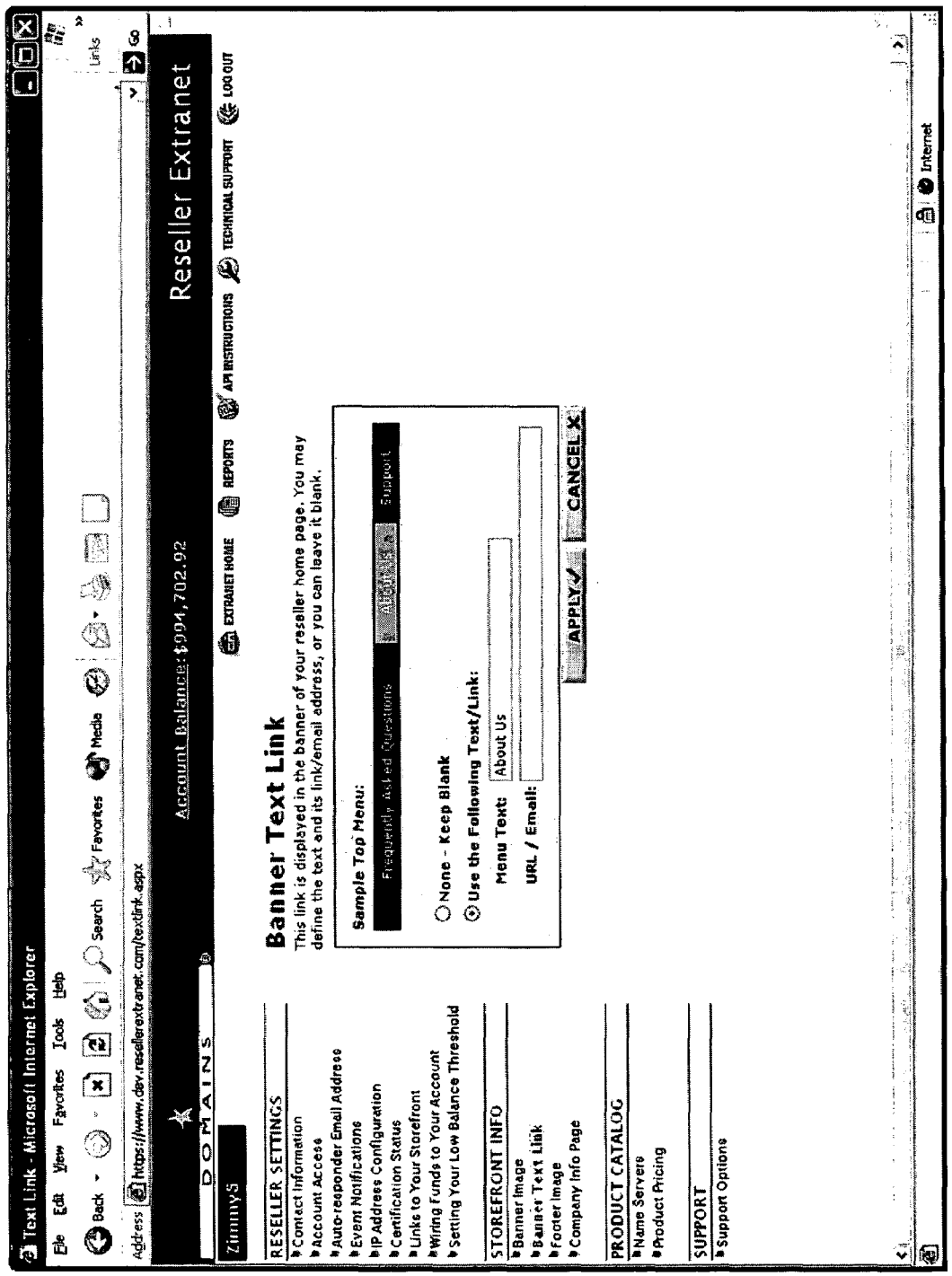
FIG. 45 is an example of a screen shot to a Banner Text Link web page according to a second embodiment of the invention.

In a preferred embodiment, a text link may be placed within the banner. A Customer 100 that selects the text link may be linked to another web site or may be given an opportunity to email a message to the Reseller 400a that set up the banner. FIG. 45 shows an example of a web page in the administration web site 402 that may be used to create the text link and the text link's associated URL or email address.

Figure 47:
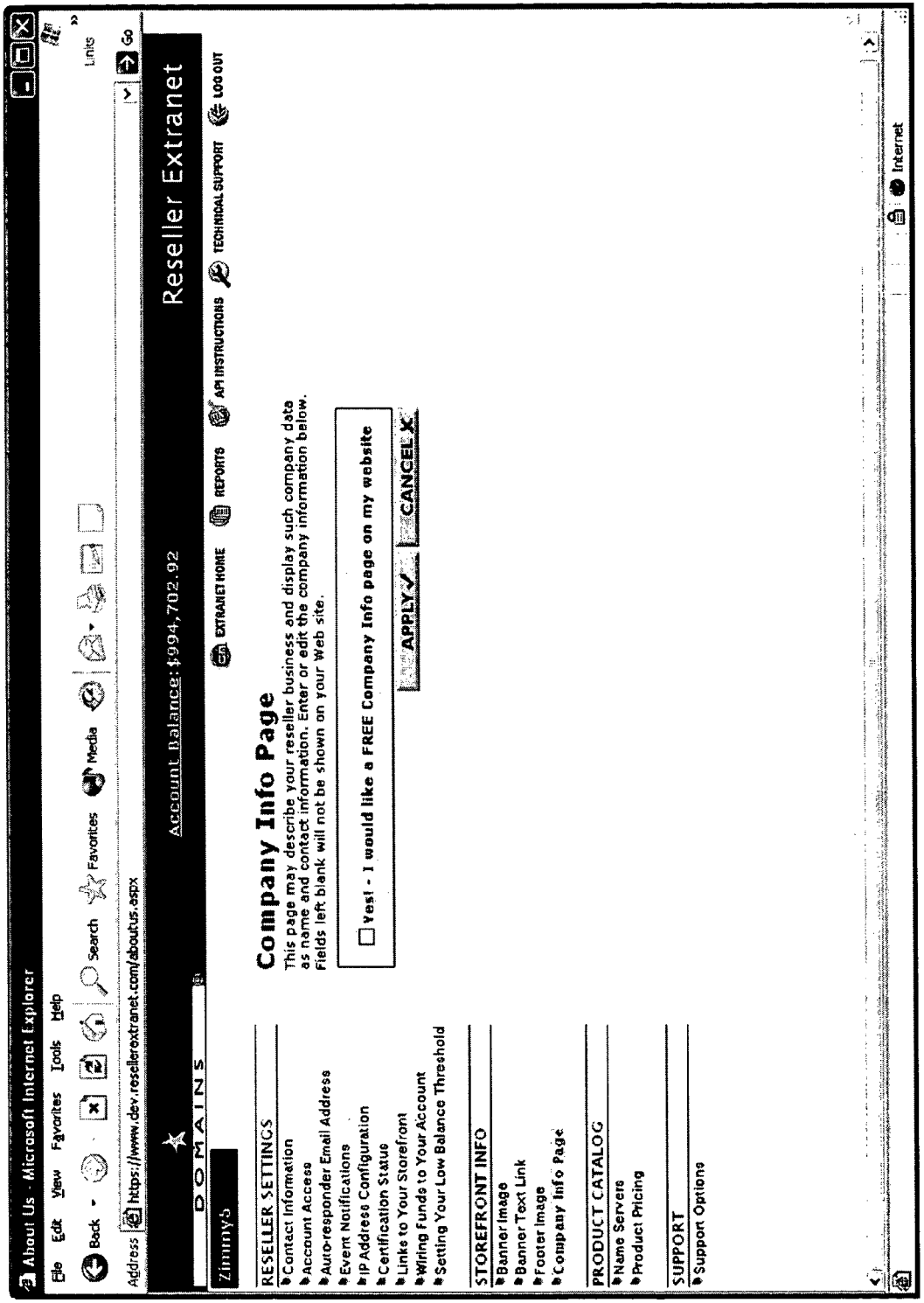
FIG. 47 is an example of a screen shot to a Company Info web page according to a second embodiment of the invention.

Resellers 400a may want to allow Customers 100 to view their company and contact information and to give their Customers 100a personal message or greeting. This information may be entered into a web page in the administration web site 402 specifically created for this purpose, such as the example web page shown in FIG. 47. The company and contact information and personal message or greeting may then be displayed on one of the web pages in the registrar web site 403 for Customers 100 to view. The personal message and greeting allow Resellers 400a to perform marketing activities, such as offer promotions, and further enhance the appearance of the registrar web site 403 being a part of the reseller web site 400b.

Figure 48A:
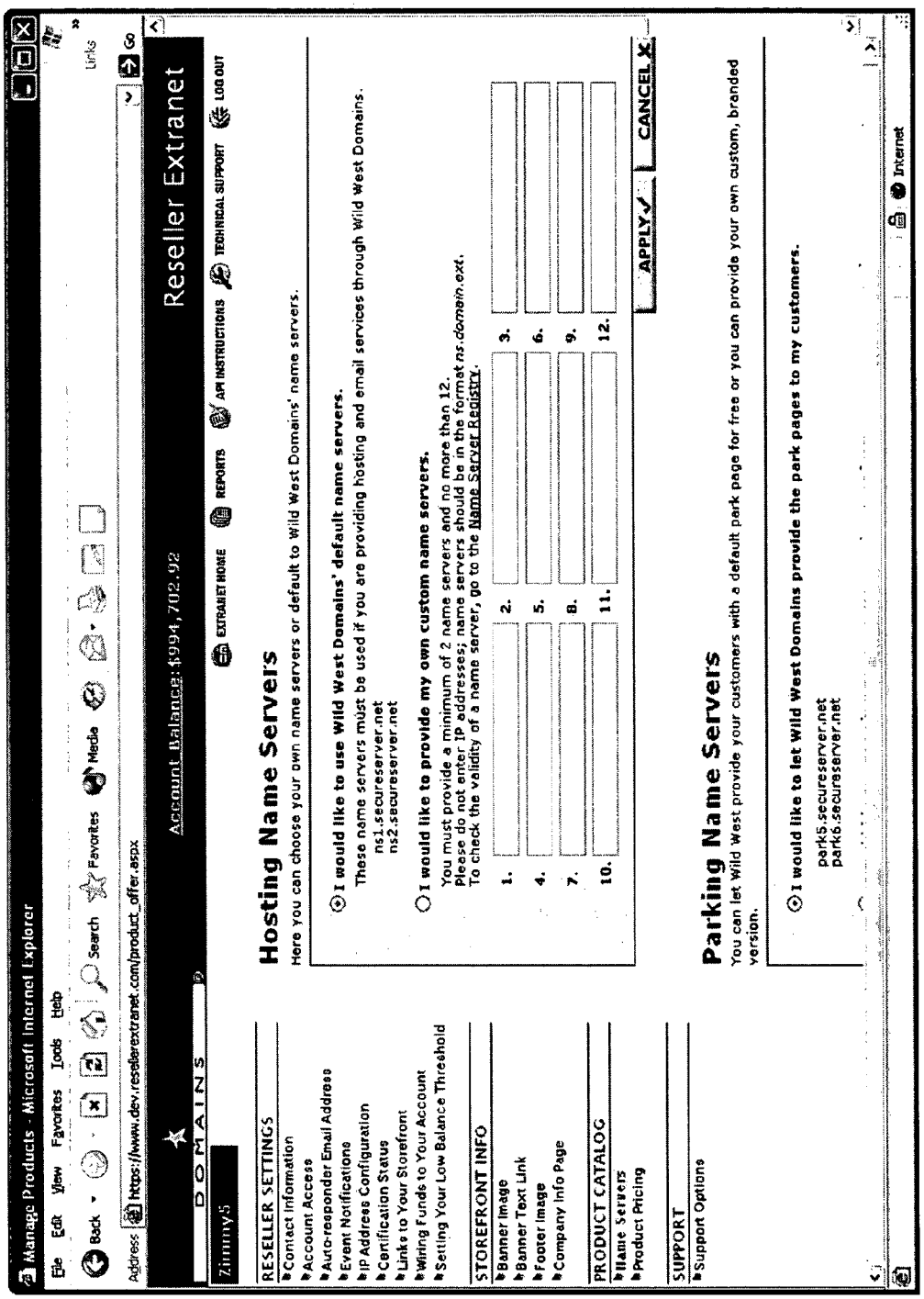
FIG. 48a is an example of a first screen shot for a Name Server web page according to a second embodiment of the invention.
Figure 48B:
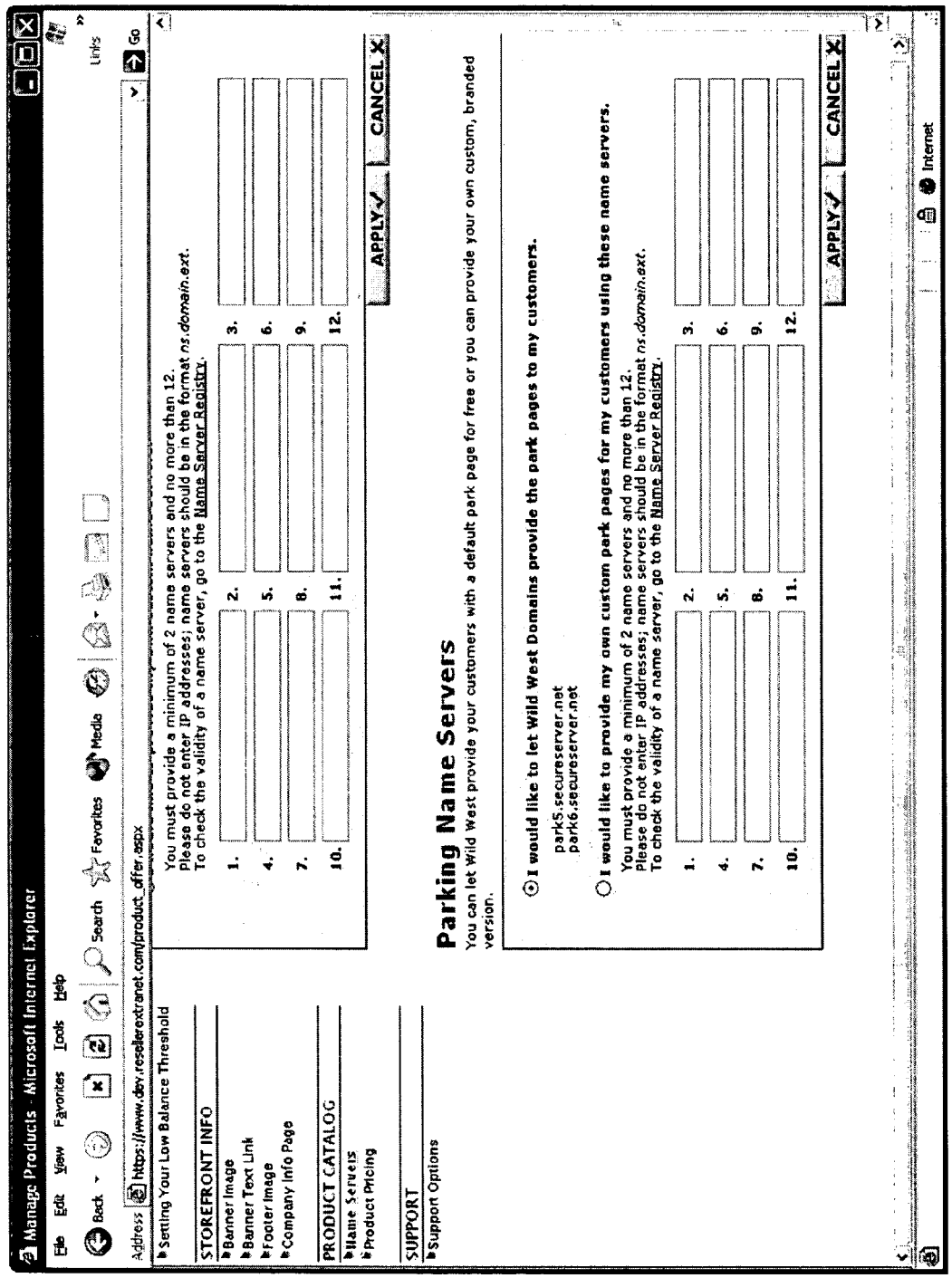
FIG. 48b is an example of a second screen shot for a Name Server web page according to a second embodiment of the invention.

Any number and type of products and services may be sold by Resellers 400a using the registrar web site 403. Advantageously, services related to domain name registration may be sold. Resellers 400a may wish to provide their Customers 100 with options regarding the hosting of registered domain names. For example, Customers 100 may be given the option to have the Registrar 101a, Reseller 400a or an ISP to host the registered domain name. The Customers 100 may also be given the option of selecting their hosting name servers. FIGS. 48a and 48b show a web page in the administration web site 402 that may be used to allow a Reseller 400a to select how these options will be displayed for Customers 100 on the registrar web site 403. If hosting services are to be offered by a Reseller 400a, a method for Customers 100 to select domain name servers may be provided. Resellers 400a may desire to provide their Customers 100 with a parking name server or the Resellers 400a may allow the Registrar 101a to provide parking name servers to the Customers 100. FIGS. 48a and 48b show an example web page at an administration web site 402 that may be used to allow Resellers 400a to select the product and services, hosting name servers and parking name servers that they wish to offer to their Customers 100 at the registrar web site 403.

Figure 49A:
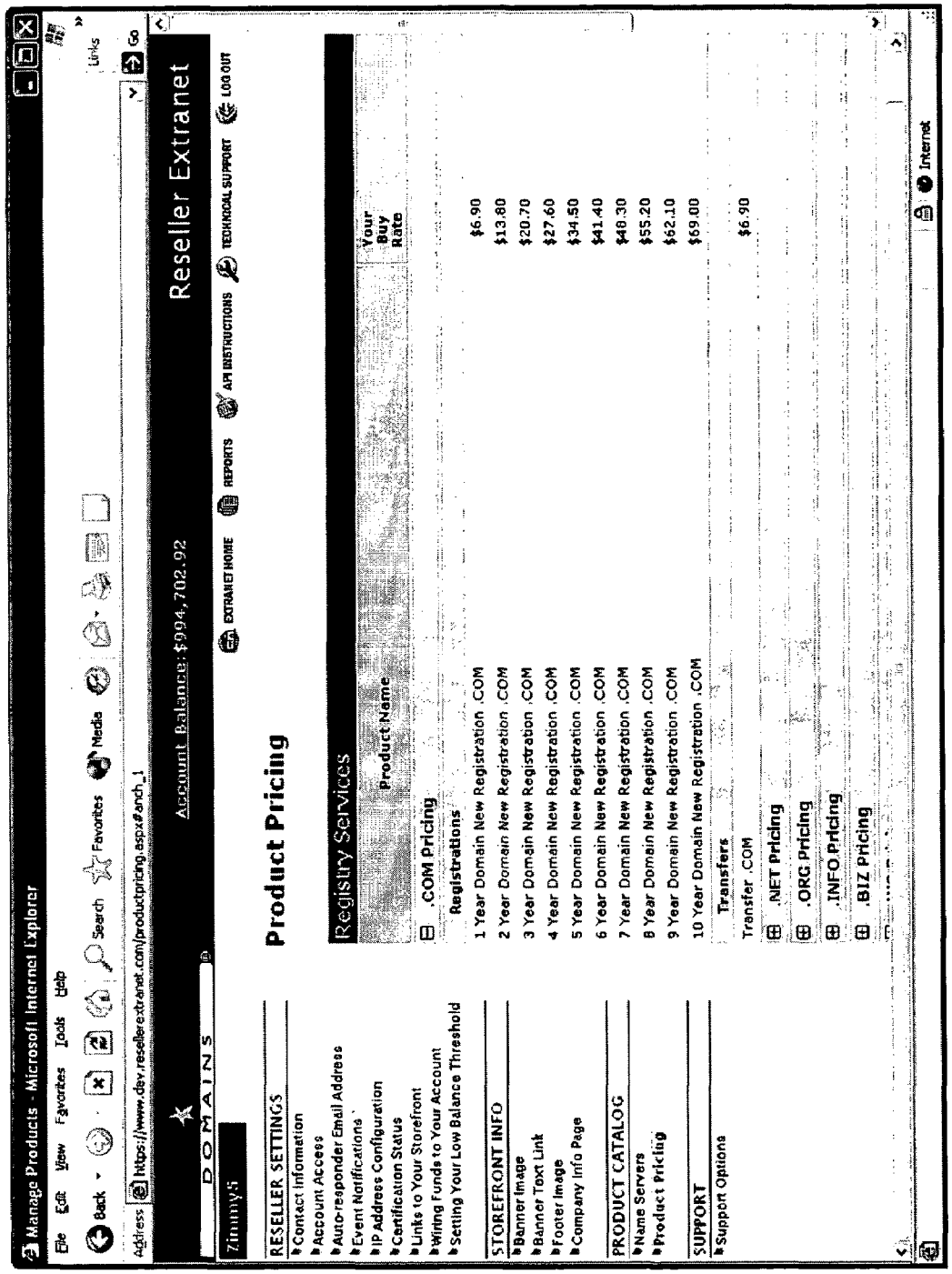
FIG. 49a is an example of a first screen shot to a Product Pricing web page according to a second embodiment of the invention.
Figure 49B:
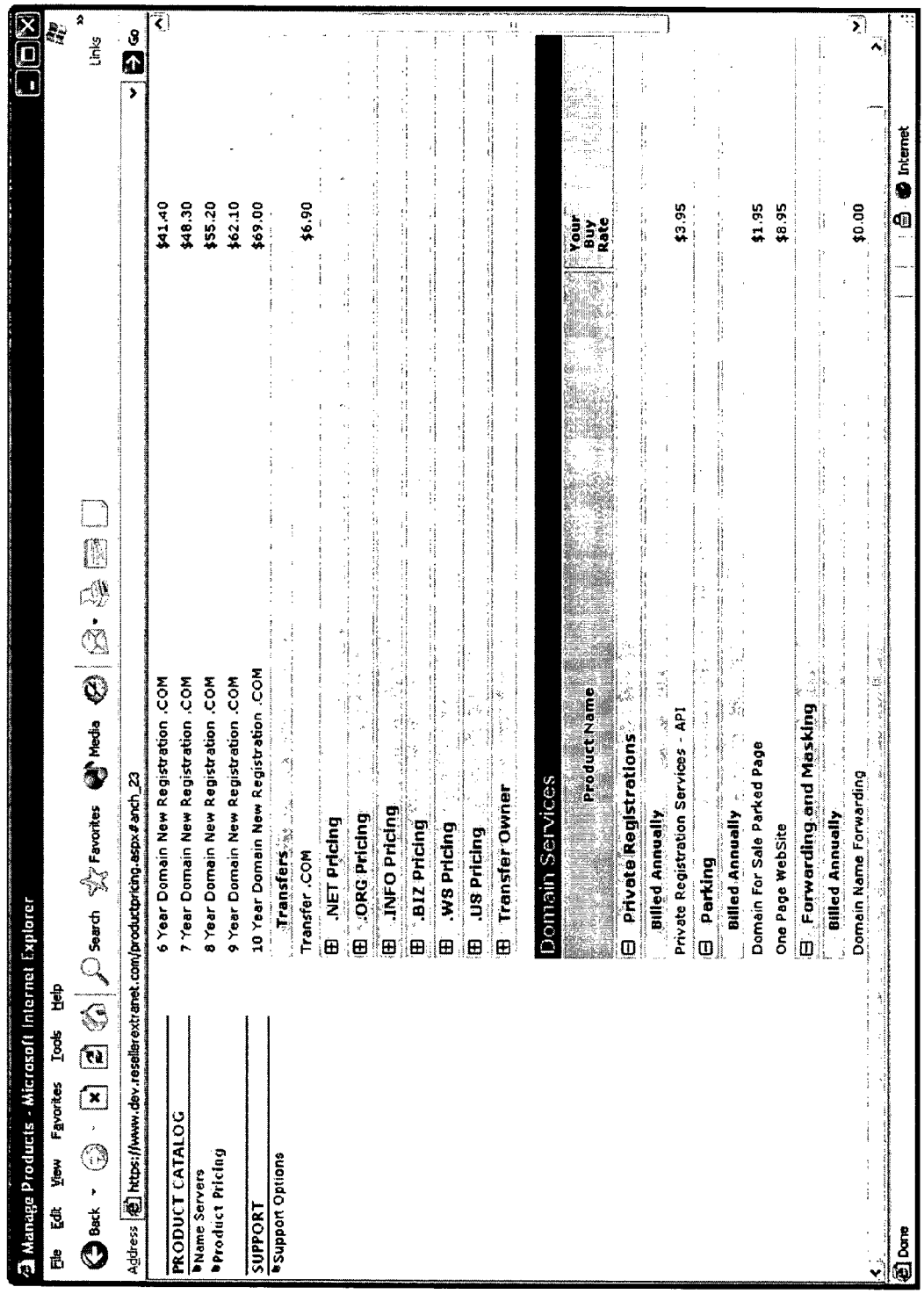
FIG. 49b is an example of a second screen shot to a Product Pricing web page according to a second embodiment of the invention.
Figure 49C:
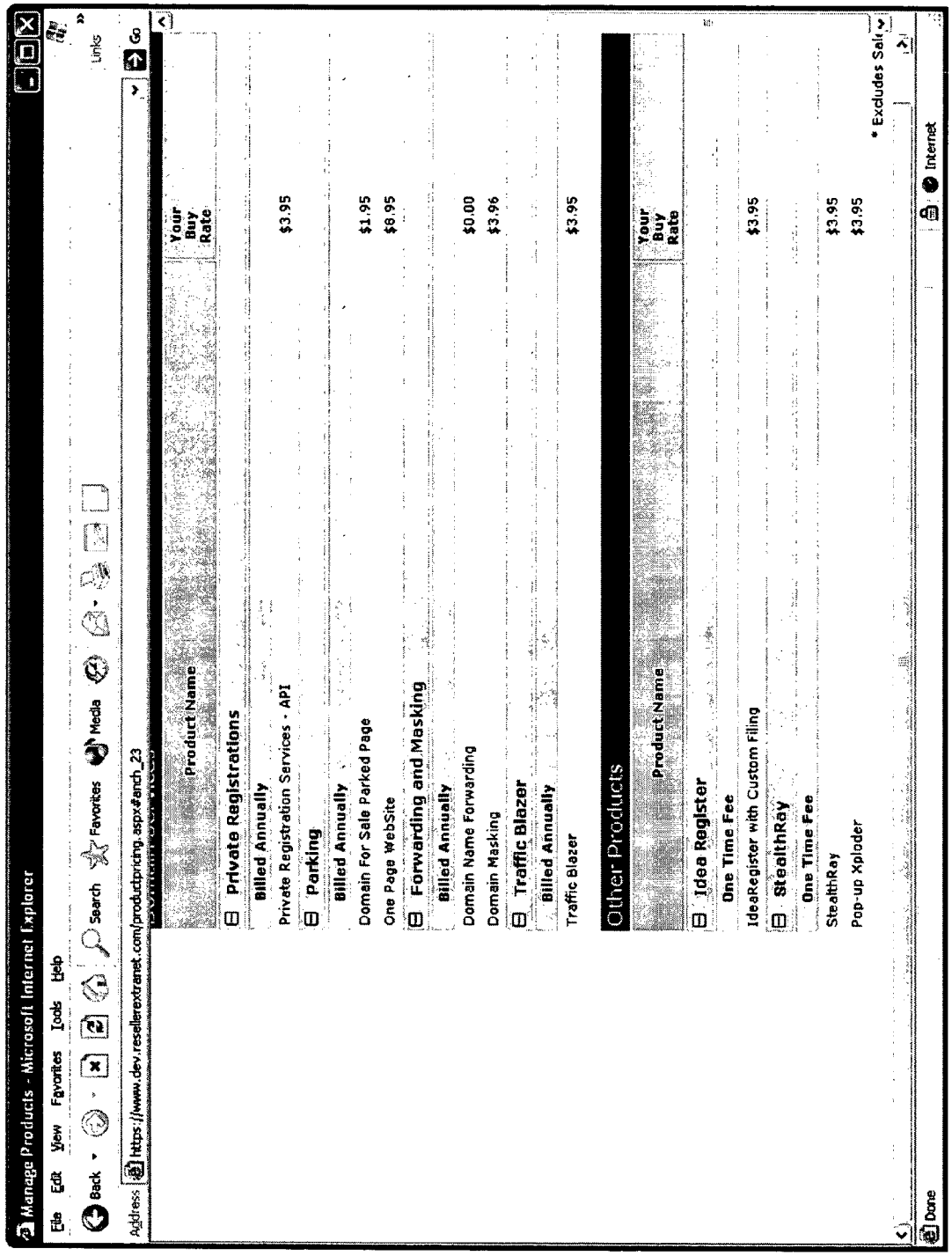
FIG. 49c is an example of a third screen shot to a Product Pricing web page according to a second embodiment of the invention.

Resellers 400a may desire to set their own prices for the various products and services that they have selected to offer their Customers 100. Example web pages on an administration web site 402 are illustrated in FIGS. 49a, 49b and 49c and show one possible method for allowing Resellers 400a to set custom prices for their Customers 100. Allowing Resellers 400a to set their own prices greatly enhances each Reseller's 400a ability to create a unique marketing strategy and specifically target a portion of the market based on the level of service the Reseller 400a wishes to provide.

Figure 50:
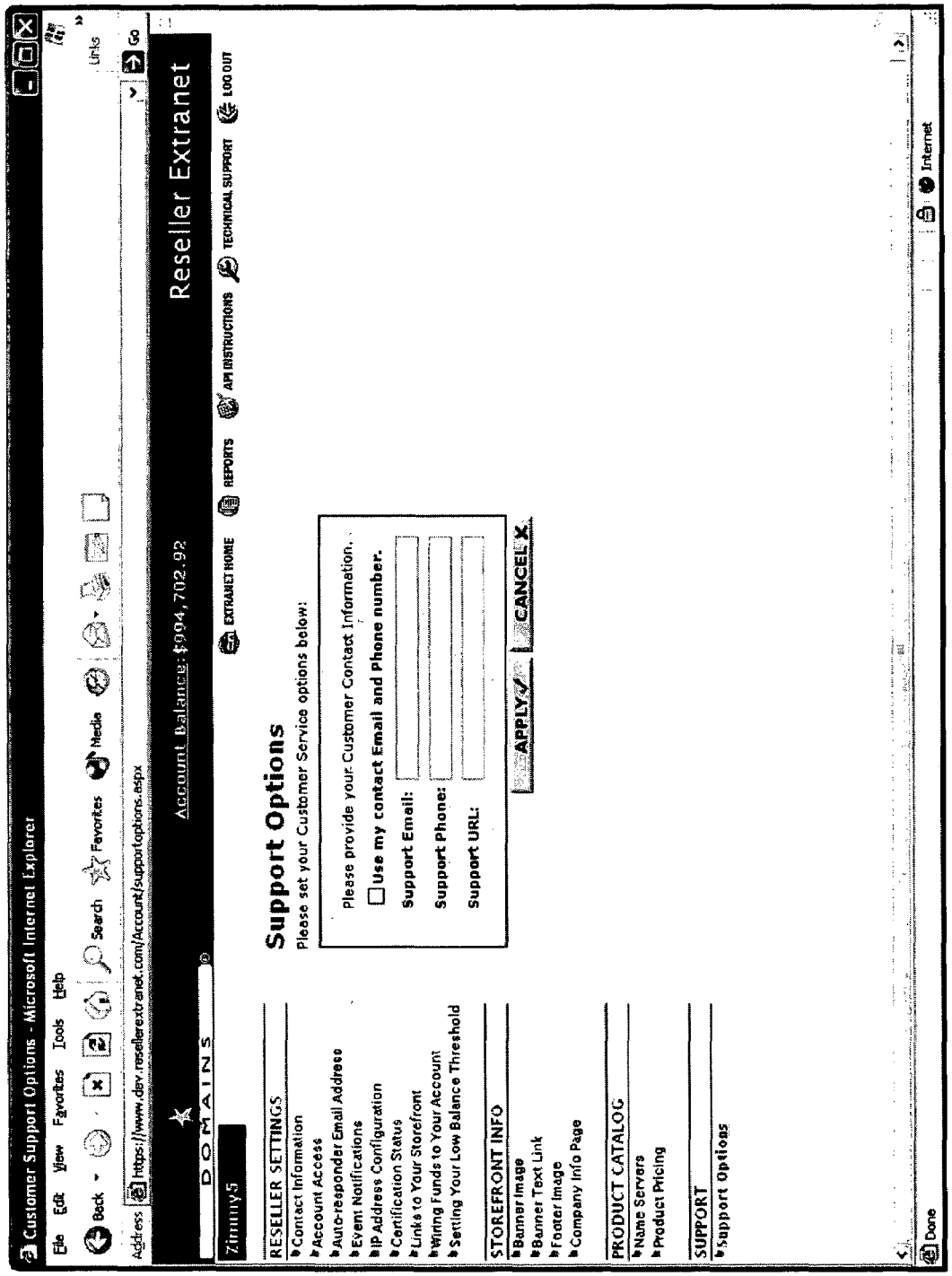
FIG. 50 is an example of a screen shot to a Support Options web page according to a second embodiment of the invention.

Resellers 400a may desire to handle support requests themselves or the Resellers 400a may desire for the Registrar 101a handles the support requests. If the Resellers 400a desire to handle the support requests, they may need to provide contact information for their support service to the Registrar 101a. In a preferred embodiment, each Reseller 400a may select who will be handling the support requests from their Customers 100 for each product and service the Reseller 400a has chosen to sell. A web page, similar to the one shown in FIG. 50, may be used on the administration web site 402 to allow the Resellers 400a to customize their method of handling support issues.

Figure 51:
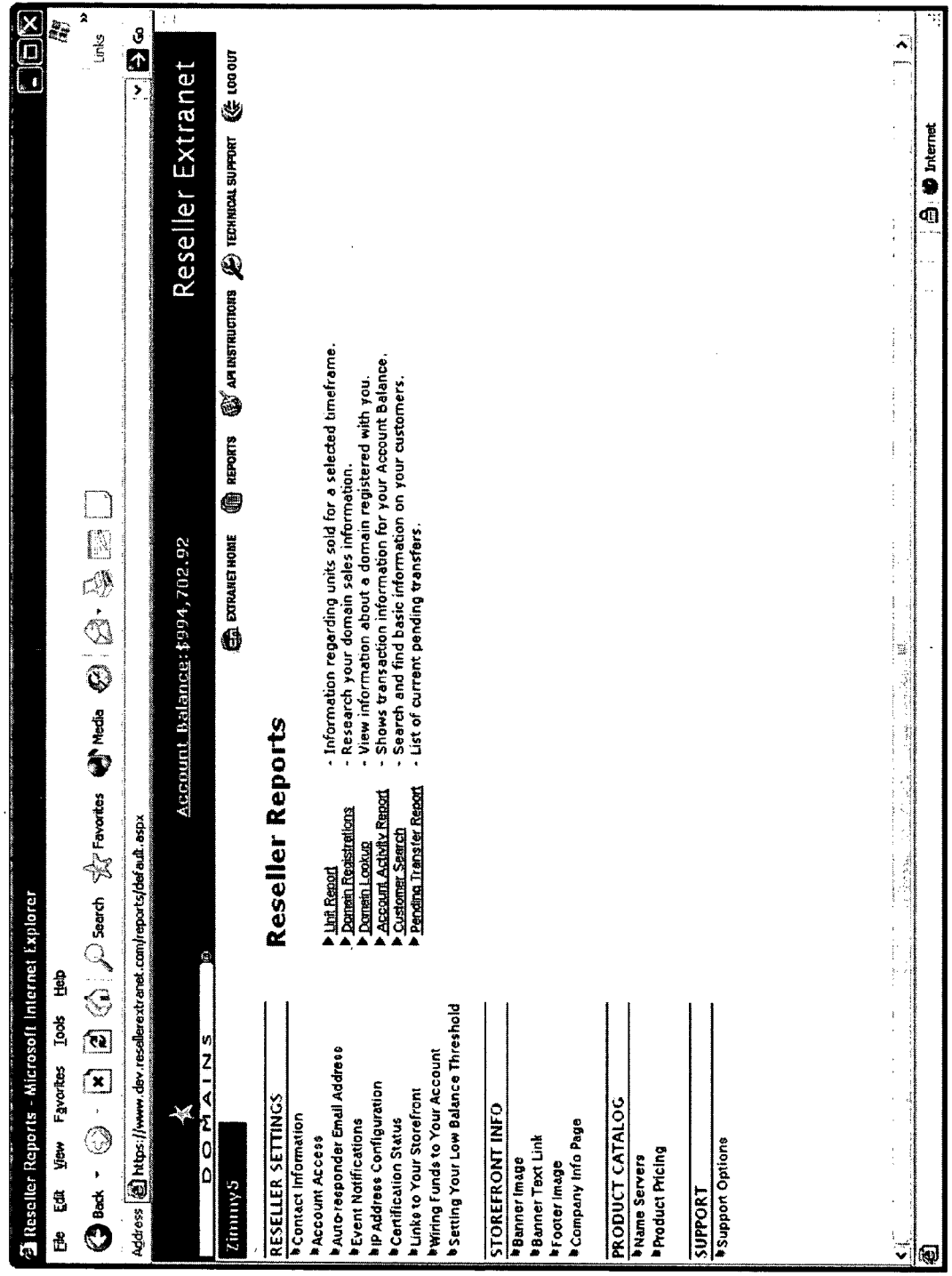
FIG. 51 is an example of a screen shot to a Reseller Reports web page according to a second embodiment of the invention.
Figure 52:
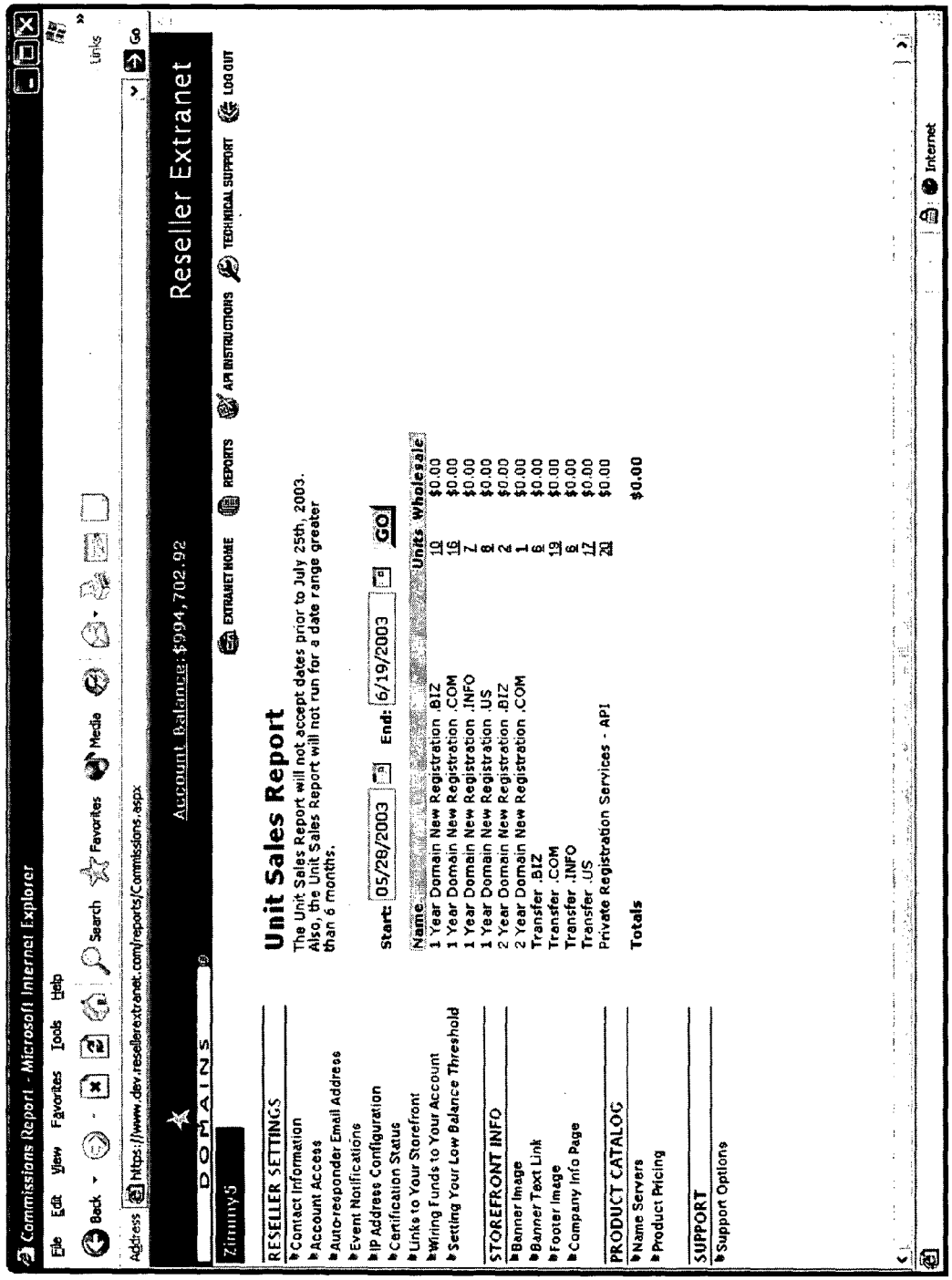
FIG. 52 is an example of a screen shot to a Unit Sales Report web page according to a second embodiment of the invention.
Figure 53:
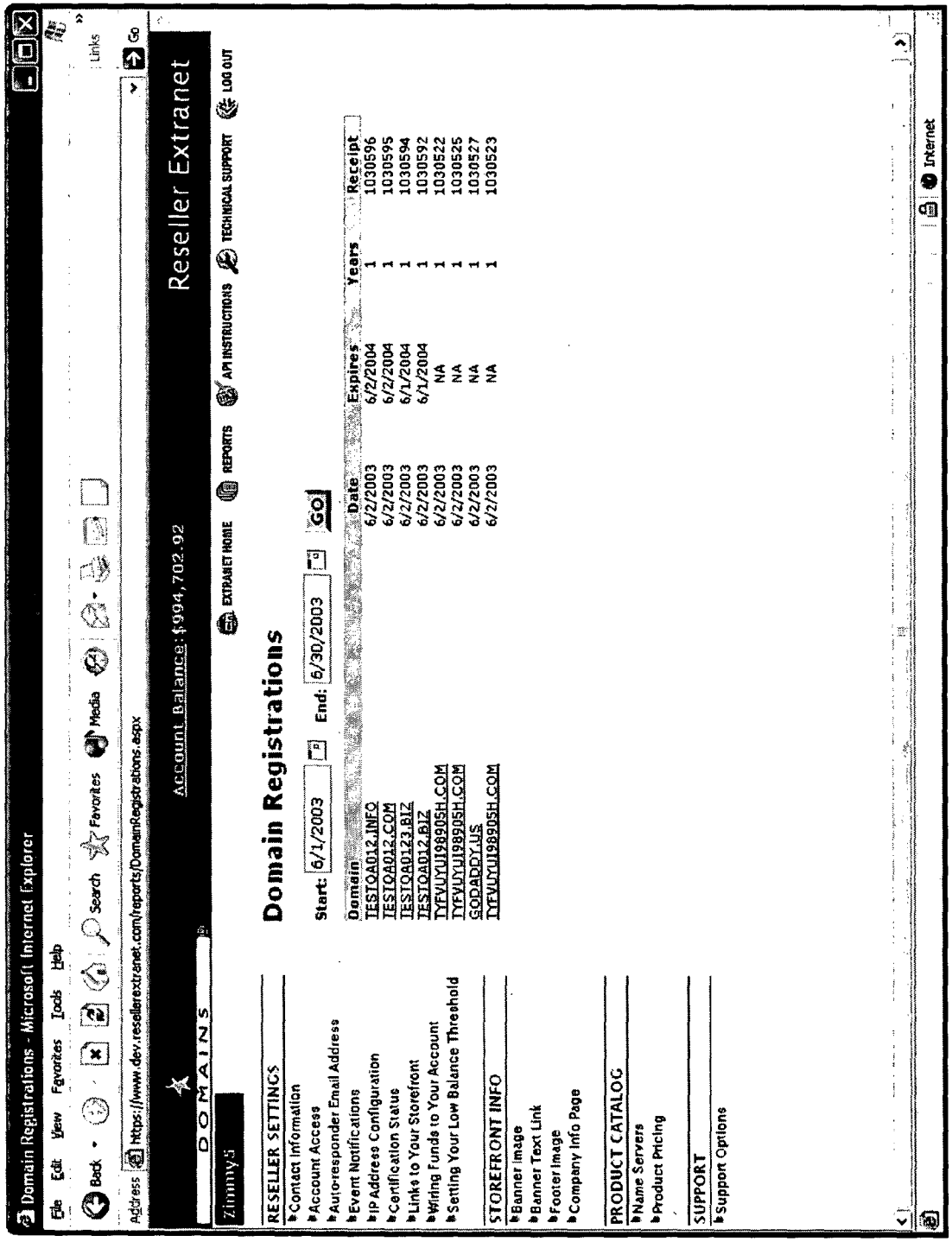
FIG. 53 is an example of a screen shot to a Domain Registrations web page according to a second embodiment of the invention.
Figure 54:
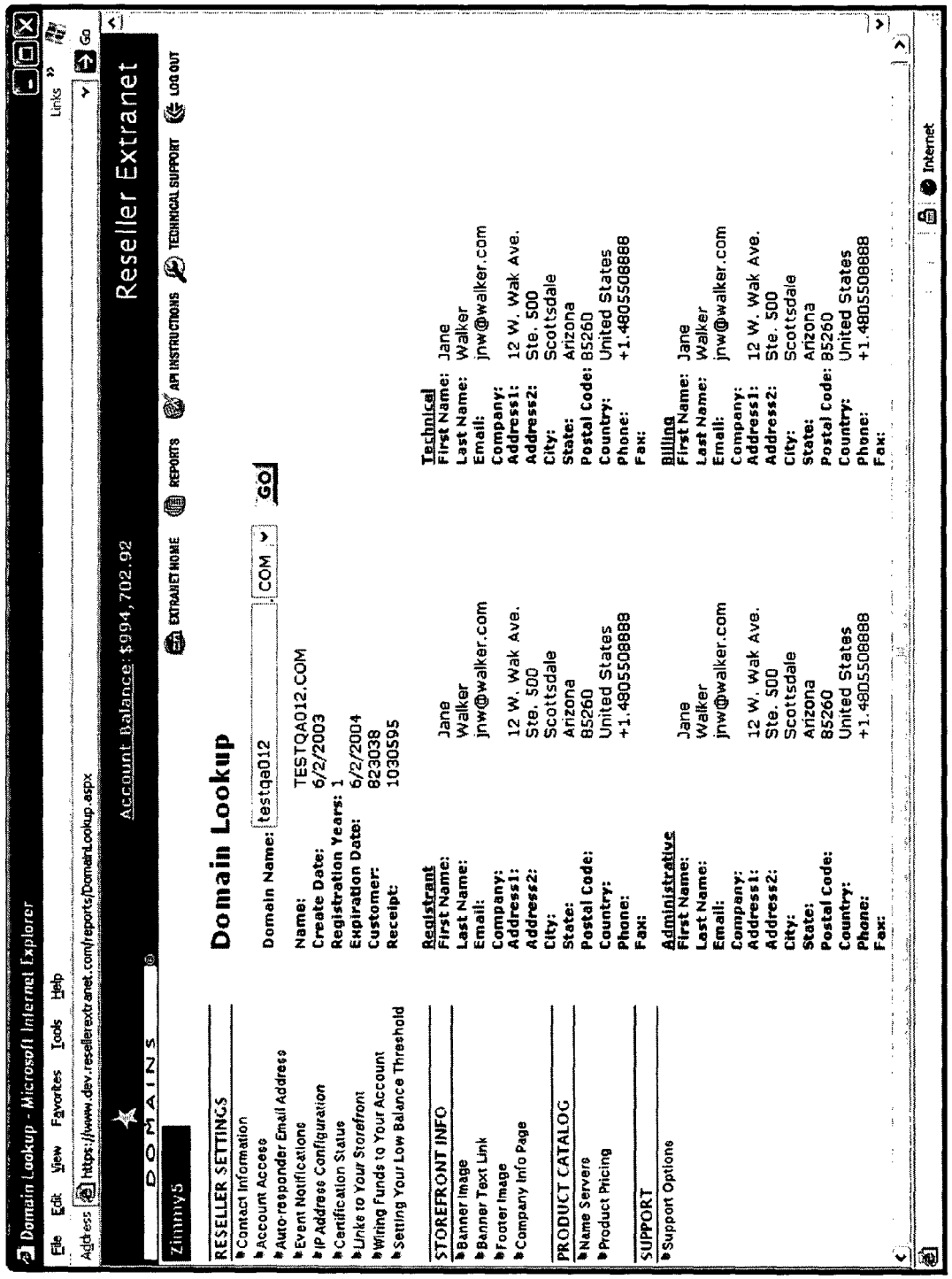
FIG. 54 is an example of a screen shot to a Domain Lookup web page according to a second embodiment of the invention.
Figure 55:
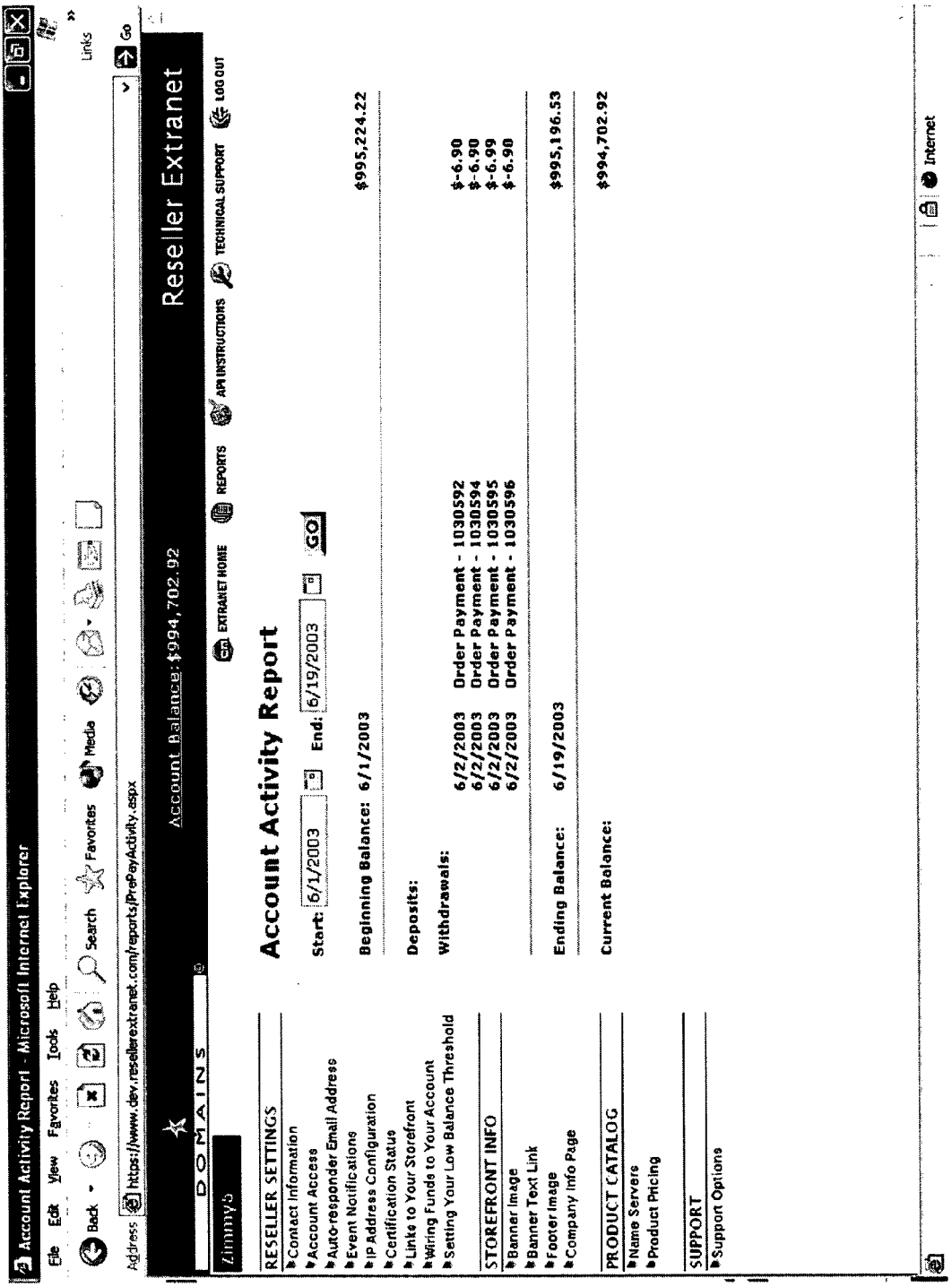
FIG. 55 is an example of a screen shot to a Account Activity Report web page according to a second embodiment of the invention.
Figure 56:
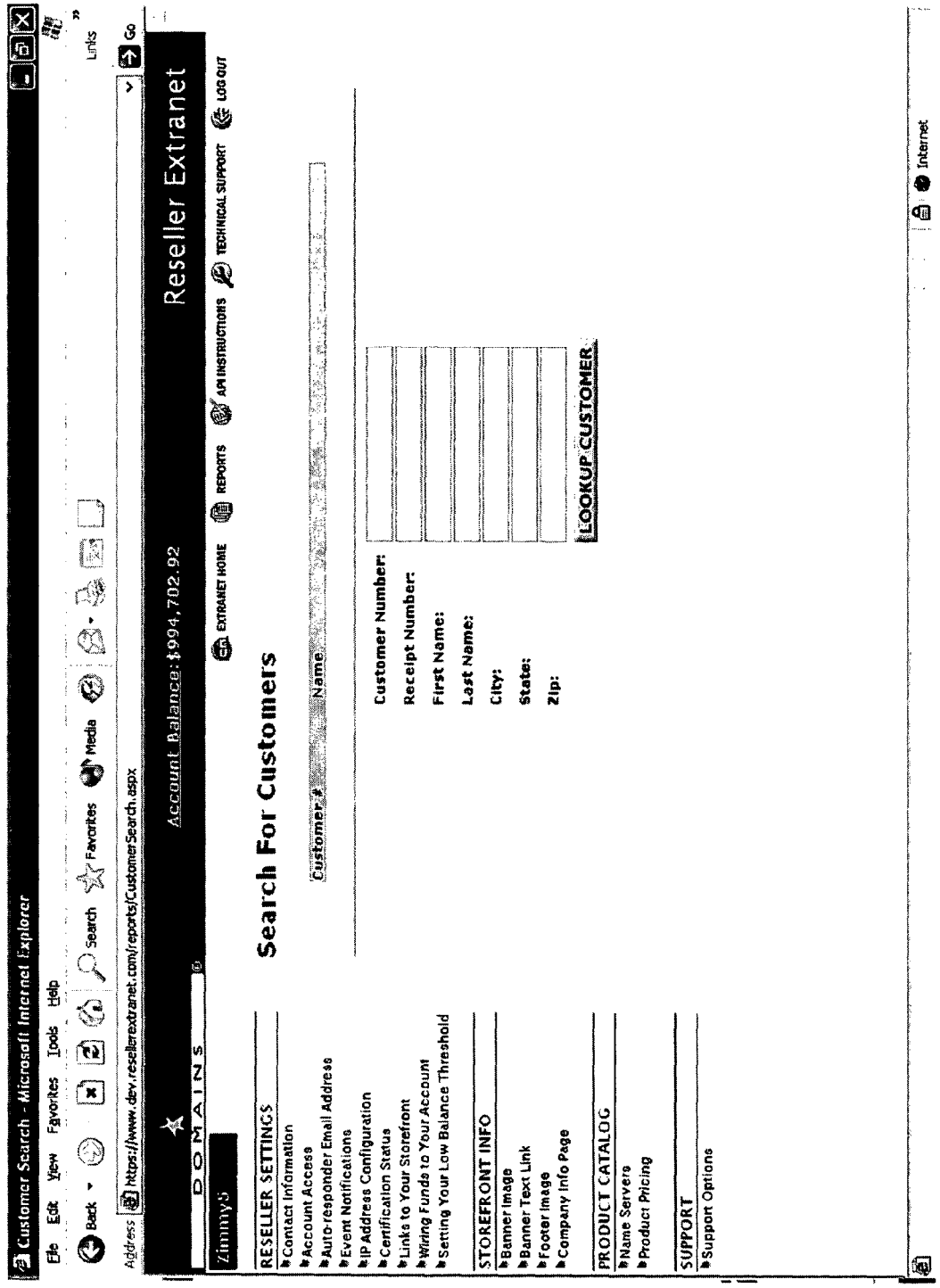
FIG. 56 is an example of a screen shot to a Search For Customers web page according to a second embodiment of the invention.
Figure 57:
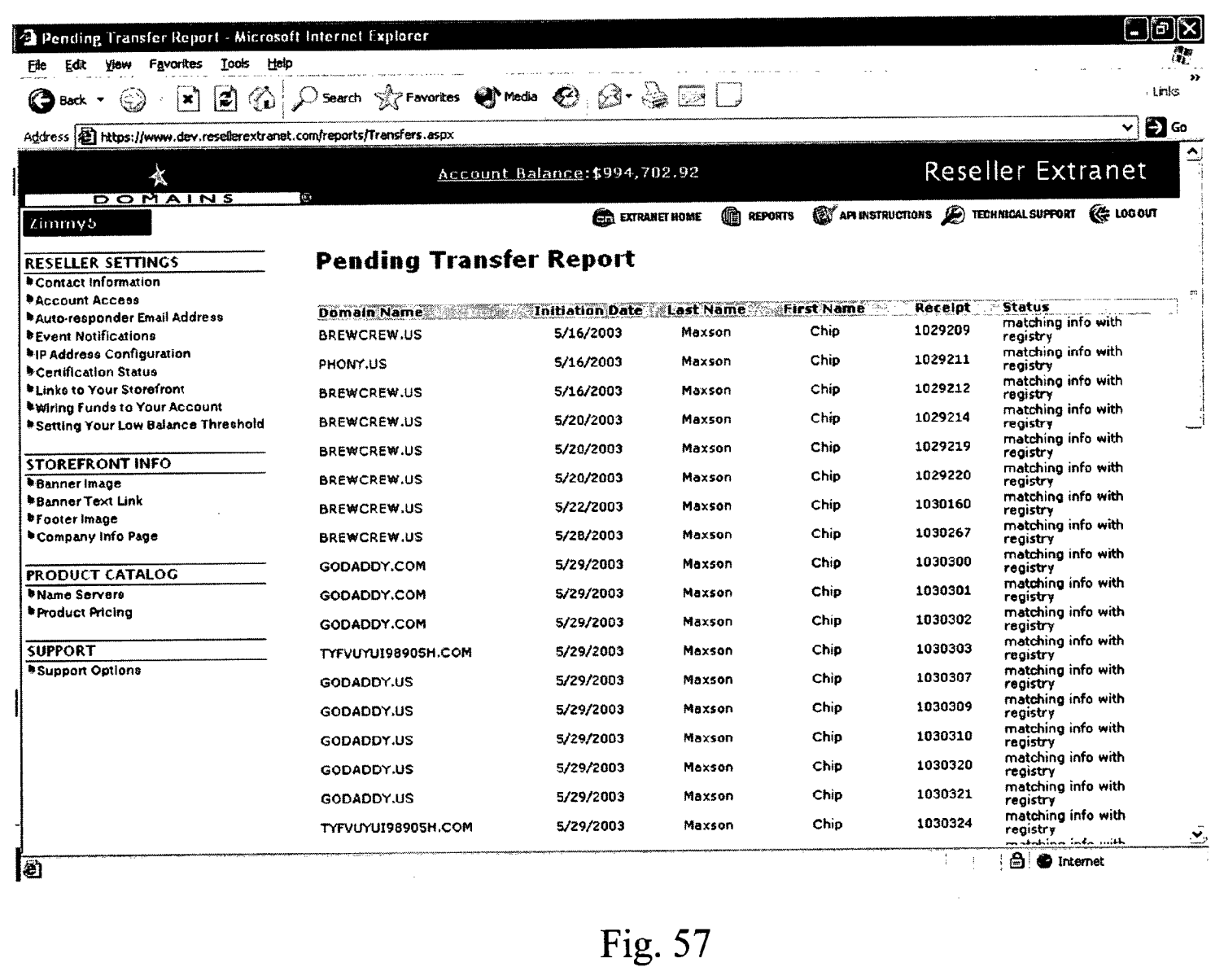

Resellers 400a may desire to see reports regarding the success of their reseller business. The administration web site 402 may include a web page, for example one similar to the web page shown in FIG. 51, for allowing the Resellers 400a to view one or more reports. As examples of possible reseller reports, e.g. units sold report, domain name registration report, domain lookup report, account activity report, customer search report and pending transfer report may all be made available to the Resellers 400a. Corresponding sample web pages for each of these reports are shown in FIGS. 52 through 57.

Resellers 400a may desire to select the top level domains they wish to offer their Customers 100 for registration. Typically top level domains that Resellers 400a may wish to offer their Customers 100 include, but are not limited to, .COM, .NET, .ORG, .INFO, .BIZ, .US, .WS. In a preferred embodiment, registration, transfer, bulk registration and bulk transfer capabilities may be selected for each top level domain. Resellers 400a may also desire to offer any number of other products and services. As examples, Resellers 400a may desire to offer domain name change of ownership, domain name forwarding, domain name masking for forwarding, domain name hosting and email services, custom park pages for domain names, private or proxy registration, wire transfer payments and account balances, notice when desired domain names become available, copyright registration services or website creation software.

Proxy registration services allow a proxy's name and contact information, e.g. the name and contact information for the Registrar 101a, to be stored in the public databases, while all the legal rights of ownership are contractually assigned to the Customer 100. The proxy registration service greatly enhances the reseller program since the Registrar 101a may accept or assign to a third party the proxy position thereby allowing the Resellers 400a to sell this highly desired service without having to worry about the complications of actually being the proxy or having to find a third party willing to accept the proxy position.

The Registrar 101a may desire to offer promotional products and services through their Resellers 400a and the Resellers 400a may desire to offer the promotional products and services to their Customers 100. In a preferred embodiment of the invention, a web page, for example a web page similar to the one shown in FIG. 23, may be provided to allow Resellers to select the promotional products and services they would like to offer their Customers 100.

The described API reseller program is preferably transparent to the Customer 100 who may never realize that they have visited the Registrar web site 403 or that the reseller web site 400b has transmitted their information to the registrar web site 403. The Customers 100 preferably pays the Reseller 400a and the Reseller 400a may pay the Registrar 101 for the products and services, e.g. domain name registration services, sold to the Customer 100. (Step 503)

In view of the foregoing, it will be understood by those skilled in the art that the systems and processes of the present invention can facilitate the registration of domain names selected by Customers 100 with an accredited Registry 102a via an accredited Registrar 101a. The above-described embodiments have been provided by way of example, and the present invention is not limited to these examples. Multiple variations and modification to the disclosed embodiments will occur, to the extent not mutually exclusive, to those skilled in the art upon consideration of the foregoing description. For example, while only a single Customer 100, Reseller and Registry 102a where displayed in the figures, any number of Customers 100, Resellers and Registries 102a may actually be involved in either the turnkey or API reseller programs. Such variations and modifications, however, fall well within the scope of the present invention as set forth in the following claims.

What is claimed is:

1. A system for utilizing a reseller program on a computer network, the system allowing a Customer to register a domain name via a Registrar and comprising:
    A) means for accepting a Reseller into the reseller program;
    B) means for creating a registrar web site for receiving the domain name from the Customer and registering the domain name with a Registry, the registrar web site comprising a custom layout, the custom layout comprising advertisement banners, pricing information or other information specifically selected by the Reseller;
    C) means for allowing the Customer to register the domain name via the registrar web site, wherein the Customer was guided to the registrar web site from an action by the Reseller;
    D) means for collecting a fee from the Customer that registers the domain name;
    E) means for compensating the Reseller that guided the Customer to the registrar web site that registered the domain name; and
    F) means for creating an administration web site configured to allow the Reseller to enter the reseller program, and configured to customize, by the Reseller, the registrar web site for the Customer.

2. The system of claim 1, wherein the action by the Reseller includes advertisement.

3. The system of claim 1, further comprising means for registering the domain name via a proxy service, wherein proxy contact information is made publicly available while the Customer receives legal rights in the domain name.

4. The system of claim 1, wherein the action by the Reseller includes creating a link to the registrar web site from a second web site.

5. The system of claim 1, wherein the registrar web site accepts domain names from the Customer, accepts information regarding the Customer, checks on availability of the domain name, collects a fee from the Customer, registers the domain name and other available domain names for the Customer, associates the Customer with the Reseller and compensates the Reseller based on actions of the Customer.

6. The system of claim 1, wherein the administration web site offers an option to the Reseller to receive an electronic payment from the Registrar based on activities of the Customer of the Reseller.

7. The system of claim 1, wherein the administration web site offers an option to the Reseller to offer registering the domain name via a proxy service, wherein proxy contact information is made publicly available while the Customer receives legal rights in the domain name.

8. The system of claim 1, wherein the administration web site offers an option to the Reseller to display a report showing commission payments during a selected time period.

9. A computer implemented process for allowing a Customer to register a domain name via a reseller program, comprising the steps of:
    A) accepting a Reseller into the reseller program;
    B) creating, by a computer, a registrar web site for registering the domain name with a Registry, said registrar web site comprising a custom layout, the custom layout comprising advertisement banners, pricing information or other information specifically selected by the Reseller;
    C) allowing the Customer to register the domain name via the registrar web site, wherein the Customer was guided to the registrar web site from an action by the Reseller;
    D) collecting a fee from the Customer that registers the domain name;
    E) compensating the Reseller that guided the Customer to the registrar web site that registered domain name; and
    F) creating an administration web site configured to allow the Reseller to enter the reseller program, and configured to customize, by the Reseller, the registrar web site for the Customer.

10. The computer implemented process of claim 9, further comprising the step of allowing the domain name to be registered via a proxy service contact information, wherein the proxy service contact information is made publicly available while the Customer receives legal rights in the domain name.

11. The computer implemented process of claim 9, wherein the action by the Reseller includes placement of the registrar web site in a search engine.

12. The computer implemented process of claim 9, wherein the action by the Reseller includes creating a link to the registrar web site from a second web site.

13. The computer implemented process of claim 9, wherein the registrar web site accepts the domain name from the Customer, accepts information regarding the Customer, checks on availability of the domain name accepted from the Customer, collects a fee from the Customer, registers the domain name or other available domain names for the Customer, associates the Customer with the Reseller and compensates the Reseller based on actions of the Customer.

14. The computer implemented process of claim 9, wherein the administration web site offers an option to the Reseller to receive electronic payments from the Registrar based on activities of the Customer.

15. The computer implemented process of claim 9, wherein the administration web site offers an option to the Reseller to offer registering the domain name via a proxy service, wherein proxy contact information is made publicly available while the Customer receives legal rights in the domain name.

16. The computer implemented process of claim 9, wherein the administration web site offers an option to the Reseller to display a report showing commission payments during selected time periods.

* * * * *